United States Patent
Nishida et al.

(10) Patent No.: US 9,632,338 B2
(45) Date of Patent: Apr. 25, 2017

(54) LIQUID CRYSTAL DEVICE, LIQUID CRYSTAL DEVICE DRIVING METHOD, AND ELECTRONIC APPARATUS

(71) Applicant: SEIKO EPSON CORPORATION, Tokyo (JP)

(72) Inventors: Masakazu Nishida, Chino (JP); Shohei Yoshida, Shimo-suwa-machi (JP); Takenori Hirota, Suwa (JP); Tomokazu Umeno, Suwa (JP); Akinori Masuzawa, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 119 days.

(21) Appl. No.: 14/626,876

(22) Filed: Feb. 19, 2015

(65) Prior Publication Data
US 2015/0160493 A1    Jun. 11, 2015

Related U.S. Application Data

(62) Division of application No. 13/074,175, filed on Mar. 29, 2011, now abandoned.

(30) Foreign Application Priority Data

Mar. 29, 2010 (JP) .................................. 2010-074993
Mar. 30, 2010 (JP) .................................. 2010-077500

(51) Int. Cl.
*G02F 1/1343* (2006.01)
*G02F 1/133* (2006.01)
(Continued)

(52) U.S. Cl.
CPC ........ *G02F 1/13306* (2013.01); *G02F 1/1337* (2013.01); *G02F 1/1368* (2013.01);
(Continued)

(58) Field of Classification Search
CPC ......... G02F 1/136286; G02F 1/133707; G02F 1/134336; G02F 1/134363; G02F 1/1345;
(Continued)

(56) References Cited

U.S. PATENT DOCUMENTS 6,501,454 B1 * 12/2002 Ozawa ................. G09G 3/3629
                                                    345/208
6,771,245 B2 * 8/2004 Kanbe .................. G09G 3/3648
                                                    345/87

(Continued)

FOREIGN PATENT DOCUMENTS

JP  2002-189460 A   7/2002
JP  2007-219356 A   8/2007
(Continued)

*Primary Examiner* — Lucy Chien
(74) *Attorney, Agent, or Firm* — Hauptman Ham, LLP

(57) ABSTRACT

In a liquid crystal device according to the invention, a pre-tilt angle of a liquid crystal layer is greater on an opposing electrode side than on a pixel electrode side. A high potential and a low potential relative to an opposing electrode potential are alternately applied to pixel electrodes through switching elements; and the opposing electrode potential is higher than a standard potential, the standard potential being a potential in which the average potential between the high potential and the low potential has been shifted by an amount equivalent to the average value of the amount of change in the potential of the pixel electrodes caused by parasitic capacitance in the switching elements when the high potential is applied to the pixel electrodes and the amount of change in the potential of the pixel electrodes caused by parasitic capacitance when the low potential is applied to the pixel electrodes.

5 Claims, 24 Drawing Sheets

(51) Int. Cl.
  *G02F 1/1337* (2006.01)
  *G09G 3/36* (2006.01)
  *G02F 1/1362* (2006.01)
  *G02F 1/1368* (2006.01)
  *G09G 3/20* (2006.01)

(52) U.S. Cl.
  CPC .. *G02F 1/133734* (2013.01); *G02F 1/136213* (2013.01); *G09G 3/3648* (2013.01); *G02F 2001/133746* (2013.01); *G02F 2001/133773* (2013.01); *G09G 3/2092* (2013.01); *G09G 2300/0876* (2013.01); *G09G 2310/0205* (2013.01); *G09G 2310/0218* (2013.01); *G09G 2320/0247* (2013.01)

(58) Field of Classification Search
  CPC ....... G02F 1/1393; G02F 2001/133742; G02F 1/133753; G02F 1/13306; G02F 1/136213; G09G 2300/0842; G09G 3/3233; G09G 2300/0819; G09G 3/3648; G09G 3/3614; G09G 3/3659
  USPC ............................... 349/139, 130; 345/80, 90
  See application file for complete search history.

(56) References Cited

U.S. PATENT DOCUMENTS

| | | |
|---|---|---|
| 2001/0020993 A1 | 9/2001 | Watanabe et al. |
| 2001/0028430 A1* | 10/2001 | Koma ............... G02F 1/1393 349/139 |
| 2002/0089477 A1 | 7/2002 | Kanbe et al. |
| 2006/0023156 A1 | 2/2006 | Lin et al. |
| 2008/0043188 A1 | 2/2008 | Zhu et al. |
| 2008/0186436 A1 | 8/2008 | Chu et al. |
| 2009/0237605 A1 | 9/2009 | Nagae et al. |
| 2009/0279032 A1 | 11/2009 | Kwok et al. |
| 2011/0063552 A1 | 3/2011 | Ichihashi |

FOREIGN PATENT DOCUMENTS

| | | |
|---|---|---|
| JP | 2007199191 A | 8/2007 |
| JP | 2007286171 A | 11/2007 |

\* cited by examiner

WHEN Q=-1

LIQUID CRYSTAL DEVICE, LIQUID CRYSTAL DEVICE DRIVING METHOD, AND ELECTRONIC APPARATUS

CROSS REFERENCES TO RELATED APPLICATIONS

The present invention is a divisional of U.S. patent application Ser. No. 13/074,175 filed Mar. 29, 2011 and claims priority to Japanese Patent Application No. 2010-074993 filed Mar. 29, 2010, and Japanese Patent Application No. 2010-077500 filed Mar. 30, 2010, the entire contents of which are incorporated herein by reference.

BACKGROUND

1. Technical Field

The present invention relates to liquid crystal devices, driving methods for liquid crystal devices, and electronic apparatuses.

2. Related Art

Liquid crystal devices in which a liquid crystal layer is disposed between pixel electrodes and opposing electrodes have been known for some time. The pixel electrodes are electrically connected to switching elements such as thin-film transistors (referred to as "TFTs" hereinafter). The switching elements are controlled to turn on and off as the result of the input of scanning signals from scanning lines. When a switching element is on, a voltage from a data line is applied to the corresponding pixel electrode. As a result of this voltage, an electrical field is generated between the pixel electrode and the opposing electrode, and the liquid crystal layer is driven by these electrical fields.

A typical liquid crystal device employs, for example, inversion driving (AC driving), in which the polarity of the driving voltage applied to the pixel electrodes is inverted for each scanning line or data line, or is inverted for each frame in an image signal. In other words, the liquid crystal layer employs AC driving. In order to drive the liquid crystal layer using AC driving, for example, the opposing electrodes are held at a predetermined opposing electrode potential, and the potential of the pixel electrodes is switched between a high potential that is higher than the opposing electrode potential (positive polarity) and a low potential that is lower than the opposing electrode potential (negative polarity) over an interval of two consecutive frames. Doing so inverts the direction of the electrical field applied to the liquid crystal layer, which makes it possible to reduce electrical charge shift in the liquid crystal layer.

Reducing electrical charge shift makes it possible to reduce the DC voltage component applied to the liquid crystal layer due to the electrical charge shift, which in turn makes it possible to suppress the occurrence of display problems. In other words, a collapse in the balance between the positive and negative polarity electrical amounts caused by the DC voltage component is suppressed, which makes it difficult for flicker, caused by changes in the transmissivity of the liquid crystal device over a positive- and negative-polarity interval, to occur in the display image. Furthermore, it is difficult for the display to exhibit a constant display pattern (that is, burn-in) caused by the constant application of an electrical field to the liquid crystal layer resulting from the DC voltage component. However, the application of the DC voltage component has not been completely eliminated simply by carrying out inversion driving, and display problems have persisted.

Incidentally, it is known that driving a liquid crystal device with the difference between the opposing electrode potential and the high potential set to the same difference as the difference between the opposing electrode potential and the low potential will result in the occurrence of a DC voltage component. It is thought that this DC voltage component arises due to the following two phenomena.

The first phenomenon is a phenomenon in which when the switching element switches from on to off, the potential of the pixel electrode fluctuates due to the distribution of a charge in a channel region and the pixel electrode being charged (also called "field-through", "push-down", or "punch-through"). Specifically, the charge accumulated through parasitic capacitance and in a storage capacitor results in a phenomenon in which the pixel electrode voltage drops due to charge redistribution when the switching element is turned off.

The second phenomenon is a phenomenon in which electrical charge shift occurs when the electric properties on the pixel electrode side and the opposing electrode side of the liquid crystal layer are asymmetrical.

The generation of the DC voltage component due to the first phenomenon can be eliminated if the amount of fluctuation in the potential of the pixel electrode caused by the parasitic capacitance of the switching element is measured or estimated in advance and the opposing electrode potential is set so as to cancel out the fluctuation in the positive- and negative-polarity electrical amounts caused by this fluctuation amount.

The technique disclosed in JP-A-2007-219356 can be given as an example of a technique for eliminating the occurrence of the DC voltage component caused by the second phenomenon.

The liquid crystal device according to JP-A-2007-219356 includes liquid crystals held in a tilted vertical orientation mode between a first inorganic orientation film and a second inorganic orientation film, and a voltage application member. The thickness of the second inorganic orientation film is greater than the thickness of the first inorganic orientation film. The voltage application member applies a predetermined voltage so that the first inorganic orientation film is set to a first potential and the second inorganic orientation film is set to a second potential that is lower than the first potential.

According to the technique disclosed in JPA-2007-219356, different potentials are generated at the first inorganic orientation film and the second inorganic orientation film, and thus an effect in which electrical charge shift caused by the difference in the thicknesses of the first inorganic orientation film and the second inorganic orientation film are eliminated can be expected. However, electrical charge shift can be thought to occur due to other reasons aside from the difference in the thickness between the first inorganic orientation film and the second inorganic orientation film; therefore, from the standpoint of effectively reducing the DC voltage component through the configuration of the liquid crystal device, the technique disclosed in JP-A-2007-219356 has room for improvement.

Meanwhile, a driving method for a liquid crystal device that focuses on the aforementioned two phenomena has been proposed. For example, JP-A-2002-189460 discloses a technique that shifts the opposing electrode potential, which serves as the basis of the polarity inversion in inversion driving, in order to correct the influence of the first phenomenon (field-through) and the second phenomenon (voltage fluctuations caused by differences in the electric properties of the element substrate and the opposing substrate) in advance. Specifically, in JP-A-2002-189460, the amount of voltage fluctuation caused by the first phenomenon and the amount of voltage fluctuation caused by the second phenomenon are measured in an initial stage according to predetermined measurement conditions, and a value obtained by adding those amounts together is added, as a constant correction voltage, to a setting potential ($V_{com}$) of the opposing electrodes.

According to the technique disclosed in JP-A-2002-189460, it is thought that adding the correction voltage obtained by adding the amounts of voltage fluctuation in the first phenomenon and the second phenomenon to the opposing electrode potential makes it possible to suppress a drop in the display quality caused by the occurrence of the DC voltage component.

However, in the case where the correction voltage for the second phenomenon is greater than the correction voltage for the first phenomenon to a certain degree, the opposing electrode potential will shift greatly in the positive or the negative direction. In other words, if the correction voltage for the second phenomenon is high, there will be a great amplitude change to the positive or the negative in the driving voltage. Accordingly, there are cases where display problems such as flicker or the like will arise.

SUMMARY

An advantage of some aspects of the invention is to provide a liquid crystal device, a liquid crystal device driving method, and an electronic apparatus capable of improving display quality by suppressing the occurrence of display problems such as flicker.

In order to achieve the stated advantage, the invention employs the following configurations.

A liquid crystal device according to a first aspect of the invention includes: pixel electrodes; switching elements electrically connected to the pixel electrodes; an opposing electrode disposed opposing the pixel electrodes and to which an opposing electrode potential is applied; a liquid crystal layer provided between the pixel electrodes and the opposing electrode; a first orientation film provided between the liquid crystal layer and the pixel electrodes; and a second orientation film provided between the liquid crystal layer and the opposing electrode. A pre-tilt angle formed by the director of the liquid crystal layer and the thickness direction of the liquid crystal layer is greater on the opposing electrode side than on the pixel electrode side. A high potential and a low potential relative to the opposing electrode potential are alternately applied to the pixel electrodes through the switching elements. The opposing electrode potential is higher than a standard potential, the standard potential being a potential in which the average potential between the high potential and the low potential has been shifted by an amount equivalent to the average value of the amount of change in the potential of the pixel electrodes caused by parasitic capacitance in the switching elements when the high potential is applied to the pixel electrodes and the amount of change in the potential of the pixel electrodes caused by the parasitic capacitance when the low potential is applied to the pixel electrodes.

With such a configuration, in which the pre-tilt angle formed by the director of the liquid crystal layer relative to the thickness direction of the liquid crystal layer is greater on the opposing electrode side than on the pixel electrode side, it is easy for a charge to accumulate on the pixel electrode side. With the liquid crystal device according to the first aspect of the invention, the opposing electrode potential is higher than the standard potential, and thus the absolute value of the potential difference of the pixel electrodes relative to the opposing electrode potential when the high potential is applied to the pixel electrodes is lower than the case where the standard potential is applied to the opposing electrode. Likewise, the absolute value of the potential difference of the pixel electrodes relative to the opposing electrode potential is higher when the low potential is applied to the pixel electrodes. Accordingly, the charge that moves from the opposing electrode side to the pixel electrode side of the liquid crystal layer can be reduced, and the charge that moves from the pixel electrode side to the opposing electrode side of the liquid crystal layer can be increased. Accordingly, it is possible to cause the charge to move in a manner that cancels out the electrical charge shift caused by differing pre-tilt angles on the opposing electrode side and the pixel electrode side, and thus it is possible to reduce this electrical charge shift.

The standard potential is a potential in which the average potential has been shifted by an amount equivalent to the average value of the amount of change in the potential of the pixel electrodes caused by parasitic capacitance in the switching elements when the high potential is applied to the pixel electrodes and the amount of change in the potential of the pixel electrodes caused by parasitic capacitance when the low potential is applied to the pixel electrodes. Accordingly, when the standard potential is applied to the opposing electrode, an electrical charge shift caused by field-through can be avoided. Because the opposing electrode potential is set relative to this standard potential as described above, electrical charge shift caused by field-through and electrical charge shift caused by different pre-tilt angles on the opposing electrode side and the pixel electrode side can both be reduced. In this manner, with the liquid crystal device according to the first aspect of the invention, the electrical charge shift is reduced, and thus the occurrence of flicker, burn-in, and so on can be suppressed.

A liquid crystal device according to a second aspect of the invention includes: pixel electrodes; switching elements electrically connected to the pixel electrodes; an opposing electrode disposed opposing the pixel electrodes and to which an opposing electrode potential is applied; a liquid crystal layer provided between the pixel electrodes and the opposing electrode; a first orientation film provided between the liquid crystal layer and the pixel electrodes; and a second orientation film provided between the liquid crystal layer and the opposing electrode. A pre-tilt angle formed by the director of the liquid crystal layer and the thickness direction of the liquid crystal layer is greater on the pixel electrode side than on the opposing electrode side. A high potential and a low potential relative to the opposing electrode potential are alternately applied to the pixel electrodes through the switching elements. The opposing electrode potential is lower than a standard potential, the standard potential being a potential in which the average potential between the high potential and the low potential has been shifted by an amount equivalent to the average value of the amount of change in the potential of the pixel electrodes caused by parasitic capacitance in the switching elements when the high potential is applied to the pixel electrodes and the amount of change in the potential of the pixel electrodes caused by the parasitic capacitance when the low potential is applied to the pixel electrodes.

With such a configuration, in which the pre-tilt angle formed by the director of the liquid crystal layer relative to the thickness direction of the liquid crystal layer is greater on the pixel electrode side than on the opposing electrode side, it is easy for a charge to accumulate on the opposing electrode side. With the liquid crystal device according to the second aspect of the invention, the opposing electrode potential is lower than the standard potential, and thus the absolute value of the potential difference of the pixel electrodes relative to the opposing electrode potential when the high potential is applied to the pixel electrodes is higher than the case where the standard potential is applied to the opposing electrode. Likewise, the absolute value of the potential difference of the pixel electrodes relative to the opposing electrode potential is lower when the low potential is applied to the pixel electrodes. Therefore, the charge that moves from the opposing electrode side to the pixel electrode side of the liquid crystal layer can be increased, and the charge that moves from the pixel electrode side to the opposing electrode side of the liquid crystal layer can be reduced. Accordingly, it is possible to cause the charge to move in a manner that cancels out the electrical charge shift caused by differing pre-tilt angles on the opposing electrode side and the pixel electrode side, and thus it is possible to reduce this electrical charge shift.

Furthermore, because the opposing electrode potential is set relative to this standard potential as described above, electrical charge shift caused by field-through and electrical charge shift caused by different pre-tilt angles on the opposing electrode side and the pixel electrode side can both be reduced, for the same reasons as with the liquid crystal device according to the first aspect of the invention. In this manner, with the liquid crystal device according to the second aspect of the invention, the electrical charge shift is reduced, and thus the occurrence of flicker, burn-in, and so on can be suppressed.

A liquid crystal device according to a third aspect of the invention includes: an element substrate having multiple scanning lines and multiple data lines as well as switching elements and pixel electrodes provided in correspondence to the intersections between the scanning lines and the data lines; an opposing substrate disposed opposing the element substrate that includes an opposing electrode; a liquid crystal layer held between the element substrate and the opposing substrate; a first orientation film provided on the side of the element substrate that faces the liquid crystal layer; and a second orientation film provided on the side of the opposing substrate that faces the liquid crystal layer. A first pre-tilt angle in the first orientation film is set to be lower than a second pre-tilt angle in the second orientation film. An opposing electrode potential set so as to reduce flicker caused by parasitic capacitance in the switching elements is applied to the opposing electrode. Assuming that a high voltage relative to the opposing electrode potential is positive polarity and a low voltage relative to the opposing electrode potential is negative polarity, the positive polarity voltage and the negative polarity voltage are applied alternately to the pixel electrodes, and in a predetermined interval made up of a first interval in which the positive polarity voltage is applied and a second interval in which the negative polarity voltage is applied, the length of the first interval is set to be shorter than the length of the second interval.

With the liquid crystal device according to the third aspect of the invention, the opposing electrode potential is shifted in advance and set so that flicker caused by parasitic capacitance in the switching elements is reduced, and thus the first phenomenon can be corrected. Furthermore, in a predetermined interval, because the length of the first interval is set to be shorter than the length of the second interval, the second phenomenon can also be corrected. This correction is derived from a discovery done by the inventors such that the effective voltage waveform shifts in the negative direction of the potential, by setting the first pre-tilt angle in the first orientation film to be less than the second pre-tilt angle in the second orientation film (that is, setting the first pre-tilt angle to be closer to a vertical orientation than the second pre-tilt angle). This was confirmed from the results of experiments carried out by the inventors. In other words, it is clear that setting the first pre-tilt angle in the first orientation film on the side of the element substrate to be less than the second pre-tilt angle in the second orientation film on the side of the opposing substrate shifts $V_{com}$ in the negative direction (that is, the post-shift opposing electrode potential shifts in the negative direction from the pre-shift opposing electrode potential), compared to the case in which the first pre-tilt angle and the second pre-tilt angle are the same. In this manner, the direction of the $V_{com}$ shift is clearly recognized in advance, and thus the correction to cope with the $V_{com}$ shift can be carried out more precisely than in the case of the past techniques, where which direction the shift would occur in was not clear. Accordingly, a liquid crystal device capable of improving the display quality by suppressing the occurrence of display problems such as flicker can be provided.

A liquid crystal device according to a fourth aspect of the invention includes: an element substrate having multiple scanning lines and multiple data lines as well as switching elements and pixel electrodes provided in correspondence to the intersections between the scanning lines and the data lines; an opposing substrate disposed opposing the element substrate that includes an opposing electrode; a liquid crystal layer held between the element substrate and the opposing substrate; a first orientation film provided on the side of the element substrate that faces the liquid crystal layer; and a second orientation film provided on the side of the opposing substrate that faces the liquid crystal layer. A first pre-tilt angle in the first orientation film is set to be greater than a second pre-tilt angle in the second orientation film. An opposing electrode potential set so as to reduce flicker caused by parasitic capacitance in the switching elements is applied to the opposing electrode. Assuming that a high voltage relative to the opposing electrode potential is positive polarity and a low voltage relative to the opposing electrode potential is negative polarity, the positive polarity voltage and the negative polarity voltage are applied alternately to the pixel electrodes, and in a predetermined interval made up of a first interval in which the positive polarity voltage is applied and a second interval in which the negative polarity voltage is applied, the length of the first interval is set to be longer than the length of the second interval.

With the liquid crystal device according to the fourth aspect of the invention, the opposing electrode potential is shifted in advance and set so that flicker caused by parasitic capacitance in the switching elements is reduced, and thus the first phenomenon can be corrected. Furthermore, in a predetermined interval, because the length of the first interval is set to be longer than the length of the second interval, the second phenomenon can also be corrected. This correction is derived from a discovery done by the inventors such that the effective voltage waveform shifts in the positive direction of the potential, by setting the first pre-tilt angle in the first orientation film to be greater than the second pre-tilt angle in the second orientation film (that is, setting the second pre-tilt angle to be closer to a vertical orientation than the first pre-tilt angle). This was estimated based on the results of experiments carried out by the inventors. In other words, it is clear that setting the first pre-tilt angle in the first orientation film on the side of the element substrate to be greater than the second pre-tilt angle in the second orientation film on the side of the opposing substrate shifts $V_{com}$ in the positive direction (that is, the post-shift opposing electrode potential shifts in the positive direction from the pre-shift opposing electrode potential), compared to the case in which the first pre-tilt angle and the second pre-tilt angle are the same. In this manner, the direction of the $V_{com}$ shift is clearly recognized in advance, and thus the correction to cope with the $V_{com}$ shift can be carried out more precisely than in the case of the past techniques, where which direction the shift would occur in was not clear.

Accordingly, a liquid crystal device capable of improving the display quality by suppressing the occurrence of display problems such as flicker can be provided.

In the liquid crystal devices according to the first, second, third, and fourth aspects of the invention, it is preferable for the pixel electrodes to be configured of aluminum, and the opposing electrode to be configured of indium tin oxide.

Doing so makes it possible to configure a reflective liquid crystal device, which in turn makes it possible to improve the numerical aperture of the pixels and realize a thinner liquid crystal device and so on.

Furthermore, it is clear that according to this liquid crystal device, $V_{com}$ will shift in either the positive direction or the negative direction, as compared to the case where the pixel electrodes and the opposing electrode are configured of the same material (for example, ITO), and thus there is a marked asymmetry between the properties of the element substrate and the opposing substrate. This was confirmed from the results of experiments carried out by the inventors. For this reason, there is a marked occurrence of the DC voltage component caused by the difference in properties between the element substrate and the opposing substrate that hold the liquid crystal layer, compared to the case where both the pixel electrodes and the opposing electrode are configured of, for example, ITO. Accordingly, it is possible to improve the display quality by suppressing the occurrence of display problems such as flicker.

In the liquid crystal device according to the first aspect of the invention, when the pre-tilt angle in the vicinity of the second orientation film is 6° greater than the pre-tilt angle in the vicinity of the first orientation film, it is preferable for the ratio of the absolute value of the potential difference between the opposing electrode potential and the low potential to the absolute value of the potential difference between the opposing electrode potential and the high potential to be set to a range from more than or equal to 49/51 and less than or equal to 52/48.

Doing so makes it possible to effectively reduce an electrical charge shift caused by the dielectric layer.

A first liquid crystal device driving method according to an aspect of the invention is a driving method for a liquid crystal device that includes pixel electrodes, switching elements electrically connected to the pixel electrodes, an opposing electrode disposed opposing the pixel electrodes and to which an opposing electrode potential is applied, a liquid crystal layer provided between the pixel electrodes and the opposing electrode, a first orientation film provided between the liquid crystal layer and the pixel electrodes, and a second orientation film provided between the liquid crystal layer and the opposing electrode, with a pre-tilt angle formed by the director of the liquid crystal layer and the thickness direction of the liquid crystal layer greater on the opposing electrode side than on the pixel electrode side. In this driving method, a high potential and a low potential relative to the opposing electrode potential are alternately applied to the pixel electrodes through the switching elements; and the opposing electrode potential is set to be lower than a standard potential, the standard potential being a potential in which the average potential between the high potential and the low potential has been shifted by an amount equivalent to the average value of the amount of change in the potential of the pixel electrodes caused by parasitic capacitance in the switching elements when the high potential is applied to the pixel electrodes and the amount of change in the potential of the pixel electrodes caused by the parasitic capacitance when the low potential is applied to the pixel electrodes.

In this manner, because the opposing electrode potential is set as described above, electrical charge shift caused by field-through and electrical charge shift caused by different pre-tilt angles on the opposing electrode side and the pixel electrode side can both be reduced.

A second liquid crystal device driving method according to an aspect of the invention is a driving method for a liquid crystal device including an element substrate having multiple scanning lines and multiple data lines as well as switching elements and pixel electrodes provided in correspondence to the intersections between the scanning lines and the data lines, an opposing substrate disposed opposing the element substrate that includes an opposing electrode, a liquid crystal layer held between the element substrate and the opposing substrate, a first orientation film provided on the side of the element substrate that faces the liquid crystal layer, and a second orientation film provided on the side of the opposing substrate that faces the liquid crystal layer, with a first pre-tilt angle in the first orientation film set to be lower than a second pre-tilt angle in the second orientation film. In this driving method, an opposing electrode potential set so as to reduce flicker caused by parasitic capacitance in the switching elements is applied to the opposing electrode; a positive polarity voltage and a negative polarity voltage are alternately applied to the pixel electrodes, the positive polarity voltage being a high voltage relative to the opposing electrode potential and the negative polarity voltage being a low voltage relative to the opposing electrode potential; and, in a predetermined interval made up of a first interval in which the positive polarity voltage is applied and a second interval in which the negative polarity voltage is applied, the length of the first interval is set to be shorter than the length of the second interval.

With the second liquid crystal device driving method according to the aspect of the invention, the opposing electrode potential is shifted in advance and set so that flicker caused by parasitic capacitance in the switching elements is reduced, and thus the first phenomenon can be corrected. Furthermore, in a predetermined interval, because the length of the first interval is set to be shorter than the length of the second interval, the second phenomenon can also be corrected. This correction is derived from a discovery done by the inventors such that the effective voltage waveform shifts in the negative direction of the potential, by setting the first pre-tilt angle in the first orientation film to be less than the second pre-tilt angle in the second orientation film. This was confirmed from the results of experiments carried out by the inventors. Accordingly, it is possible to improve the display quality by suppressing the occurrence of display problems such as flicker.

A third liquid crystal device driving method according to an aspect of the invention is a driving method for a liquid crystal device including an element substrate having multiple scanning lines and multiple data lines as well as switching elements and pixel electrodes provided in correspondence to the intersections between the scanning lines and the data lines, an opposing substrate disposed opposing the element substrate that includes an opposing electrode, a liquid crystal layer held between the element substrate and the opposing substrate, a first orientation film provided on the side of the element substrate that faces the liquid crystal layer, and a second orientation film provided on the side of the opposing substrate that faces the liquid crystal layer, with a first pre-tilt angle in the first orientation film set to be greater than a second pre-tilt angle in the second orientation film. In this driving method, an opposing electrode potential set so as to reduce flicker caused by parasitic capacitance in the switching elements is applied to the opposing electrode; a positive polarity voltage and a negative polarity voltage are alternately applied to the pixel electrodes, the positive polarity voltage being a high voltage relative to the opposing electrode potential and the negative polarity voltage being a low voltage relative to the opposing electrode potential; and, in a predetermined interval made up of a first interval in which the positive polarity voltage is applied and a second interval in which the negative polarity voltage is applied, the length of the first interval is set to be longer than the length of the second interval.

With the third liquid crystal device driving method according to the aspect of the invention, the opposing electrode potential is shifted in advance and set so that flicker caused by parasitic capacitance in the switching elements is reduced, and thus the first phenomenon can be corrected. Furthermore, in a predetermined interval, because the length of the first interval is set to be longer than the length of the second interval, the second phenomenon can also be corrected. This correction is derived from a discovery done by the inventors such that the effective voltage waveform shifts in the positive direction of the potential, by setting the first pre-tilt angle in the first orientation film to be greater than the second pre-tilt angle in the second orientation film. This was estimated based on the results of experiments carried out by the inventors. Accordingly, it is possible to improve the display quality by suppressing the occurrence of display problems such as flicker.

In the second liquid crystal device driving method according to the aspect of the invention, it is preferable for the ratio between the length of the first interval and the length of the second interval to be set to a range that is greater than 50.0/50.0 and less than or equal to 52.0/48.0 when the first pre-tilt angle is set so as to be 6° less than the second pre-tilt angle.

According to this liquid crystal device driving method, the optimum time distribution ratio corresponding to the allowable limit of flicker is achieved, and thus the second phenomenon can be effectively corrected. However, there are cases where the length of the first interval will be too long, making the correction ineffective, if the ratio between the length of the first interval and the length of the second interval is lower than 50.0/50.0. Furthermore, there are cases where the length of the first interval will be too short, making the correction ineffective, if the ratio between the length of the first interval and the length of the second interval is greater than 52.0/48.0.

An electronic apparatus according to an aspect of the invention includes the liquid crystal device described above.

This electronic apparatus includes the stated liquid crystal device, and it is thus possible to provide an electronic apparatus capable of improving display quality by suppressing the occurrence of display problems such as flicker.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
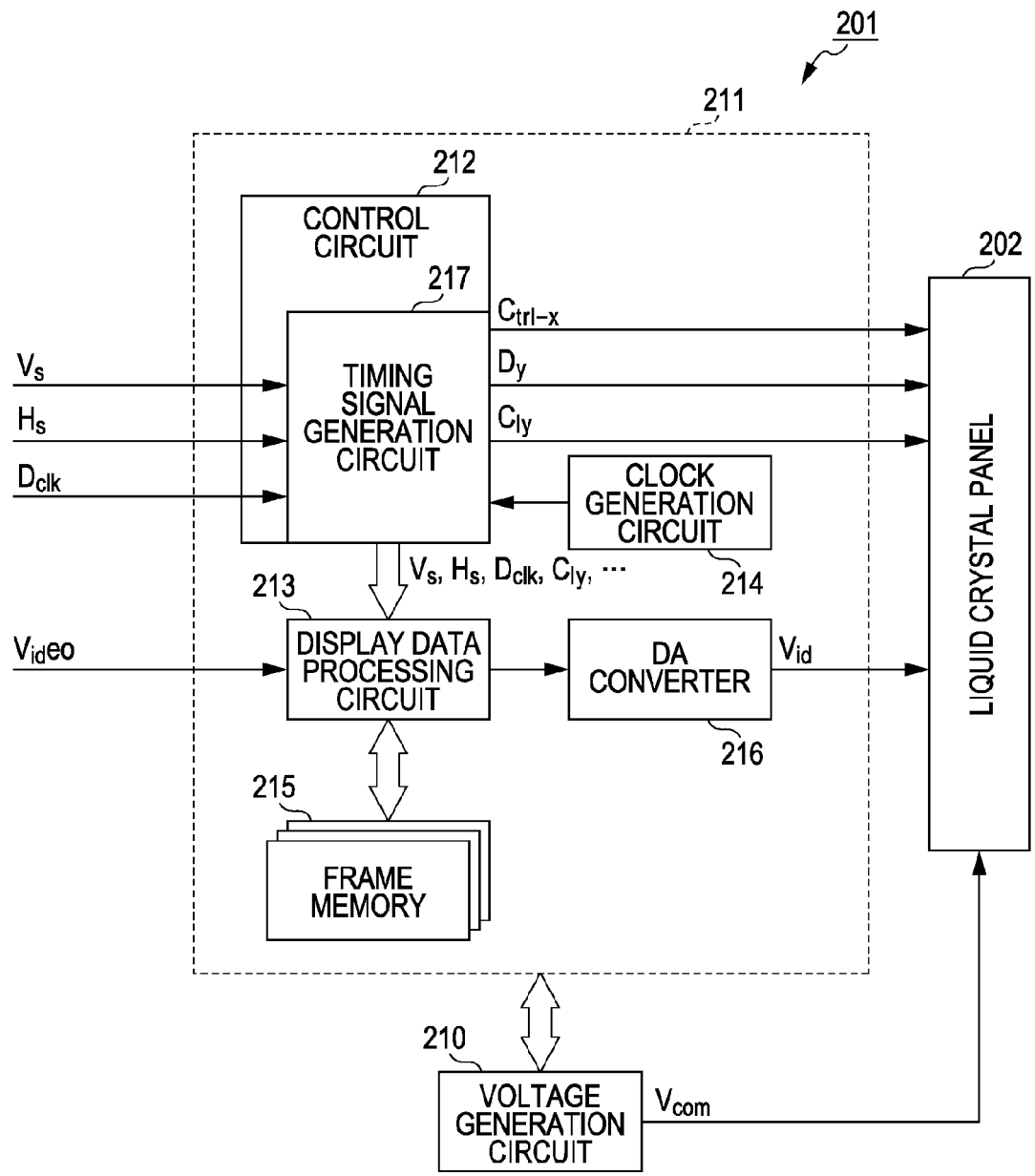
FIG. 1 is a block diagram illustrating the overall configuration of a liquid crystal device according to a first embodiment of the invention.

Hereinafter, embodiments of the invention will be described with reference to the drawings. In the drawings used for the descriptions, there are cases where the dimensions, scale, and so on of the structures shown in the drawings are different from the dimensions, scale, and so on of the actual structure in order to better illustrate the characteristic elements of the invention. Furthermore, there are cases where constituent elements common among the embodiments are indicated by the same reference numerals and detailed descriptions thereof are omitted. It should be noted that the technical scope of the invention is not intended to be limited by the embodiments described hereinafter. Many variations are possible within the stated scope and without departing from the essential spirit of the invention.

Figure 2:
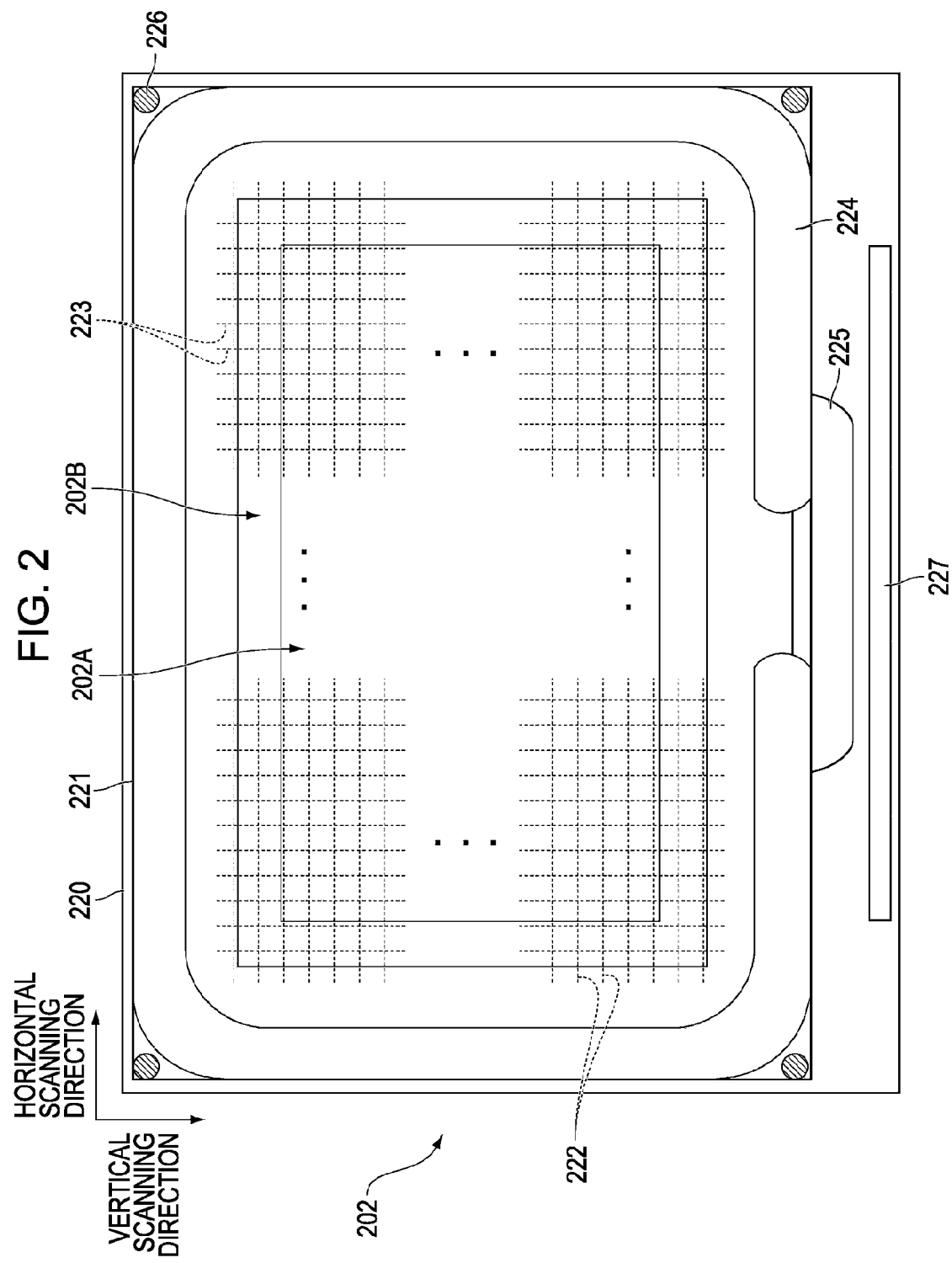
FIG. 2 is a plan view illustrating the overall configuration of a liquid crystal panel.
Figure 3:
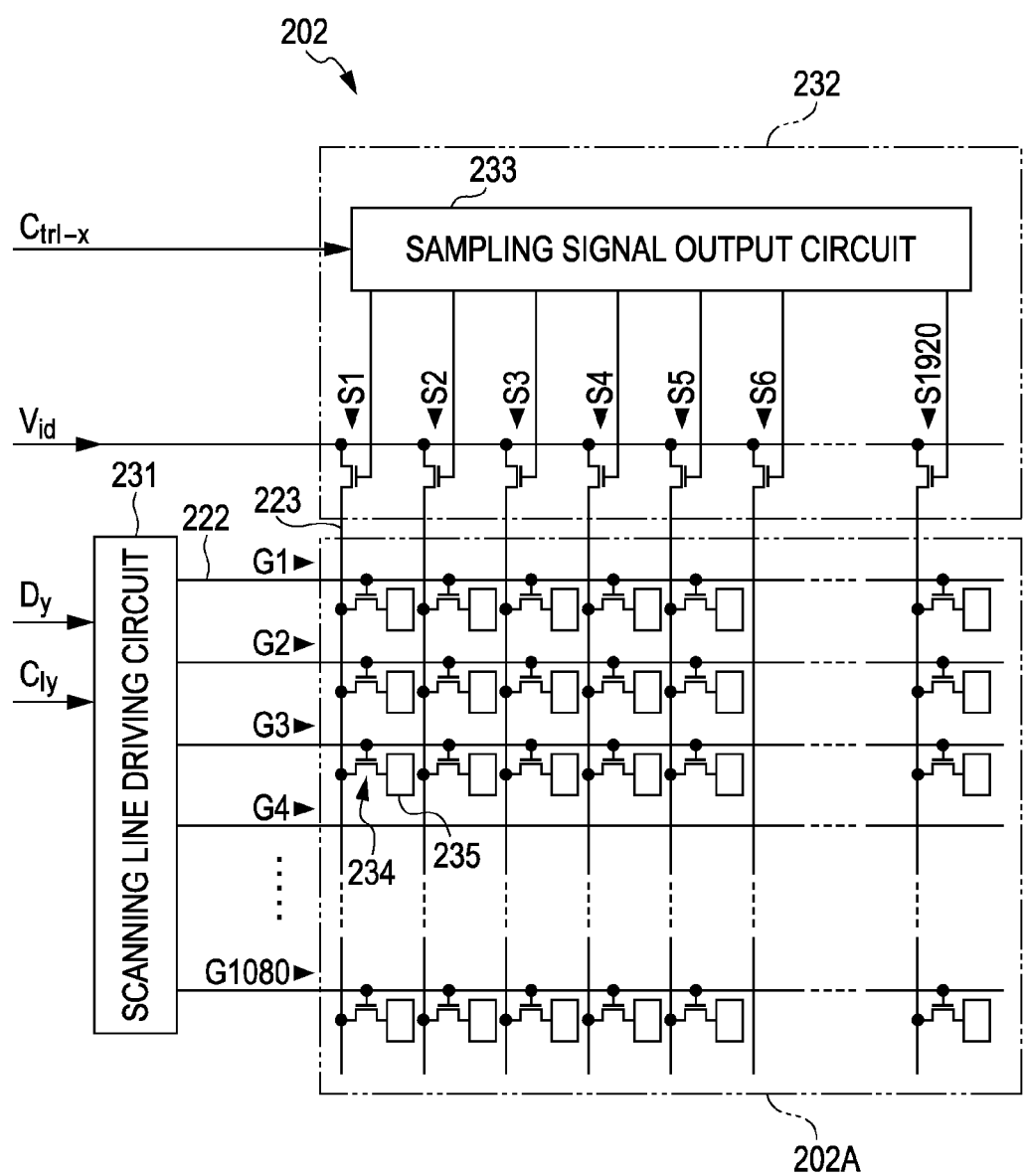
FIG. 3 is a diagram illustrating the circuit configuration of a liquid crystal panel.

FIG. 1 is a block diagram illustrating the overall configuration of a liquid crystal device according to the invention, FIG. 2 is a plan view illustrating the overall configuration of a liquid crystal panel, and FIG. 3 is a diagram illustrating the circuit configuration of the liquid crystal panel.

A liquid crystal device 201 illustrated in FIG. 1 includes a liquid crystal panel 202, a voltage generation circuit 210, and a processing circuit 211. The liquid crystal panel 202 is, for example, an active-matrix driven reflective liquid crystal panel, and details of the configuration thereof will be described later.

The voltage generation circuit 210 includes a DC/DC converter and the like. The voltage generation circuit 210 operates as described below under the control of the processing circuit 211. The voltage generation circuit 210 generates multi-level direct current voltages used by various elements of the liquid crystal device 201. The voltage generation circuit 210 generates an opposing electrode potential $V_{com}$ applied to the opposing electrode of the liquid crystal panel 202, and supplies this potential to the liquid crystal panel 202. The power necessary to generate the stated various types of voltages is supplied to the voltage generation circuit 210 from, for example, a power source that is internal to or external from the liquid crystal device 201.

The processing circuit 211 is configured of a circuit module that controls the operations and so on of the liquid crystal panel 202 in accordance with the output of a data signal $V_{id}$. The processing circuit 211 is connected to the liquid crystal panel 202 by, for example, an FPC (flexible printed circuit) board.

The processing circuit 211 includes a control circuit 212, a display data processing circuit 213, a clock generation circuit 214, a frame memory 215, and a DA converter 216. A timing signal generation circuit 217 is provided in the control circuit 212, and the clock generation circuit 214 is attached to the timing signal generation circuit 217. The control circuit 212 controls the timing signal generation circuit 217, the display data processing circuit 213, and the voltage generation circuit 210.

The clock generation circuit 214 generates a clock signal that serves as a reference for the control operations of the respective elements, and outputs that clock signal to the timing signal generation circuit 217. The timing signal generation circuit 217 generates various types of control signals for controlling the liquid crystal panel 202 in synchronization with a vertical synchronization signal $V_S$, a horizontal synchronization signal $H_S$, and a dot clock signal $D_{clk}$ supplied from an external device (not shown). The timing signal generation circuit 217 inputs a control signal $C_{trl-x}$, a trigger signal $D_y$, and a clock signal $C_{ly}$, generated as the stated control signals, into the liquid crystal panel 202.

The frame memory 215 and the DA converter 216 are attached to the display data processing circuit 213. The display data processing circuit 213 operates as described below under the control of the control circuit 212. The display data processing circuit 213 stores display data $V_{id}$eo supplied from an external device in the frame memory 215. The display data processing circuit 213 reads out the display data $V_{id}$eo from the frame memory 215 in synchronization with the driving of the liquid crystal panel 202, and converts the display data $V_{id}$eo into an analog data signal $V_{id}$ (a driving voltage) using the DA converter 216. Note that the display data $V_{id}$eo defines tones of the pixels in the liquid crystal panel 202; one frame's worth thereof is supplied using the supply timing of the vertical synchronization signal $V_S$ as a trigger, and one line's worth thereof is supplied using the supply timing of the horizontal synchronization signal $H_S$ as a trigger.

The vertical synchronization signal $V_S$ according to this embodiment has a frequency of 120 Hz (a cycle of 8.33 milliseconds), but the applicable scope of the invention is not limited by the frequency of the vertical synchronization signal $V_S$. The dot clock signal $D_{clk}$ defines an interval in which one pixel's worth of the display data $V_{id}$eo is supplied. In other words, the control circuit 212 controls the various elements in synchronization with the supply of the display data $V_{id}$eo.

As shown in FIG. 2, the liquid crystal panel 202 includes an element substrate 220, an opposing substrate 221 disposed opposite to the element substrate 220, and a liquid crystal layer 228 held between the two substrates. The central portion of the liquid crystal panel 202 serves as a display region 202A. The area surrounding the display region 202A, meanwhile, serves as a black display region 202B. Multiple pixels are arranged in the display region 202A in a square grid shape. Here, the descriptions will be given assuming that 1,920×1,080 pixels are arranged in the display region 202A, but the applicable scope of the invention is not limited by the number of pixels in the liquid crystal panel 202. The following descriptions discuss the case where the direction in which the 1,920 pixels are arranged is the horizontal scanning direction and the direction in which the 1,080 pixels are arranged is the vertical scanning direction.

Multiple scanning lines 222 that are approximately parallel to the horizontal scanning direction are provided in the element substrate 220. Likewise, multiple data lines 223 that are approximately parallel to the vertical scanning direction are provided in the element substrate 220. The scanning lines 222 and the data lines 223 are provided in different layers from each other within the element substrate 220, and are not conductive with each other. Each region enclosed by a scanning line 222 and a data line 223 corresponds to a single pixel. Here, a "pixel" refers to the smallest unit of a modulation element that modulates light, and are sometimes referred to as "subpixels" in the case where color images are displayed using an addictive color mixture of two or more base colors. Switching elements that correspond one-to-one with the pixels are provided in the vicinity of the points where the scanning lines 222 and the data lines 223 intersect. The switching elements are configured using TFTs.

A first sealant 224 and a second sealant 225 are provided in the area surrounding the black display region 202B so as to enclose the black display region 202B. The opposing substrate 221 is affixed to the element substrate 220 using the first sealant 224. The first sealant 224 includes an opening, and the second sealant 225 is provided so as to stop up this opening. The liquid crystal layer (not shown) is inserted between the element substrate 220 and the opposing substrate 221 in the region enclosed within the first sealant 224. The liquid crystal layer is sealed between the element substrate 220 and the opposing substrate 221 by covering the opening of the first sealant 224 with the second sealant 225 after the liquid crystal layer has been inserted into this region.

Inter-substrate conductive terminal portions 226 are provided in regions outside of the display region 202A where the element substrate 220 and the opposing substrate 221 overlap; here, these portions are provided in the vicinity of the four corners of the opposing substrate 221. The opposing electrode potential $V_{com}$ generated by the voltage generation circuit 210 is supplied to the element substrate 220, and is then supplied to the opposing substrate 221 via the inter-substrate conductive terminal portions 226.

A scanning line driving circuit (not shown) and a data line driving circuit (also not shown), which will be described later, are provided on the outside of the display region 202A. The multiple scanning lines 222 are electrically connected to the scanning line driving circuit. Likewise, the multiple data lines 223 are electrically connected to the data line driving circuit. A connection terminal portion 227 is provided in an edge portion of the element substrate 220. Multiple connection terminals (not shown) are provided in the connection terminal portion 227. One end of each of the connection terminals is electrically connected to the scanning line driving circuit or the data line driving circuit using pattern wiring or the like. The other end of each of the connection terminals is electrically connected to the processing circuit 211 via the stated FPC board. The scanning line driving circuit and the data line driving circuit are mounted on a mounting terminal portion provided on the element substrate 220.

As shown in FIG. 3, the trigger signal $D_y$ and the clock signal $C_{ly}$ generated by the stated timing signal generation circuit 217 are inputted into a scanning line driving circuit 231. The trigger signal $D_y$ is a signal that defines the timing at which each frame starts. The clock signal $C_{ly}$ is a signal that defines the timing at which a scanning signal is to be supplied to each scanning line during each frame interval. The scanning line driving circuit 231 supplies scanning signals G1 to G1080 to the multiple scanning lines 222 in a line-sequential manner, based on the trigger signal $D_y$ and the clock signal $C_{ly}$. When a scanning signal is supplied to a scanning line 222, a switching element 234 connected to this scanning line 222 is turned on.

A data line driving circuit 232 is configured of a sampling signal output circuit 233 and n-channel type TFTs provided corresponding to each of the data lines 223. The data line driving circuit 232 supplies, to a pixel connected to the selected scanning line 222, tone data defining the tone of that pixel. The data signal $V_{id}$ is inputted into the data line driving circuit 232 as serial data including, for example, the tone data for each of the pixels connected to a single scanning line 222.

The control signal $C_{trl-x}$ generated by the timing signal generation circuit 217 is inputted into the sampling signal output circuit 233. The sampling signal output circuit 233 supplies the tone data forming the stated serial data for each of the pixels to the data lines 223 as parallel data at a timing defined by the control signal $C_{trl-x}$ in accordance with the control signal $C_{trl-x}$. For example, to write tone data to a pixel in a row i and a column j, the data line driving circuit 232 supplies the tone data for the pixel in the row i and the column j to the data line 223 in the jth column at the timing at which the scanning signal is supplied to the scanning line 222 in the ith row. Due to the scanning signal, the switching element 234 belonging to the pixel in the row i and the column j turns on, and the tone data is written into a pixel electrode 235 via the switching element 234.

Figure 4:
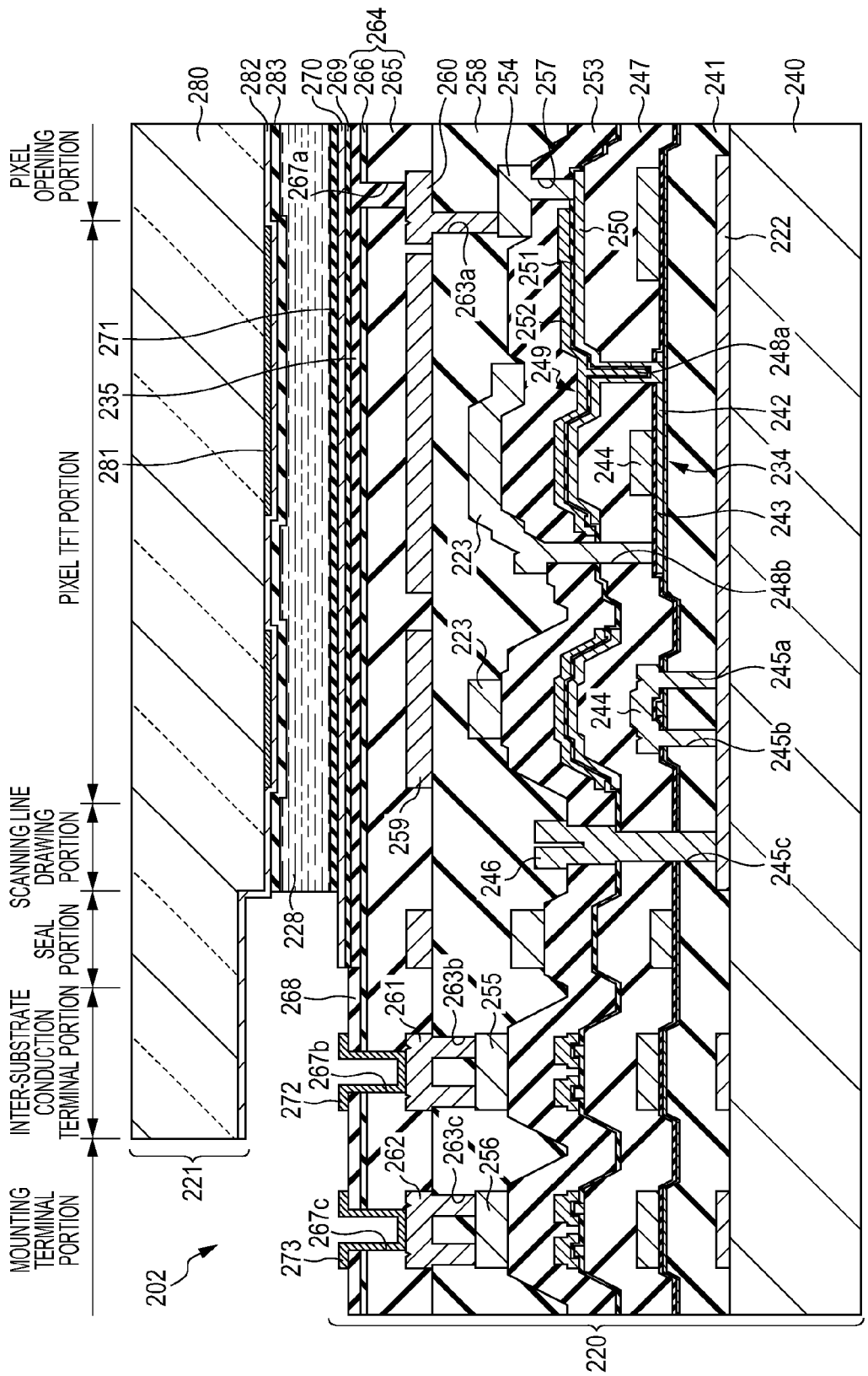
FIG. 4 is a diagram schematically illustrating an enlarged view of the cross-sectional structure of a liquid crystal panel according to the first embodiment.

FIG. 4 is a diagram schematically illustrating an enlarged view of the cross-sectional structure of a liquid crystal panel. For descriptive purposes, the cross-sectional structures of a pixel opening portion, a pixel TFT portion, a scanning line drawing portion, an inter-substrate conductive terminal portion, and the mounting terminal portion in the liquid crystal panel are schematically illustrated in a single cross-sectional view in FIG. 4. Furthermore, FIG. 4 illustrates both a cross-sectional structure including the channel length direction of the switching element and the cross-sectional structure orthogonal to the channel length direction as the pixel TFT portion.

As shown in FIG. 4, the liquid crystal panel 202 has a structure in which the liquid crystal layer 228 is held between the element substrate 220 and the opposing substrate 221. In this embodiment, light emitted from a light source or the like passes through the opposing substrate 221, enters into the liquid crystal layer 228, is reflected by the surface layer of the element substrate 220, and is emitted from the same side of the liquid crystal panel 202 as the side where the light enters. In the descriptions of the cross-sectional structure of the liquid crystal panel 202 that follow, the thicknesses of the various types of constituent elements refer to the dimensions thereof in the thickness direction of the liquid crystal layer 228. The thickness direction of the liquid crystal layer 228 is a direction approximately orthogonal to a pixel arrangement surface (the display region 202A) that includes the pixel arrangement directions (that is, the horizontal scanning direction and the vertical scanning direction). Typically, an element substrate main body 240 and an opposing substrate main body 280, mentioned later, are parallel to each other, and the thickness direction of the liquid crystal layer 228 is a direction that is approximately orthogonal to the surfaces of these substrates.

The element substrate 220 has a layered structure in which the element substrate main body 240 is used as a base, and multiple wiring layers including various types of wires such as the scanning lines 222, the data lines 223, capacitance lines 259, an element layer including the switching elements 234, an electrode layer including the pixel electrodes 235, and so on are layered upon the element substrate main body 240.

The element substrate main body 240 is configured of a glass substrate, a sapphire substrate, a silicon substrate, or the like. The scanning lines 222 are provided on the element substrate main body 240. The scanning lines 222 are configured of, for example, tungsten silicide (WSi). The thickness of the scanning lines 222 is, for example, more than or equal to 180 nm and less than or equal to 220 nm. The scanning lines 222 have light-blocking properties, and are provided in regions that overlap with essentially all of the switching elements 234 when viewed from above, in the thickness direction of the liquid crystal layer 228. Through this, it is difficult for light to enter into the switching elements 234 from the side of the scanning lines 222.

A first inter-layer insulating film 241 configured of, for example, silicon oxide is provided on approximately the entire surface of the element substrate main body 240, including the scanning lines 222. The first inter-layer insulating film 241 is formed through CVD or the like using, for example, tetraethyl orthosilicate (called "TEOS" hereinafter) as the source gas. The thickness of the first inter-layer insulating film 241 is, for example, more than or equal to 380 nm and less than or equal to 420 nm.

The switching elements 234 are provided in the pixel TFT portion upon the first inter-layer insulating film 241. Each switching element 234 includes a semiconductor layer 242, a gate insulation film 243, and a gate electrode 244. The semiconductor layer 242 is configured of, for example, polysilicon, and includes a high-concentration impurity region, a low-concentration impurity region, and a channel region. The high-concentration impurity region is provided on both sides of the channel region in the channel length direction; one side of the high-concentration impurity region is a source region, and the other side of the high-concentration impurity region is a drain region. The semiconductor layer 242 is an N-channel semiconductor layer in which electrons serve as the carrier when the switching elements 234 are on. The thickness of the semiconductor layer 242 is, for example, approximately 40 nm.

The gate insulation film 243 is provided upon the semiconductor layer 242. The gate insulation film 243 is configured of, for example, silicon oxide, and is formed through a thermal oxidation method. The thickness of the gate insulation film 243 is, for example, more than or equal to 43 nm and less than or equal to 56 nm.

The gate electrode 244 is configured of, for example, conductive polysilicon, and is formed in a region that overlaps with the channel region when viewed from above, in the thickness direction of the liquid crystal layer 228. The thickness of the gate electrode 244 is, for example, more than or equal to 15 nm and less than or equal to 105 nm.

First contact holes 245a to 245c, connecting to the scanning lines 222, are provided so as to pass through the first inter-layer insulating film 241 and the gate insulation film 243. Part of the gate electrode 244 is embedded within the first contact holes 245a and 245b, and is electrically connected to the scanning lines 222. The first contract hole 245c is provided in the scanning line drawing portion, and a conductive portion 246 for connecting the scanning lines 222 to the scanning line driving circuit 231 is embedded within the first contact hole 245c.

A second inter-layer insulating film 247 is provided over approximately the entire surface of the element substrate main body 240, covering the switching elements 234. Like the first inter-layer insulating film 241, the second inter-layer insulating film 247 is configured of, for example, silicon oxide, and is formed through CVD or the like. The thickness of the second inter-layer insulating film 247 is, for example, more than or equal to 280 nm and less than or equal to 320 nm.

Second contact holes 248a and 248b are formed, connecting to the high-concentration impurity region of the semiconductor layer 242, passing through the second inter-layer insulating film 247. A storage capacitor 249 is provided upon the second inter-layer insulating film 247 in the pixel TFT portion. The storage capacitor 249 includes a capacitor lower electrode 250, a capacitor insulating film 251, and a capacitor upper electrode 252.

Part of the capacitor lower electrode 250 is embedded within the second contact hole 248a, and is electrically connected to the high-concentration impurity region of the semiconductor layer 242 (that is, the drain region). Furthermore, part of the capacitor lower electrode 250 is electrically connected to a pixel electrode 35. The capacitor lower electrode 250 is configured of, for example, conductive polysilicon, and the thickness thereof is, for example, more than or equal to 95 nm and less than or equal to 105 nm.

The capacitor upper electrode 252 is disposed opposite to the capacitor lower electrode 250 with the capacitor insulating film 251 therebetween. The capacitor upper electrode 252 is configured of, for example, three layers of film, including, in order from the lower layer, a titanium nitride layer (with a thickness of, for example, more than or equal to 47 nm and less than or equal to 53 nm), an aluminum layer (with a thickness of, for example, more than or equal to 142 nm and less than or equal to 158 nm), and a titanium nitride layer (with a thickness of, for example, more than or equal to 97 nm and less than or equal to 103 nm). The potential of the capacitor upper electrode 252 is held at, for example, the opposing electrode potential $V_{com}$ while the liquid crystal layer 228 is being driven.

The capacitor upper electrode 252 has light-blocking properties, and is provided in a region that overlaps with essentially all of the switching elements 234 when viewed from above, in the thickness direction of the liquid crystal layer 228. Through this, it is difficult for light to enter into the switching elements 234 from the side of the liquid crystal layer 228.

When the driving voltage is applied to the pixel electrode 235, the storage capacitor 249 is charged along with the pixel electrode 235. Through this, the percentage of an electrical amount that decreases, caused by leaking at the switching element 234, to the total electrical amount held in the pixel electrode 235 decreases, and thus the influence of the leaking can be reduced as well.

The capacitor insulating film 251 is configured of, for example, silicon oxide, and is formed through a thermal oxidation method. The thickness of the capacitor insulating film 251 is, for example, more than or equal to 3 nm and less than or equal to 5 nm. From the standpoint of increasing the capacity of the storage capacitor 249, the thickness of the capacitor insulating film 251 may be set so as to be thin, yet within a range that ensures the reliability of the film.

A third inter-layer insulating film 253 is provided over approximately the entire surface of the element substrate main body 240, covering the storage capacitor 249. The third inter-layer insulating film 253 is configured of a silicon oxide film formed through plasma CVD using TEOS as the source gas (called a "P-TEOS film" hereinafter). The thickness of the third inter-layer insulating film 253 is, for example, more than or equal to 380 nm and less than or equal to 420 nm.

The data line 223, an intermediate electrode 254 for the pixel electrode, an intermediate electrode 255 for the inter-substrate conductive terminal, and an intermediate electrode 256 for the mounting terminal are provided upon the third inter-layer insulating film 253. The data line 223 according to this embodiment is configured of, for example, four layers of film, including, in order from the lower layer, a titanium layer (with a thickness of, for example, more than or equal to 19 nm and less than or equal to 21 nm), a titanium nitride layer (with a thickness of, for example, more than or equal to 47 nm and less than or equal to 53 nm), an aluminum layer (with a thickness of, for example, more than or equal to 332 nm and less than or equal to 368 nm), and a titanium nitride layer (with a thickness of, for example, more than or equal to 142 nm and less than or equal to 158 nm). The stated second contact hole 248b passes through the third inter-layer insulating film 253. Part of the data line 223 is embedded within the second contact hole 248b, and is electrically connected to one end of the high-concentration impurity region in the semiconductor layer 242 (the source region). The data lines 223 are wiring-patterned upon the third inter-layer insulating film 253 as necessary, and are electrically connected to the intermediate electrode 256 for the mounting terminal.

A third contact hole 257 that connects to the capacitor lower electrode 250 is provided passing through the third inter-layer insulating film 253. Part of the intermediate electrode 254 for the pixel electrode is embedded within the third contact hole 257, and is electrically connected to the capacitor lower electrode 250.

The stated first contact hole 245c passes through the second inter-layer insulating film 247 and the third inter-layer insulating film 253. The conductive portion 246 embedded within the first contact hole 245c is wired by being patterned upon the third inter-layer insulating film 253 as necessary, and is electrically connected to the intermediate electrode for the mounting terminal. The conductive portion 246 is connected to a different intermediate electrode than the intermediate electrode 256 electrically connected to the data lines 223.

The intermediate electrode 255 for the inter-substrate conductive terminal is provided, for example, on the third inter-layer insulating film 253 in the inter-substrate conductive terminal portion. The conductive portion 246, the intermediate electrodes 254 to 256, and the data line 223 are formed together by forming the stated four-layer film and then patterning that film.

A fourth inter-layer insulating film 258 is provided over approximately the entire surface of the element substrate main body 240, covering the data lines 223 and the intermediate electrodes 254 to 256. The fourth inter-layer insulating film 258 is configured of, for example, a P-TEOS film. The surface of the fourth inter-layer insulating film 258 is flattened through the CMP method or the like. The fourth inter-layer insulating film 258 is formed at a thickness that allows for that film to be flattened. Although the thickness of the fourth inter-layer insulating film 258 differs from place to place depending on protrusions and recesses of the base material, the thickness is approximately 600 nm at the thinnest areas and approximately 2,500 nm at the thickest areas.

The capacitance line 259, a second intermediate electrode 260 for the pixel electrode, a second intermediate electrode 261 for the inter-substrate conductive terminal, and a second intermediate electrode 262 for the mounting terminal are provided upon the fourth inter-layer insulating film 258. The capacitance line 259 is wiring-patterned upon the fourth inter-layer insulating film 258 and is electrically connected to the second intermediate electrode 261 for the inter-substrate conductive terminal. Furthermore, the capacitance line 259 is electrically connected to the capacitor upper electrode 252 of the storage capacitor 249 by multilayer wiring (not shown). The capacitance line 259 is configured of, for example, two layers of film, including, in order from the lower layer, an aluminum layer (with a thickness of, for example, more than or equal to 315 nm and less than or equal to 385 nm) and a titanium nitride layer (with a thickness of, for example, more than or equal to 135 nm and less than or equal to 165 nm).

Fourth contact holes 263a to 263c are formed passing through the fourth inter-layer insulating film 258. The fourth contact hole 263a connects to the intermediate electrode 254 for the pixel electrode. Part of the second intermediate electrode 260 for the pixel electrode is embedded within the fourth contact hole 263a, and is electrically connected to the intermediate electrode 254 for the pixel electrode.

The fourth contact hole 263b connects to the intermediate electrode 255 for the inter-substrate conductive terminal. Part of the second intermediate electrode 261 for the inter-substrate conductive terminal is embedded within the fourth contact hole 263b, and is electrically connected to the intermediate electrode 255 for the inter-substrate conductive terminal.

The fourth contact hole 263c connects to the intermediate electrode 256 for the mounting terminal. Part of the second intermediate electrode 262 for the mounting terminal is embedded within the fourth contact hole 263c, and is electrically connected to the intermediate electrode 256 for the mounting terminal. The capacitance line 259 and the second intermediate electrodes 260 to 262 are formed together by forming the stated two-layer film and then patterning that film.

A fifth inter-layer insulating film 264 is provided over approximately the entire surface of the element substrate main body 240, covering the capacitance lines 259 and the second intermediate electrodes 260 to 262. The fifth inter-layer insulating film 264 is configured of, for example, two layers of film, including, in order from the lower layer, a P-TEOS film 265 and a boron silicate glass film 266. There are also cases where a silicate glass film such as NSG (nondoped silicate glass), PSG (phospho silicate glass), BPSG (boron phosphate silicate glass), or the like is used instead of the boron silicate glass film 266. Like the fourth inter-layer insulating film 258, the P-TEOS film 265 is formed at a thickness that allows for that film to be flattened. Although the thickness of the P-TEOS film 265 differs from place to place depending on protrusions and recesses of the base material, the thickness is approximately 600 nm at the thinnest areas and approximately 1,100 nm at the thickest areas. The thickness of the boron silicate glass film is, for example, more than or equal to 55 nm and less than or equal to 95 nm.

The pixel electrode 235 is provided upon the fifth inter-layer insulating film 264. The pixel electrode 235 is an island-shaped element, and one pixel electrode 235 is provided for each pixel. The pixel electrode 235 is configured of, for example, aluminum, and the thickness thereof is, for example more than or equal to 180 nm and less than or equal to 220 nm. Fifth contact holes 267a to 267c are formed passing through the fifth inter-layer insulating film 264. The fifth contact hole 267a connects to the second intermediate electrode 260 for the pixel electrode. Part of the pixel electrode 235 is embedded within the fifth contact hole 267a, and is electrically connected to the second intermediate electrode 260 for the pixel electrode.

A flattening film 268 is provided surrounding the pixel electrode 235. In the display region 202A, the flattening film 268 is formed by filling the areas between multiple pixel electrodes 235. The flattening film 268 is configured of, for example, a P-TEOS film, and the thickness thereof is, for example, more than or equal to 180 nm and less than or equal to 220 nm.

A reflection-enhancing film 269 is provided across the pixel electrodes 235 and the flattening film 268 in the display region 202A. The reflection-enhancing film 269 is configured of, for example, two layers of film, including, in order from the lower layer, a P-TEOS film and a silicon nitride film formed through plasma CVD. The thickness of the P-TEOS film is, for example, more than or equal to 67 nm and less than or equal to 83 nm, and the thickness of the silicon nitride film is, for example, more than or equal to 58 nm and less than or equal to 72 nm.

A dielectric layer 270 is formed upon the reflection-enhancing film 269. The dielectric layer 270 is thinner than the liquid crystal layer 228, and the thickness of the dielectric layer 270 is, for example, more than or equal to 60 nm and less than or equal to 90 nm. The dielectric layer 270 is configured of silicon oxide, which is a material that has a higher resistivity than the liquid crystal layer 228. Because the dielectric layer 270 is thinner than the liquid crystal layer 228 and also has a higher resistivity than the liquid crystal layer 228, it is difficult for an electrical field applied to the liquid crystal layer 228 to be obstructed by the dielectric layer 270. The dielectric layer 270 according to this embodiment is configured of a P-TEOS film having a thickness of approximately 75 nm, and has a more compact constitution than a first orientation film 271, described below.

The first orientation film 271 is provided upon the dielectric layer 270. The first orientation film 271 regulates the orientation state of the liquid crystal layer 228 when an electrical field is not being applied thereto. The first orientation film 271 is configured of a film on which an alignment process has been carried out. The first orientation film 271 according to this embodiment is configured of silicon oxide, and is formed through, for example, oblique deposition, oblique sputtering, or the like. The thickness of the first orientation film 271 is, for example, more than or equal to 40 nm and less than or equal to 80 nm.

An inter-substrate conductive terminal 272 is provided upon the flattening film 268 in the inter-substrate conductive terminal portion. The inter-substrate conductive terminal 272 is configured of, for example, indium tin oxide (ITO), and the thickness thereof is, for example, more than or equal to 135 nm and less than or equal to 165 nm. The aforementioned fifth contact hole 267b passes through the dielectric layer 270, the reflection-enhancing film 269, and the flattening film 268, and connects to the second intermediate electrode 261 for the inter-substrate conductive terminal. Part of the inter-substrate conductive terminal 272 is embedded within the fifth contact hole 267b, and is electrically connected to the second intermediate electrode 261 for the inter-substrate conductive terminal.

A mounting terminal 273 is provided upon the dielectric layer in the mounting terminal portion. The mounting terminal 273 is electrically connected to a terminal of the scanning line driving circuit 231 or the data line driving circuit 232. The mounting terminal 273 is configured of, for example, an indium tin oxide film, and the thickness thereof is, for example, more than or equal to 135 nm and less than or equal to 165 nm. The stated fifth contact hole 267c passes through the flattening film 268 and connects to the second intermediate electrode 262 for the mounting terminal. Part of the mounting terminal 273 is embedded within the fifth contact hole 267c, and is electrically connected to the second intermediate electrode 262 for the mounting terminal.

The opposing substrate 221 is configured using the light-transmissive opposing substrate main body 280 as a base. A light-blocking film 281 is provided on the opposing substrate main body 280. The light-blocking film 281 is provided in a region that overlaps with approximately the entirety of the switching elements 234, when viewed from above in the thickness direction of the liquid crystal layer 228.

An opposing electrode 282 is provided across approximately the entire surface of the opposing substrate main body 280, including the light-blocking film 281. The opposing electrode 282 is configured of a transparent conductive material such as, for example, indium tin oxide or the like. The thickness of the opposing electrode 282 is, for example, more than or equal to 120 nm and less than or equal to 160 nm. The opposing electrode 282 is electrically connected to the inter-substrate conductive terminal 272 in the inter-substrate conductive terminal portion via a conductive member (not shown).

A second orientation film 283 is provided upon the opposing electrode 282 so as to directly touch (make contact with) the opposing electrode 282. Along with the first orientation film 271, the second orientation film 283 regulates the orientation state of the liquid crystal layer 228 when an electrical field is not being applied thereto. The first orientation film 271 and the second orientation film 283 according to this embodiment are vertical orientation films. The second orientation film 283 is, like the first orientation film 271, configured of silicon oxide, and is formed through, for example, oblique deposition, oblique sputtering, or the like. The thickness of the second orientation film 283 is, for example, more than or equal to 40 nm and less than or equal to 80 nm.

Figure 5A:
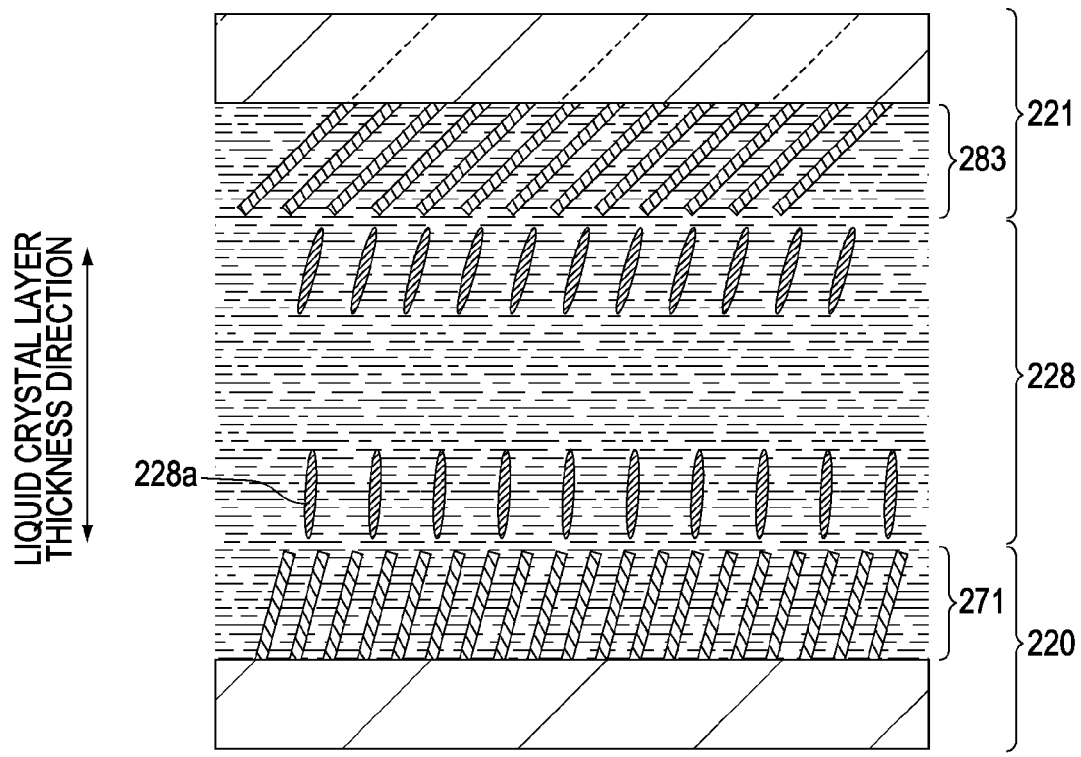
FIG. 5A is a descriptive diagram illustrating an orientation state of a liquid crystal layer.
Figure 5B:
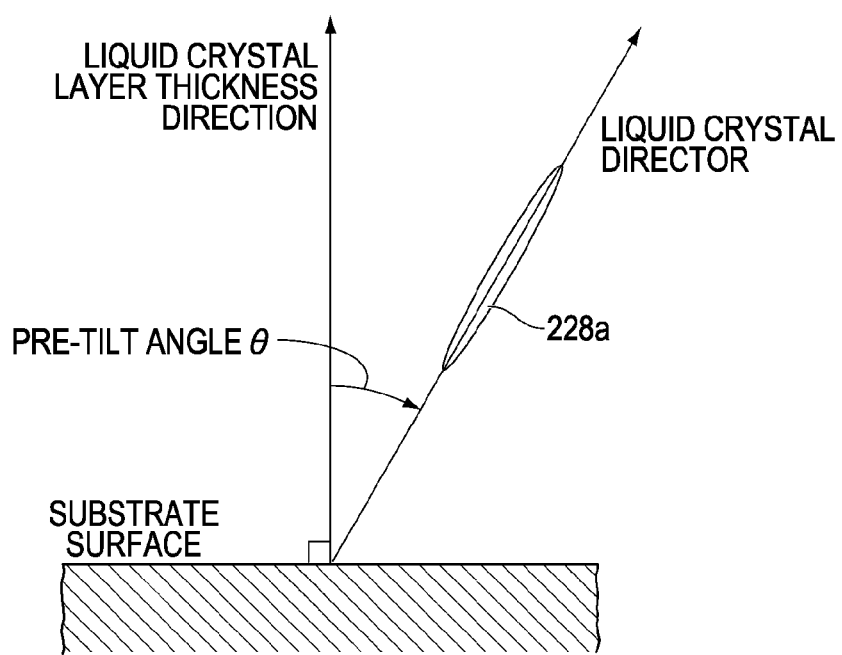
FIG. 5B is a descriptive diagram illustrating the definition of a pre-tilt angle.

FIGS. 5A and 5B are descriptive diagrams illustrating alignment states of the liquid crystal layer, where FIG. 5A is a diagram schematically illustrating the first orientation film, the second orientation film, and liquid crystal molecules in an enlarged state, whereas FIG. 5B is a descriptive diagram illustrating a definition of a pre-tilt angle.

The liquid crystal layer 228 according to this embodiment is a VA mode liquid crystal layer configured of, for example, a liquid crystal material having negative dielectric anisotropy. The thickness of the liquid crystal layer 228 is, for example, more than or equal to 1,600 nm and less than or equal to 2,000 nm. The liquid crystal layer 228 contains liquid crystal molecules 228a, and the liquid crystal molecules 228a are aligned by the orientation regulation force of the first orientation film 271 and the second orientation film 283. A pre-tilt angle θ, which is formed between the director of the liquid crystal molecules 228a and the thickness direction of the liquid crystal layer 228, differs between the pixel electrode 235 side (the element substrate 220 side) and the opposing electrode 282 side (the opposing substrate 221 side).

Specifically, the first orientation film 271 and the second orientation film 283 according to this embodiment have multi-column structures in which a direction that intersects with the thickness direction of the liquid crystal layer 228 is taken as the axial direction. As the angle formed between the axial direction of the column structure and the thickness direction of the liquid crystal layer 228 increases, a greater orientation regulation force, which pulls the liquid crystal director of the liquid crystal molecules 228a toward a direction parallel to the substrate surface, works on the liquid crystal molecules 228a. The angle formed between the axial direction of the column structure of the first orientation film 271 and the thickness direction of the liquid crystal layer 228 is smaller than the angle formed between the axial direction of the column structure of the second orientation film 283 and the thickness direction of the liquid crystal layer 228. Through this, the average value of the pre-tilt angle θ of the liquid crystal layer 228 in the vicinity of the first orientation film 271 is less than the average value in the vicinity of the second orientation film 283. To rephrase, the liquid crystal layer 228 is in an orientation state that is closer to a vertical orientation on the side of the first orientation film 271 than on the side of the second orientation film 283. The pre-tilt angle of the liquid crystal layer 228 according to this embodiment is approximately 1.2° on the side of the pixel electrodes 235 and approximately 7.2° on the side of the opposing electrode 282.

Next, a potential applied to the pixel electrodes 235 (the driving voltage) and a potential applied to the opposing electrode 282 (the opposing electrode potential) will be described with reference to FIGS. 6A and 6B. In addition, a driving method for a liquid crystal device according to this invention will be described based on the stated configuration of the liquid crystal device 201.

Figure 6A:
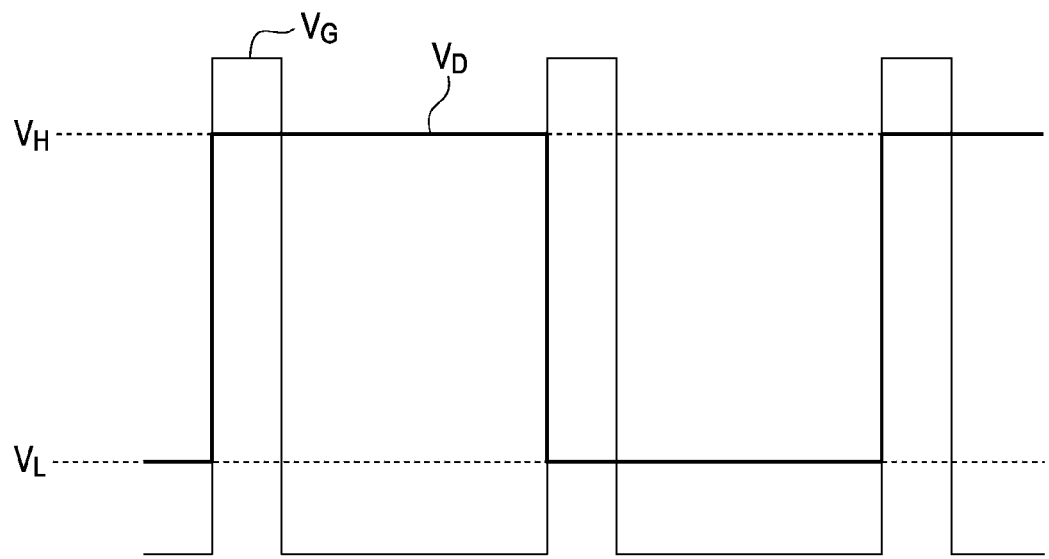
FIG. 6A is a descriptive diagram illustrating a driving voltage.
Figure 6B:
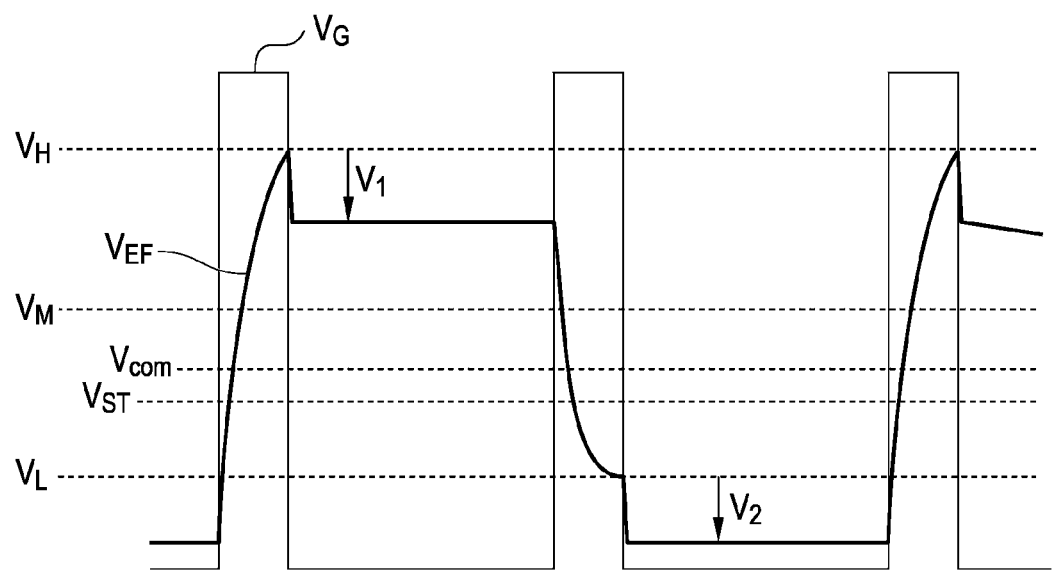
FIG. 6B is a descriptive diagram illustrating an opposing electrode potential.

FIG. 6A is a chart illustrating a gate voltage and a driving voltage, whereas FIG. 6B is a chart illustrating an effective voltage. Note that in FIGS. 6A and 6B, the horizontal axis represents the passage of time from the start of driving, whereas the vertical axis represents a potential. FIG. 6B also illustrates an effective voltage waveform without the influence of leakage.

As shown in FIG. 6A, a driving voltage $V_D$ applied to the pixel electrode 235 when a predetermined tone is to be displayed switches alternately between a high potential $V_H$ (for example, 12 V) and a low potential $V_L$ (for example, 2 V) in synchronization with the rising of a gate voltage $V_G$. The high potential $V_H$ and the low potential $V_L$ switch, for example, every one frame.

As shown in FIG. 6B, when the gate voltage $V_G$ rises, the switching element 234 turns on, and the pixel electrode 235 is charged. The potential of the pixel electrode 235, or in other words, an effective voltage $V_{EF}$ applied to the liquid crystal layer 228, rises essentially to the high potential $V_H$.

When the switching element 234 turns off, the effective voltage $V_{EF}$ drops due to a phenomenon known as field-through (a first phenomenon). Specifically, when a charge accumulated due to parasitic capacitance between the gate electrode 244 and the channel region of the switching element 234 and so on is distributed to the source region and the drain region and flows into the pixel electrode 235, a voltage drop $V_1$ occurs. In actuality, there are also cases where a voltage drop occurs due to leaking during the interval when the switching element 234 is off.

Next, when the gate voltage $V_G$ rises, the driving voltage $V_D$ becomes the low potential $V_L$, the pixel electrode 235 is discharged, and the effective voltage $V_{EF}$ drops to the low potential $V_L$. When the switching element 234 then turns off, a voltage drop $V_2$ occurs due to field-through. In actuality, there are also cases where a voltage rise occurs due to leaking during the interval when the switching element 234 is off.

In a typical liquid crystal device, the opposing electrode is held at a predetermined potential, and the liquid crystal layer 228 undergoes AC driving. This predetermined potential is set in advance, taking into consideration fluctuation in the effective voltage $V_{EF}$ due to field-through and leakage, so that the effective voltage $V_{EF}$ is balanced between the positive polarity (high potential) side and the negative polarity (low potential) side with respect to the predetermined potential.

The stated predetermined potential that takes into consideration the field-through is a potential (a standard potential $V_{ST}$) shifted from an average potential $V_M$ of the high potential $V_H$ and the low potential $V_L$ by an amount equivalent to the average of the absolute value of the amount of change in the effective voltage $V_{EF}$ when the high potential $V_H$ is applied (the voltage drop $V_1$) and the absolute value of the amount of change in the effective voltage $V_{EF}$ when the low potential $V_L$ is applied (the voltage drop $V_2$). The standard potential $V_{ST}$ is expressed by the following Equation (1). Typically, the voltage drop $V_2$ is approximately equal to the voltage drop $V_1$, and the standard potential $V_{ST}$ is a potential that is lower than the average potential $V_M$ by an amount equivalent to the voltage drop $V_1$.

$$V_M - V_{ST} = (V_1 + V_2)/2 \qquad \text{Equation (1)}$$

In order to find this standard potential $V_{ST}$, for example, the effective voltage $V_{EF}$ is measured when a predetermined tone is continuously displayed over multiple frames. The standard potential $V_{ST}$ is then found by searching for a standard potential in which the time average value $V^+$ of the positive polarity potential in a single frame interval is equal to the time average value $V^-$ of the negative polarity potential in a single frame interval. The time average value $V^+$ of the positive polarity potential is expressed by the following Equation (2), and the time average value $V^-$ of the negative polarity potential is expressed by the following Equation (3). T in the Equations (2) and (3) represents the length of a single frame interval.

$$V^+ = \int_0^T (V_{EF} - V_{ST}) dt \qquad \text{Equation (2)}$$

$$V^- = \int_0^T (V_{ST} - V_{EF}) dt \qquad \text{Equation (3)}$$

It is thought that setting the opposing electrode potential to the standard potential $V_{ST}$ in this manner makes it possible to achieve electrical balance between the positive and negative polarities; however, in actuality, electrical charge shift remains in the liquid crystal layer 228 due to differences in the structures of the element substrate 220 and the opposing substrate 221. In this embodiment, the opposing electrode potential $V_{com}$ is set to be higher than the stated standard potential $V_{ST}$ in the case where the pre-tilt angle θ of the liquid crystal layer 228 is lower on the first orientation film 271 side than on the second orientation film 283 side. Through this, asymmetry in the electrical properties caused by the pre-tilt angle of the liquid crystal layer 228 being different on the first orientation film 271 side and the second orientation film 283 side can be canceled out, which makes it possible to reduce the electrical charge shift.

Figure 7:
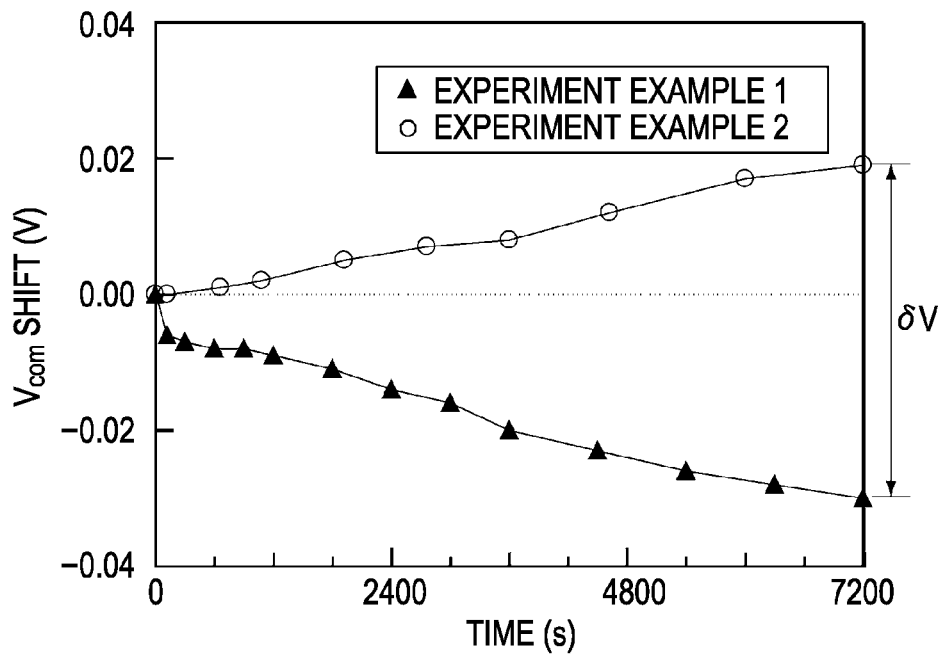
FIG. 7 is a graph illustrating influence on an optimum base potential caused by differences in a pre-tilt angle between an opposing electrode side and a pixel electrode side.

FIG. 7 is a graph illustrating influence on an optimum base potential caused by differences in the pre-tilt angle between the pixel electrode side and the opposing electrode side. In the graph in FIG. 7, data of an experiment example 1 and an experiment example 2 are plotted. The experiment example 1 illustrates data for the liquid crystal device 201, whereas the experiment example 2 illustrates data for a liquid crystal device used for comparison. Aside from the pre-tilt angles of the liquid crystal layer on the pixel electrode side and the opposing electrode side both being approximately 1.2°, the liquid crystal device used for comparison has the same configuration as the liquid crystal device 201.

During the experiments, the opposing electrode potential was set to a standard potential (called an "initial standard potential $V_{STA}$" hereinafter) in both liquid crystal devices, and a predetermined tone was continuously displayed in the liquid crystal devices. The change over time of the effective voltage $V_{EF}$ in the liquid crystal device was then measured, and the standard potential when the electrical balance between the positive and negative polarities was optimized at each point in time (called an "optimum base potential $V_{STB}$" hereinafter) was found using the results of the measurement. The amount of potential change (V) from the initial standard potential $V_{STA}$ to the optimum base potential $V_{STB}$ was then found for each point in time after the start of driving for each of the liquid crystal devices. This amount of potential change is referred to as "$V_{com}$ shift" in the following descriptions. $V_{com}$ shift is expressed through the following Equation (4).

$$V_{com}\text{shift} = V_{STA} - V_{STB} \quad \text{Equation (4)}$$

In the graph shown in FIG. 7, the horizontal axis represents the passage of time from the start of driving, whereas the vertical axis indicates the $V_{com}$ shift at each point in time. As can be seen from the graph shown in FIG. 7, the $V_{com}$ shift in the liquid crystal device used for comparison (experiment example 2) increases as time passes, and generally converges on 0.02 V after 7,200 seconds have passed. On the other hand, unlike in the experiment example 2, the $V_{com}$ shift in the liquid crystal device 201 (experiment example 1) decreases, and generally converges on −0.03 V after 7,200 seconds have passed. By comparing the experiment examples 1 and 2, it can be seen that the $V_{com}$ shift in the liquid crystal device 201 changes in the negative direction relative to the $V_{com}$ shift in the liquid crystal device used for comparison because the pre-tilt angle on the side of the opposing electrode 282 is greater than the pre-tilt angle on the side of the pixel electrodes 235. In other words, the post-convergence optimum base potential $V_{STB}$ is higher than the initial standard potential $V_{STA}$, and therefore, by setting the opposing electrode potential $V_{com}$ to be higher than the initial standard potential $V_{STA}$, the value of the $V_{com}$ shift can be brought close to that in the experiment example 2 in which the pre-tilt angle is approximately the same on the pixel electrode side and the opposing electrode side. This means that the influence exerted on electrical charge shift in the liquid crystal layer 228 by differences in the pre-tilt angles on the side of the pixel electrodes 235 and the side of the opposing electrode 282 can be reduced.

This knowledge is extremely useful when searching for the optimal opposing electrode potential $V_{com}$, from the standpoint of reducing the electrical charge shift. Specifically, to determine the optimal opposing electrode potential, a predetermined tone is continuously displayed in the liquid crystal device 201 and the value at which the $V_{com}$ shift converges after a predetermined amount of driving time has passed is found, as in the stated experiment example 1. Then, while changing the opposing electrode potential among various levels, the value at which the $V_{com}$ shift converges is found for the opposing electrode potential at the various levels. Through this, a correspondence relationship between the opposing electrode potential and the $V_{com}$ shift can be obtained, and thus the opposing electrode potential when the absolute value of the $V_{com}$ shift is minimum can be obtained as the optimal value. In order to obtain the optimal opposing electrode potential using this method, it is necessary to find the value at which the $V_{com}$ shift converges for each opposing electrode potential. In order to find the convergence value for each opposing electrode condition, it is necessary to drive the liquid crystal device for ten minutes to several hours, and thus the measurement normally requires effort and time. Using the aforementioned knowledge, however, it is possible to reduce the number of times the stated value at which the $V_{com}$ shift converges is found, as will be described hereinafter; this makes it possible to reduce the effort and time required when finding the optimal value for the opposing electrode potential.

Figure 8:
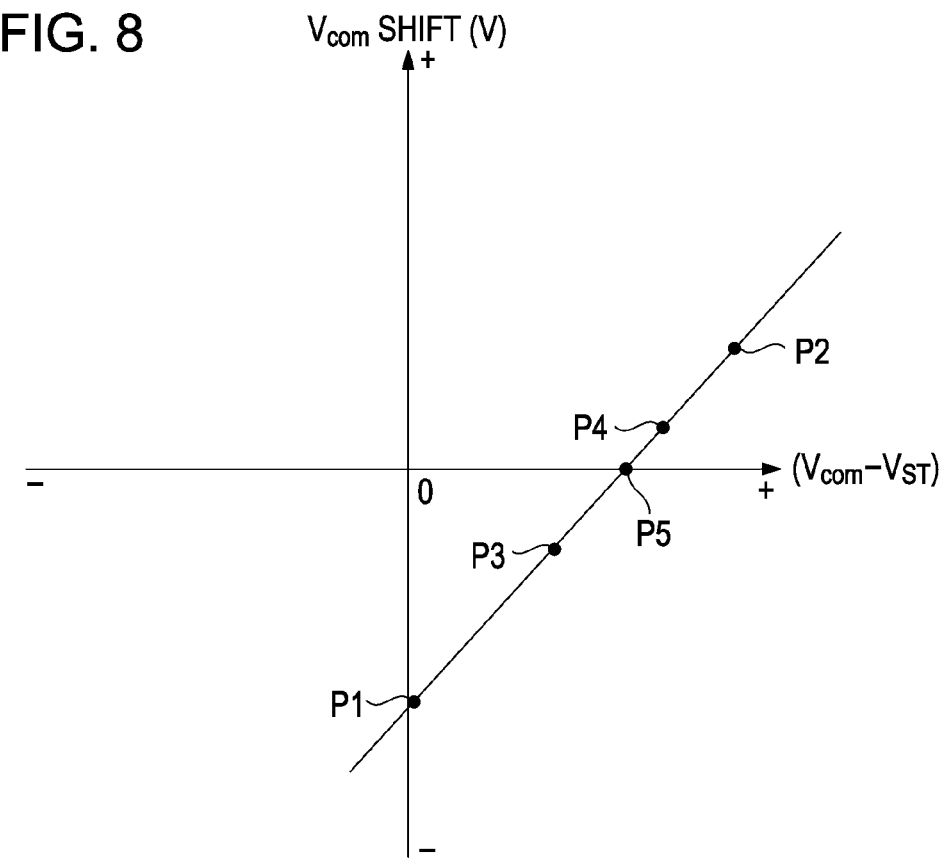
FIG. 8 is a descriptive diagram illustrating a method for determining an opposing electrode potential.

FIG. 8 is a descriptive diagram illustrating an example of a method for determining the opposing electrode potential.

In FIG. 8, the horizontal axis represents the difference between the opposing electrode potential and the standard potential ($V_{com} - V_{ST}$), whereas the vertical axis indicates the value at which the $V_{com}$ shift converges after a predetermined amount of driving time has passed. In FIG. 8, the reference numeral P1 indicates the first point of measurement, the reference numeral P2 indicates the second point of measurement, the reference numeral P3 indicates the third point of measurement, the reference numeral P4 indicates the fourth point of measurement, and the reference numeral P5 indicates the fifth point of measurement. Here, an example in which the measurement is carried out five times will be described, but the number of measurements is not particularly limited.

As shown in FIG. 8, the first measurement point P1 is set to a region in which ($V_{com} - V_{ST}$) is more than or equal to 0. Based on the aforementioned knowledge, in a configuration in which the pre-tilt angle on the side of the pixel electrodes 235 is less than the pre-tilt angle on the side of the opposing electrode 282, the $V_{com}$ shift is minimum in a region where $V_{com}$ is greater than $V_{ST}$, and therefore the searching can be omitted for regions in which ($V_{com} - V_{ST}$) is negative.

Generally speaking, when ($V_{com} - V_{ST}$) increases, the $V_{com}$ shift also increases, and thus in the case where the first measurement result is negative, it can be understood that the $V_{com}$ shift is minimum in a region in which ($V_{com} - V_{ST}$) is greater than at the measurement point P1; therefore, the searching can be omitted for ranges in which ($V_{com} - V_{ST}$) is less than at the measurement point P1.

Meanwhile, in the case where the first measurement result is positive, the second measurement point P2 may be set to within a range in which ($V_{com} - V_{ST}$) is less than at the measurement point P1 and a region in which ($V_{com} - V_{ST}$) is positive. In this manner, using the aforementioned knowledge, the positive/negative direction at which to change the parameters ($V_{com} - V_{ST}$) can be determined based on the first measurement result. Accordingly, the number of times the measurement is carried out can be reduced, which makes it possible to reduce the amount of effort and time required for the measurement.

In this example, the measurement result at the measurement point P1 is negative, and the measurement point P2 is set at a region in which ($V_{com} - V_{ST}$) is sufficiently high (a region in which it can be estimated that the $V_{com}$ shift will be positive). Next, the slope of the $V_{com}$ shift with respect to ($V_{com} - V_{ST}$) is found using the measurement results at the measurement point P1 and the measurement point P2. Using this slope makes it possible to estimate the value of ($V_{com} - V_{ST}$) at which the $V_{com}$ shift will be approximately 0. The measurement point P3 is set between the measurement points P1 and P2 based on this estimation result.

Thereafter, the search range is reduced while estimating the value of ($V_{com} - V_{ST}$) at which the $V_{com}$ shift will be approximately 0 using the measurement results up to the previous time in this manner; this makes it possible to find the value of ($V_{com} - V_{ST}$) at which the $V_{com}$ shift will be approximately 0. The standard potential $V_{ST}$, meanwhile, can be found by measuring the amount by which the effective voltage has dropped due to field-through or the like, and thus the optimal value for the opposing electrode potential $V_{com}$ at which the $V_{com}$ shift is approximately 0 is found.

Note that it is also possible to estimate the optimal value for the opposing electrode potential $V_{com}$ based on a measured value of the $V_{com}$ shift. Assume that the opposing electrode potential $V_{com}$ is set so that the difference between the standard potential $V_{ST}$ and the opposing electrode potential $V_{com}$ ($V_{ST}-V_{com}$) is x % of the amplitudes ($V_H-V_L$) of the driving voltage $V_D$. When a voltage is applied to the liquid crystal layer 228, the charge amount that traverses the liquid crystal layer 228 in a unit period of time corresponds to the current flowing through the liquid crystal layer 228, and thus when the potential of the pixel electrode 235 is positive polarity, a charge amount $q_+$ that moves from the side of the opposing substrate 221 to the side of the element substrate 220 can be expressed using the following Equation (5). Furthermore, when the potential of the pixel electrode 235 is negative polarity, a charge amount $q_-$ that moves from the side of the element substrate 220 to the side of the opposing substrate 221 can be expressed using the following Equation (6). R in Equations (5) and (6) represents the resistance value of the liquid crystal layer 228.

$$q_+ = \int_0^T (1+x) \cdot i dt = \frac{1+x}{R} \int_0^T V_{EF} dt \quad \text{Equation (5)}$$

$$q_- = \int_0^T (1-x) \cdot i dt = \frac{1-x}{R} \int_0^T V_{EF} dt \quad \text{Equation (6)}$$

When the charge amount $q_+$ and the charge amount $q_-$ are the same, theoretically, the electrical charge shift will disappear. Applying the condition that the charge amount $q_+$ and the charge amount $q_-$ are the same to the Equations (5) and (6) results in the relational expression indicated in the following Equation (7). δV in Equation (7) represents a value in which the value at which the $V_{com}$ shift converges in the configuration where the pre-tilt angle δ is approximately the same at the pixel electrode side and the opposing electrode side has been subtracted from the value at which the $V_{com}$ shift converges in the configuration where the pre-tilt angle δ is different for the pixel electrode side and the opposing electrode side (see FIG. 7). E in Equation (7) indicates the half amplitude of the driving voltage $V_D$ illustrated in FIG. 6A, and is ($V_H-V_L$)/2.

$$x = \delta V/2E \quad \text{Equation (7)}$$

In the experiment examples 1 and 2 shown in FIG. 7, δV is −0.05 V and E is 5 V, and thus x is −0.005. ($V_{ST}-V_{com}$) is x·($V_H-V_L$), and is therefore −0.05 V. In other words, it can be seen that in order to eliminate the electrical charge shift caused by the dielectric layer 270, the opposing electrode potential $V_{com}$ should be set 0.05 V higher than the standard potential $V_{ST}$ (0.008 V for each 1° of difference in the pre-tilt angle θ). The allowable range of $V_{com}$ shift in consideration of suppressing the occurrence of flicker, burn-in, and so on has been experimentally shown to be ±0.15 V, and thus ($V_{ST}-V_{com}$) may be set to within a range that is more than or equal to −0.20 V and less than or equal to 0.1 V. In other words, when the pre-tilt angle θ on the side of the pixel electrodes 235 is approximately 1.2° and the pre-tilt angle θ on the side of the opposing electrode 282 is approximately 7.2°, the occurrence of flicker, burn-in, and so on can essentially be suppressed by setting the ratio of the negative polarity voltage to the positive polarity voltage, or ($V_L-V_{com}$)/($V_H-V_{com}$), to be within a range that is more than or equal to 49/51 and less than or equal to 52/48.

According to the liquid crystal device 201 configured as described thus far, the opposing electrode potential $V_{com}$ is lower than the standard potential $V_{ST}$, and thus an electrical charge shift caused by field-through and an electrical charge shift caused by different pre-tilt angles θ on the side of the pixel electrodes 235 and the side of the opposing electrode 282 can both be reduced. Accordingly, the modulation effect of the liquid crystal layer 228 can be prevented from changing due to the electrical charge shift during an interval in which positive and negative polarity potentials are applied, which makes it possible to suppress the occurrence of flicker in an image. Furthermore, the occurrence of the display of a fixed pattern caused by a freeze in the modulation effect of the liquid crystal layer 228 due to electrical charge shift (burn-in) can be suppressed as well.

Furthermore, according to the liquid crystal device driving method of the invention, the opposing electrode potential $V_{com}$ is lower than the standard potential $V_{ST}$ due to the aforementioned reasons, and thus an electrical charge shift caused by field-through and an electrical charge shift caused by different pre-tilt angles θ on the side of the pixel electrodes 235 and the side of the opposing electrode 282 can both be reduced.

Second Embodiment

Next, a liquid crystal device according to a second embodiment will be described. The second embodiment differs from the first embodiment as follows: the pre-tilt angle of the liquid crystal layer is greater on the pixel electrode side than on the opposing electrode side, and the opposing electrode potential $V_{com}$ is lower than the standard potential $V_{ST}$. In this embodiment, the angle formed between the axial direction of the column structure of the first orientation film and the thickness direction of the liquid crystal layer is greater than the angle formed between the axial direction of the column structure of the second orientation film and the thickness direction of the liquid crystal layer.

With a liquid crystal device configured in this manner, it was discovered, by carrying out experiments as per the first embodiment, that when the liquid crystal device used for comparison and the $V_{com}$ shift were compared, the post-convergence $V_{com}$ shift changes to the positive direction, as opposed to the liquid crystal device used for comparison. In other words, in the case where the pre-tilt angle on the pixel electrode side is greater than the pre-tilt angle on the opposing electrode side, the opposing electrode potential $V_{com}$ is set to be lower than the standard potential $V_{ST}$, which makes it possible to reduce the influence on the electrical charge shift of the liquid crystal layer 228 exerted by differing pre-tilt angles on the pixel electrode side and the opposing electrode side.

Third Embodiment

Figure 9:
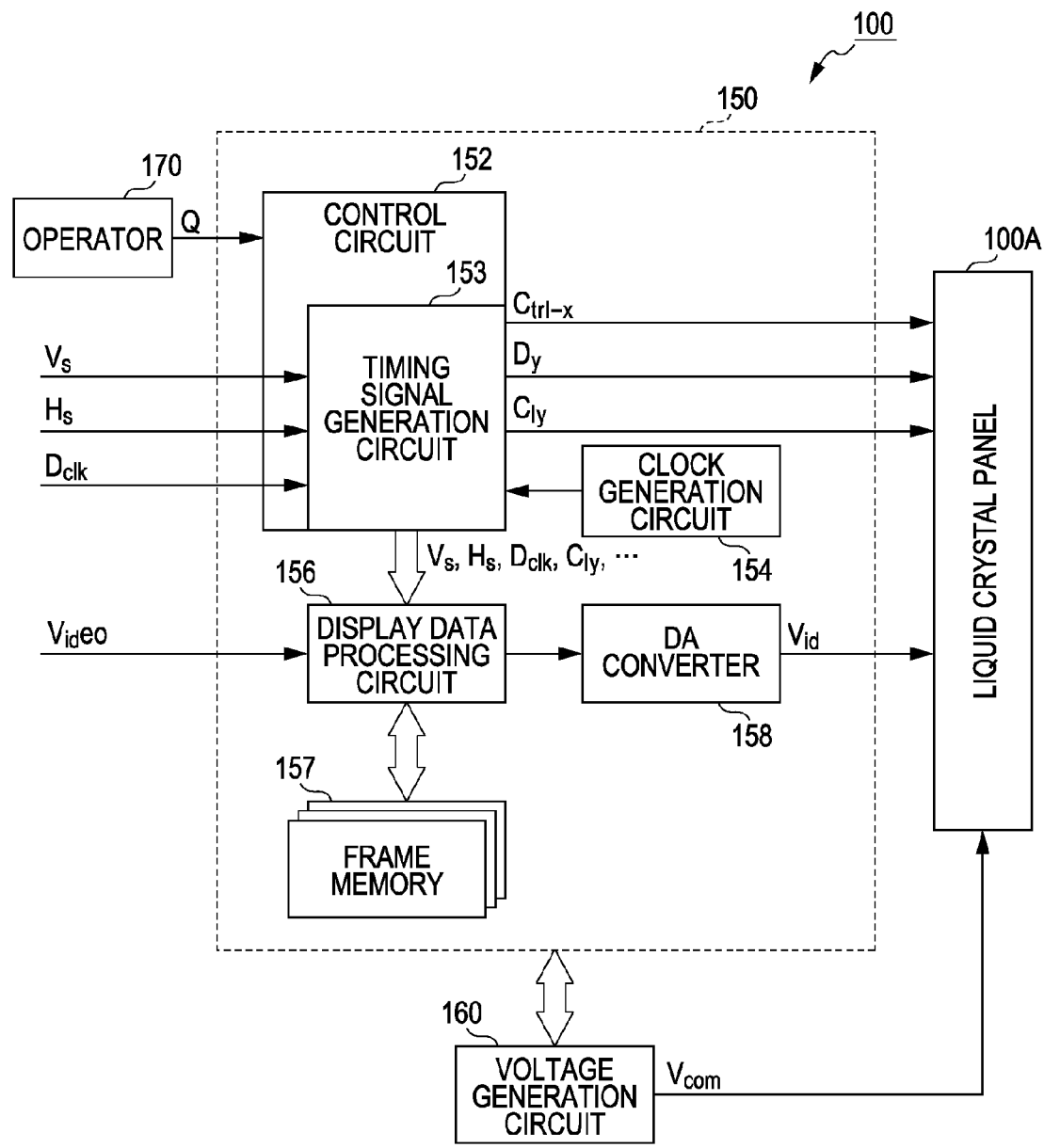
FIG. 9 is a block diagram illustrating the overall configuration of a liquid crystal device according to a third embodiment of the invention.

FIG. 9 is a block diagram illustrating the overall configuration of a liquid crystal device 100 according to a third embodiment of the invention. The liquid crystal device 100 is configured of a liquid crystal panel 100A, a processing circuit 150, a voltage generation circuit 160, and an operator 170. The liquid crystal panel 100A, the processing circuit 150, and the voltage generation circuit 160 are essentially the same as those in the first embodiment.

The operator 170 is operated by, for example, a user, and a specified value Q, in a range from, for example, −10 to 0, can be outputted in accordance with those operations. To be more specific, in the case where the operator 170 is installed in an electronic apparatus, the operator can be operated using an operation unit such as an operation panel, remote controller, or the like of the electronic apparatus. Note that the output timing of a second start pulse Dyb, mentioned later, is moved forward or backward based on this specified value Q.

Figure 10:
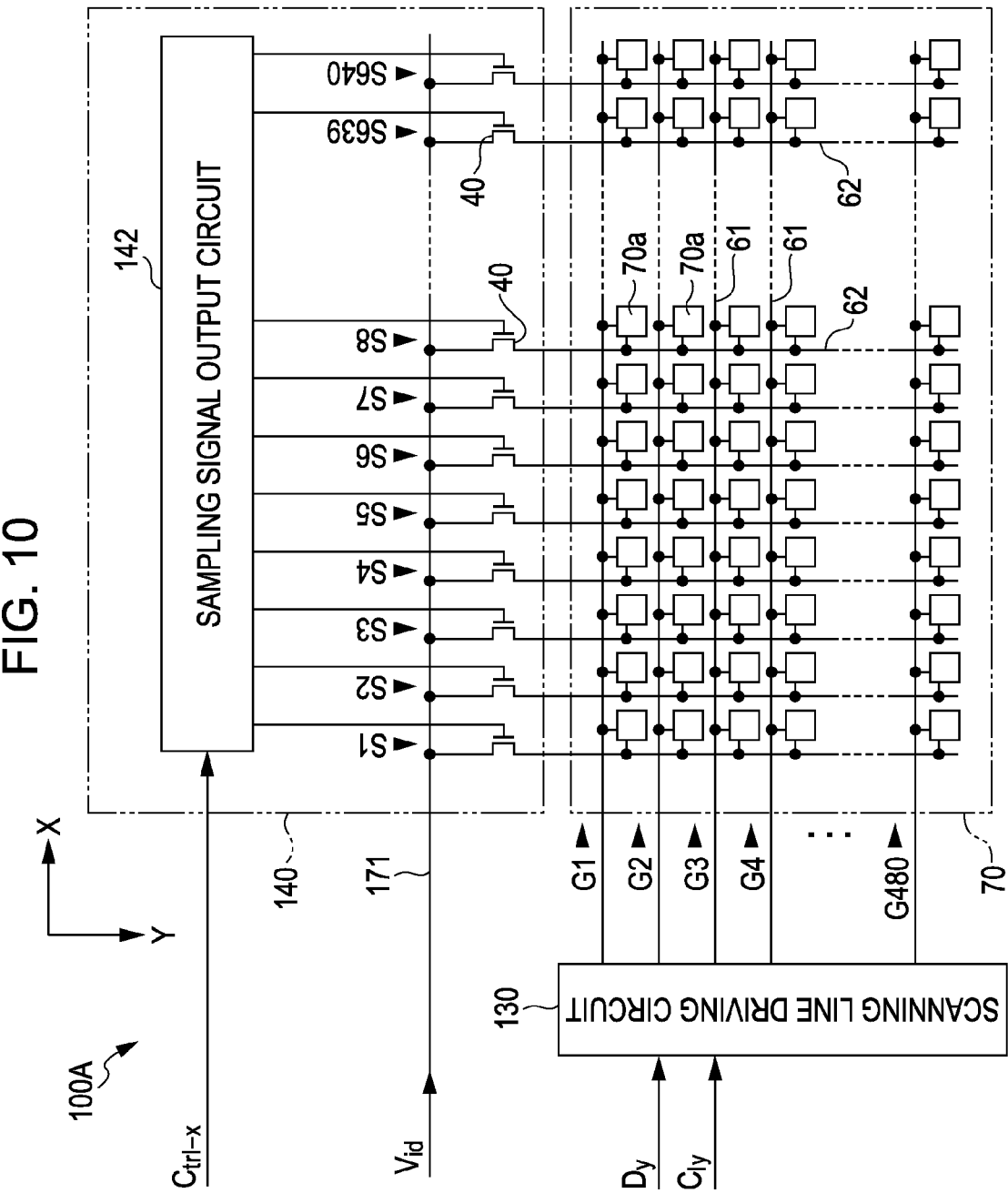
FIG. 10 is a diagram illustrating the overall configuration of a liquid crystal panel according to the third embodiment.
Figure 11:
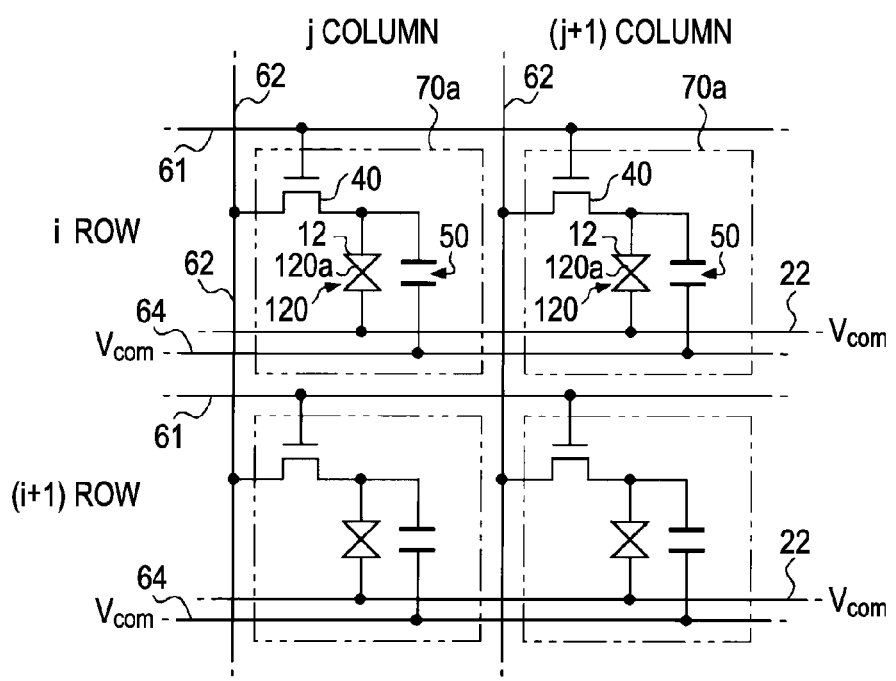
FIG. 11 is an equivalent circuit diagram illustrating pixels.

FIG. 10 is a diagram illustrating the overall configuration of the liquid crystal panel 100A according to the third embodiment. FIG. 11 is an equivalent circuit diagram illustrating pixels.

As shown in FIG. 10, the liquid crystal panel 100A is configured so that a scanning line driving circuit 130 and a data line driving circuit 140 are installed in the periphery of a display region 70. In the display region 70, 480 rows of scanning lines 61 are provided so as to extend in the row (X) direction. Meanwhile, 640 columns of data lines 62 are provided in the display region 70 so as to extend in the column (Y) direction. The data lines 62 are disposed so as to be electrically insulated from the scanning lines 61. Furthermore, multiple pixels 70a are formed corresponding to the intersections of the 480 rows of scanning lines 61 and the 640 columns of data lines 62. Specifically, the multiple pixels 70a are arranged in matrix form, with 480 on the vertical and 640 on the horizontal.

Although the actual resolution is a full HD resolution in which the multiple pixels 70a are arranged in matrix form with 1,080 on the vertical and 1,920 on the horizontal, this embodiment discusses a VGA (Video Graphics Array) resolution for the sake of simplicity. However, the resolution is not limited thereto, and the resolution may be that of, for example, an XGA (eXtended Graphics Array), a SXGA (Super-XGA), or the like.

FIG. 11 illustrates the configuration of a total of four pixels, showing a 2×2 structure of a row i and a row (i+1) that is one row therebelow, and a column j and a column (j+1) that is one column to the right thereof. Note that i and (i+1) indicate the rows in which the pixels are arranged, and are thus integers from 1 to 480 in this example. Likewise, j and (j+1) indicate the columns in which the pixels are arranged, and are thus integers from 1 to 640 in this example. Switching elements 40 that correspond one-to-one with the pixels 70a are provided in the vicinity of the points where the scanning lines 61 and the data lines 62 intersect. These switching elements are configured of thin-film transistors (called "TFTs" hereinafter). Specifically, each of the multiple pixels 70a includes an n-channel TFT 40 and a liquid crystal capacitor 120.

Here, each of the pixels 70a has the same configuration, and thus the pixel in the row i and the column j will be described as a representative example. A gate electrode 41 of the TFT 40 in the pixel in the row i and the column j is connected to the scanning line 61 in the row i. On the other hand, a source electrode of the TFT 40 is connected to the data line 62 in the column j, whereas a drain electrode thereof is connected to a pixel electrode 12, which corresponds to one end of the liquid crystal capacitor 120. The other end of the liquid crystal capacitor 120 is connected to an opposing electrode 22. This opposing electrode 22 is common for all of the pixels, and an opposing electrode potential $V_{com}$ that is temporally constant is applied thereto. Although details will be given later, the opposing electrode potential $V_{com}$ is a value that has been shifted from a standard value by an amount equivalent to a correction voltage for compensating for the DC voltage component in the first phenomenon mentioned earlier.

The liquid crystal panel 100A is configured by affixing a pair of substrates including an element substrate 10 and an opposing substrate 20 with a constant gap therebetween, and filling that gap with liquid crystals. The scanning lines 61, the data lines 62, the TFTs 40, and the pixel electrodes 12 are formed in the element substrate 10 along with the scanning line driving circuit 130 and the data line driving circuit 140. On the other hand, the opposing electrode 22 is formed in the opposing substrate 20. These electrode formation surfaces are then affixed to each other so as to oppose each other, with the constant gap provided therebetween. Accordingly, the liquid crystal capacitor 120 is configured so that liquid crystals 120a are held between the pixel electrode 12 and the opposing electrode 22.

Note that in this embodiment, if the effective voltage value maintained in the liquid crystal capacitor 120 is brought close to 0, the display becomes a black display in which the transmissivity of light that passes through the liquid crystal capacitor 120 is at a minimum. On the other hand, as the effective voltage value maintained in the liquid crystal capacitor 120 increases, the amount of light that is transmitted increases as well, eventually resulting in a white display in which the transmissivity is a maximum. In other words, it is assumed that the liquid crystal panel 100A is set to a normally-black mode.

In this configuration, when the TFT 40 is set to on (conductive) by applying a selection voltage to the scanning line 61 and a data signal $V_{id}$ of a voltage based on a tone (brightness) is supplied to the pixel electrode 12 via the data line 62 and the TFT 40 in the on state, the liquid crystal capacitor 120 corresponding to the position at which the scanning line 61 to which the selection voltage is applied and the data line 62 to which the data signal $V_{id}$ is supplied intersect can be caused to hold an effective voltage value based on the tone.

Note that when the scanning line 61 is at an unselected voltage, the TFT 40 turns off (is nonconductive), but because the off resistance at this time ideally does not become infinitely large, the charge accumulated in the liquid crystal capacitor 120 will leak, not a small amount. In order to reduce the influence of this off leakage, a storage capacitor 50 is formed for each of the pixels. One end of this storage capacitor 50 is connected to the pixel electrode 12 (that is, the drain of the TFT 40). Meanwhile, the other end of the storage capacitor 50 is commonly connected to a capacitor line 64 that spans all of the pixels. This capacitor line 64 is held at a temporally constant potential; for example, at the same opposing electrode potential as the opposing electrode 22.

The scanning line driving circuit 130 supplies scanning signals G1, G2, G3, and so on up to G480 to the scanning lines 61 in the first, second, third, and so on up to the 480th row. The scanning line driving circuit 130 sets the scanning signal to the selected scanning line 61 to an H level corresponding to the selection voltage, and sets the scanning signal to the other scanning lines 61 to an L level corresponding to the nonselection voltage (a ground potential).

The data line driving circuit 140 is configured of a sampling signal output circuit 142 and the n-channel type TFTs 40 provided corresponding to each of the data lines 62. The data line driving circuit 140 supplies, to the pixels 70a on the selected scanning line 61, a data signal $V_{id}$ (driving voltage) that defines the tone of those pixels.

Figure 12:
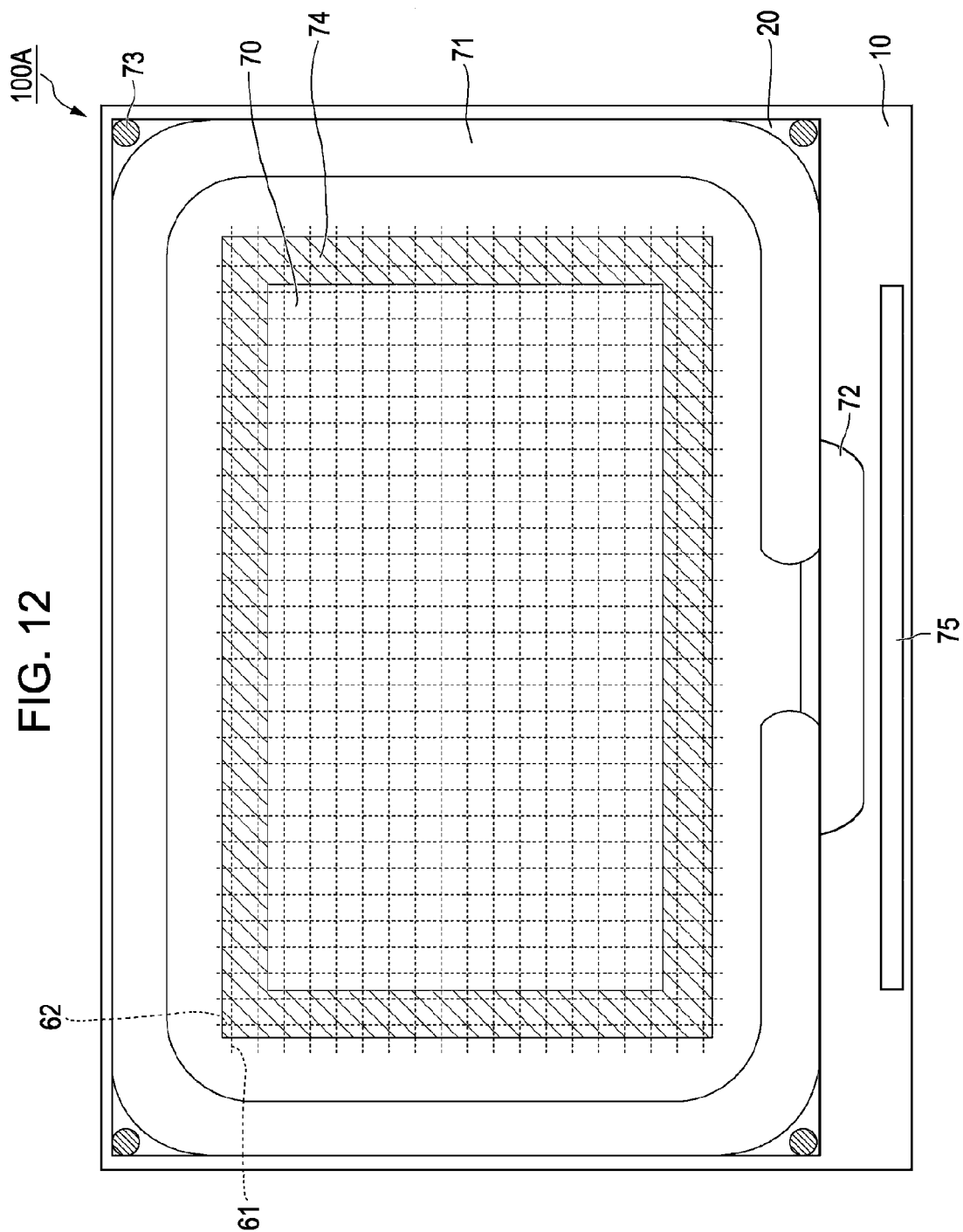
FIG. 12 is a plan view of the liquid crystal panel according to the third embodiment, illustrating an element substrate and various constituent elements formed thereupon as viewed from an opposing substrate.
Figure 13:
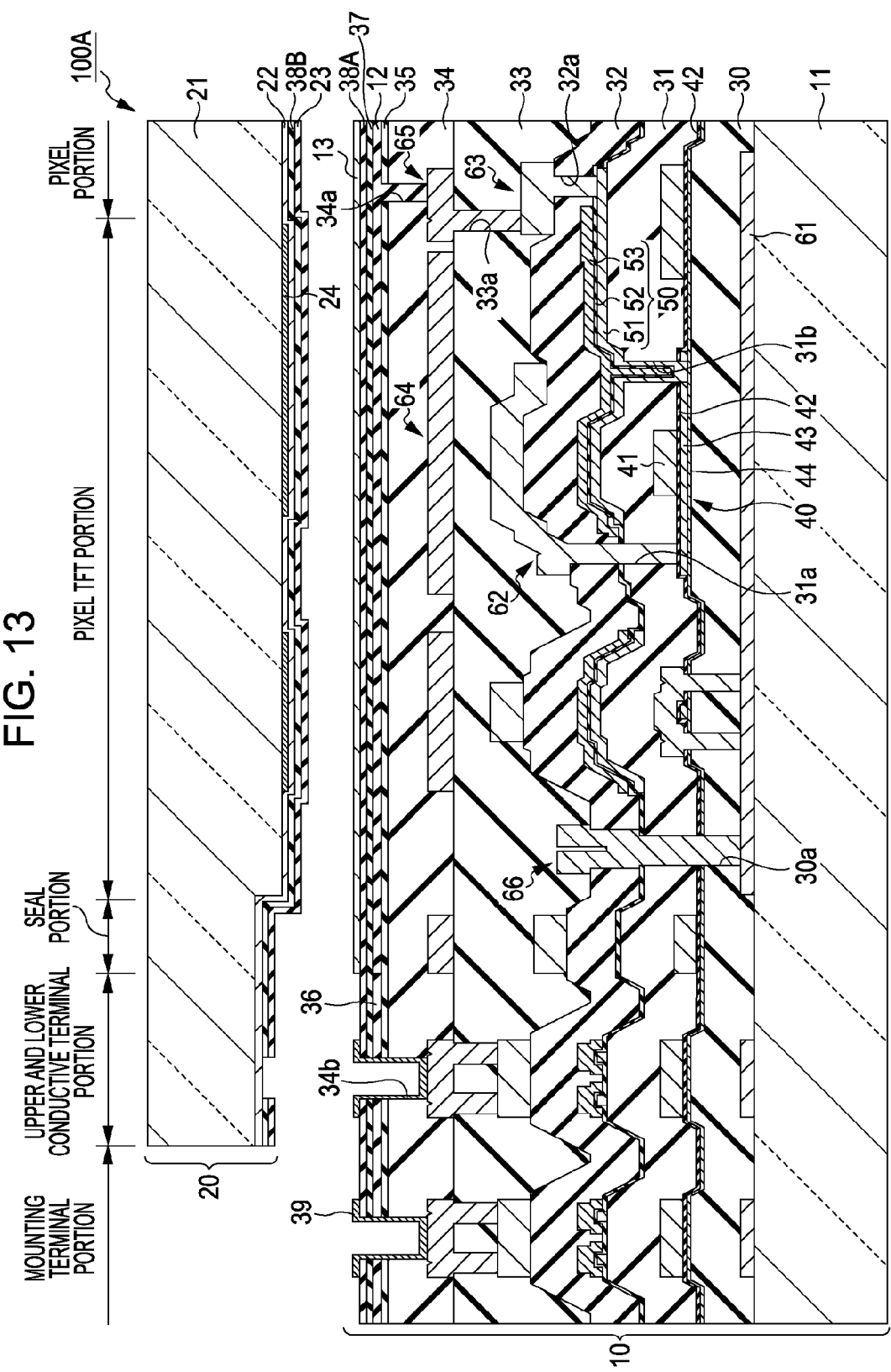
FIG. 13 is a cross-sectional view illustrating the overall configuration of the liquid crystal panel according to the third embodiment.

FIG. 12 is a plan view of the liquid crystal panel 100A according to the third embodiment, illustrating the element substrate 10 and various constituent elements formed thereupon as viewed from the opposing substrate 20. FIG. 13 is a cross-sectional view illustrating the overall configuration of the liquid crystal panel 100A according to the third embodiment. Note that in FIG. 12, the various types of driving circuits, such as the scanning line driving circuit 130 and the data line driving circuit 140, have been omitted for the sake of simplicity. Furthermore, in FIG. 13, the liquid crystal layer and a sealant 71 are omitted for the sake of simplicity.

As shown in FIG. 12, the display region 70 is formed in the center of the element substrate 10. A frame-shaped light-blocking region 74 is provided in the edge areas of the display region 70, and the sealant 71 is disposed so as to surround this light-blocking region 74. The element substrate 10 and the opposing substrate 20 are affixed to each other using the sealant 71, and the region surrounded by the two substrates and the sealant 71 is filled with the liquid crystal layer (not shown). An opening where the liquid crystals have been inserted that is provided in the sealant 71 is sealed by a sealing portion 72.

Although not shown, the scanning line driving circuit 130, which supplies scanning signals to the scanning lines 61, and the data line driving circuit 140, which supplies image signals to the data lines 62, are mounted on the outside of the sealant 71. Multiple connection terminals 75 that connect to external circuitry are provided on the ends of the element substrate 10. Although not shown, wires that extend from the driving circuits are formed in the connection terminals 75. Inter-substrate conductive portions 73 that electrically connect the element substrate 10 and the opposing substrate 20 are provided in the four corners of the sealant 71. These inter-substrate conductive portions 73 are also electrically connected to the connection terminals 75 via wires.

As shown in FIG. 13, the liquid crystal panel 100A includes the element substrate 10, the opposing substrate 20 disposed opposite to the element substrate 10, and a liquid crystal layer held between the two substrates.

The element substrate 10 includes: a substrate main body 11 configured of a light-transmissive material such as glass, silica, or the like; the TFTs 40 and the pixel electrodes 12 formed within the substrate main body 11 (that is, on the side of the liquid crystal layer), and a reflection-enhancing film 37 that covers the pixel electrodes 12; a first orientation base film 38A; a first orientation film 13; and so on.

On the other hand, the opposing substrate 20 includes: a substrate main body 21 configured of a light-transmissive material such as glass, silica, or the like; a light-blocking film 24 formed in the substrate main body 21 (on the side of the liquid crystal layer); the opposing electrode 22 that covers the light-blocking film 24; a second orientation base film 38B that covers the opposing electrode 22; a second orientation film 23; and so on.

The pixel electrodes 12 are provided in the element substrate 10, and the first orientation film 13 is provided thereabove. The pixel electrodes 12 are configured of, for example, a conductive film such as aluminum (Al) or the like.

The opposing electrode 22 is provided across the entire surface of the opposing substrate 20, and the second orientation film 23 is provided thereabove. The opposing electrode 22 is configured of a transparent conductive film such as, for example, an ITO film or the like. The thickness of the opposing electrode 22 is, for example, more than or equal to 120 nm and less than or equal to 160 nm. Meanwhile, the thickness of the second orientation film 23 is, for example, more than or equal to 40 nm and less than or equal to 80 nm.

The liquid crystal layer is formed by inserting liquid crystals into the space surrounded by the sealant 71 and between the element and the like substrate 10 and the opposing substrate 20 that are disposed opposing each other in this manner. When an electrical field is not being applied from the pixel electrodes 12, the liquid crystal layer has a predetermined orientation state as a result of the orientation films. It should be noted that the liquid crystals in the liquid crystal layer may be twisted nematic liquid crystals, vertically-oriented liquid crystals, or the like.

In addition to the aforementioned pixel electrodes 12 and the first orientation film 13, the configurations that include those elements upon the element substrate 10 form a layered structure. This layered structure is made up of, in order from the bottom layer, a first layer including the scanning lines 61; a second layer including the TFTs 40 that in turn include the gate electrodes 41; a third layer including the storage capacitors 50; a fourth layer including the data lines 62 and the like; a fifth layer including the capacitance lines 64 and the like; and a sixth layer (the uppermost layer) including the aforementioned pixel electrodes 12 and the orientation film (the first orientation film 13).

A ground insulation film 30 is provided between the first layer and the second layer; a first inter-layer insulation film 31 is provided between the second layer and the third layer; a second inter-layer insulation film 32 is provided between the third layer and the fourth layer; a third inter-layer insulation film 33 is provided between the fourth layer and the fifth layer; and a fourth inter-layer insulation film 34 and a fifth inter-layer insulation film 35 are provided between the fifth layer and the sixth layer. The aforementioned constituent elements are prevented from short-circuiting by these insulation films. Furthermore, contact holes and the like that electrically connect, for example, high-concentration source regions within semiconductor layers 44 of the TFTs 40 to the data lines 62 are provided in these various insulation films. These constituent elements will be described hereinafter in order from the bottom up.

The scanning lines 61, configured of, for example, tungsten silicide (WSi), are provided in the first layer. The thickness of the scanning lines 61 (the thickness in the Z direction (that is, the thickness direction of the liquid crystal panel 100A)) is, for example, more than or equal to 180 nm and less than or equal to 220 nm. These scanning lines 61 have light-blocking properties, and are formed so as to essentially fill in the regions in which the pixel electrodes 12 are not formed. Accordingly, the scanning lines 61 function so as to block light attempting to enter into the TFTs 40 from therebelow.

The TFTs 40 including the gate electrodes 41 are provided in the second layer. The TFTs 40 have an LDD (Lightly Doped Drain) structure. As a constituent element, each TFT is configured so as to include: the stated gate electrode 41; a semiconductor layer 44 channel region, configured of, for example, a conductive polysilicon film, and forming a channel through the electrical field from the gate electrode 41; a gate insulation film 42 including a thermally-oxidized gate insulation film 43 that insulates the gate electrode 41 from the semiconductor layer 44; and, in the semiconductor layer 44, a low-concentration source region, a low-concentration drain region, a high-concentration source region, and a high-concentration drain region. Note that the thickness of the gate electrode 41 is, for example, more than or equal to 15 nm and less than or equal to 105 nm. The thickness of the semiconductor layer 44 is, for example, approximately 40 nm. Furthermore, the thickness of the thermally-oxidized gate insulation film 43 is, for example, more than or equal to 28 nm and less than or equal to 35 nm. Finally, the thickness of the gate insulation film 42 is, for example, more than or equal to 43 nm and less than or equal to 56 nm.

The ground insulation film 30, configured of, for example, tetraethyl orthosilicate (TEOS), is provided above the scanning lines 61 and below the TFTs 40. The thickness of the ground insulation film 30 is, for example, more than or equal to 380 nm and less than or equal to 420 nm. The ground insulation film 30 functions so as to insulate the scanning line 61 and TFT 40 layers from each other. Furthermore, this ground insulation film 30 is formed across the entire surface of the element substrate 10.

The storage capacitors 50 are provided in the third layer. Each storage capacitor 50 is formed by disposing a lower capacitance electrode 51, serving as a pixel potential capacitance electrode connected to the high-concentration drain region of the TFT 40 and the pixel electrode 12, opposite to an upper capacitance electrode 53, serving as a fixed potential capacitance electrode, with a capacitor insulation film 52 provided therebetween. With this storage capacitor 50, it is possible to significantly increase the potential holding properties of the pixel electrode 12.

The lower capacitance electrode 51 is configured of, for example, a conductive polysilicon film, and serves as a pixel potential capacitance electrode. The thickness of the lower capacitance electrode 51 is, for example, more than or equal to 95 nm and less than or equal to 105 nm. In addition to functioning as the pixel potential capacitance electrode, the lower capacitance electrode 51 functions so as to relay a connection between the pixel electrode 12 and the high-concentration drain region of the TFT 40.

The upper capacitance electrode 53 has a three-layer structure including, for example, a layer configured of titanium nitride (TiN) (with a thickness of, for example, more than or equal to 47 nm and less than or equal to 53 nm), a layer configured of aluminum (Al) (with a thickness of, for example, more than or equal to 142 nm and less than or equal to 158 nm), and a layer configured of titanium nitride (TiN) (with a thickness of, for example, more than or equal to 97 nm and less than or equal to 103 nm). The upper capacitance electrode 53 functions as a fixed potential capacitance electrode of the storage capacitor 50. The upper capacitance electrode 53 has the same shape as the lower capacitance electrode 51, and like the lower capacitance electrode 51, configures an island-shaped electrode. In order to set the upper capacitance electrode 53 to a fixed potential, the upper capacitance electrode 53 is electrically connected to the capacitor line 64, which has a fixed potential. Furthermore, the upper capacitance electrode 53 functions so as to block light attempting to enter into the TFT 40 from above.

The capacitor insulation film 52 is configured of, for example, an HTO (High Temperature Oxide) film. The thickness of the capacitor insulation film 52 is, for example, more than or equal to 3 nm and less than or equal to 5 nm. Note that from the standpoint of enlarging the storage capacitor 50, it is preferable for the capacitor insulation film 52 to be as thin as possible while achieving a sufficient reliability. Furthermore, the capacitor insulation film 52 may be configured so as to have a layered structure including two layers, three layers, or more.

The first inter-layer insulation film 31, configured of, for example, tetraethyl orthosilicate (TEOS), is formed above the TFT 40 through the gate electrode 41 and an intermediate electrode, and below the storage capacitor 50. The thickness of the first inter-layer insulation film 31 is, for example, more than or equal to 280 nm and less than or equal to 320 nm.

A contact hole 31a that electrically connects the high-concentration source region of the TFT 40 to the data line 62 is provided in the first inter-layer insulation film 31, passing through the second inter-layer insulation film 32, mentioned later. Furthermore, a contact hole 31b that electrically connects the high-concentration drain region of the TFT 40 to the lower capacitance electrode 51 of the storage capacitor 50 is provided in the first inter-layer insulation film 31.

The data lines 62 are provided in the fourth layer. The data lines 62 are formed as a film having a four-layer structure that is made up of, in order from the bottom layer, a layer configured of titanium (Ti) (with a thickness of, for example, more than or equal to 19 nm and less than or equal to 21 nm), a layer configured of titanium nitride (TiN) (with a thickness of, for example, more than or equal to 47 nm and less than or equal to 53 nm), a layer configured of aluminum (Al) (with a thickness of, for example, more than or equal to 332 nm and less than or equal to 368 nm), and a layer made up of titanium nitride (TiN) (with a thickness of, for example, more than or equal to 142 nm and less than or equal to 158 nm).

A capacitance line intermediate layer (not shown), a first intermediate electrode 63, and a dual contact portion 66 are formed in this fourth layer as the same film as the data lines 62. These are formed, when viewed from above, so that the areas between the respective elements are fragmented through patterning, rather than being formed so as to have a planar shape that continues from the data lines 62. The capacitance line intermediate layer, the first intermediate electrode 63, and the dual contact portion 66 are formed as the same film as the data lines 62, and thus configure a four-layer structure having, from the bottom layer in order, a layer configured of Ti, a layer configured of TiN, a layer configured of Al, and a layer configured of TiN. The dual contact portion 66 is provided on the outside of the display region 70, and is connected to the scanning line driving circuit 130 by first being patterned wired (not shown) and then being pulled through the surface layer of the element substrate 10.

The second inter-layer insulation film 32, which is configured of, for example, a silicate glass film such as NSG, PSG, BSG, BPSG, or the like, a silicon nitride film, a silicon oxide film, or the like, or preferably, a film formed through plasma CVD using a TEOS gas (called "P-TEOS" hereinafter), is formed above the storage capacitor 50 and below the data line 62. The thickness of the second inter-layer insulation film 32 is, for example, more than or equal to 380 nm and less than or equal to 420 nm. The aforementioned contact hole 31a that electrically connects the high-concentration source region of the TFT 40 to the data line 62 and a contact hole (not shown) that electrically connects the stated capacitance line intermediate layer to the upper capacitance electrode 53 of the storage capacitor 50 are provided in the second inter-layer insulation film 32.

The capacitor line 64 is formed in the fifth layer. The capacitor line 64 is formed as a film that has a dual-layer structure having, for example, from the bottom layer in order, a layer configured of aluminum (Al) (with a thickness of, for example, more than or equal to 315 nm and less than or equal to 385 nm) and a layer configured of titanium nitride (TiN) (with a thickness of, for example, more than or equal to 135 nm and less than or equal to 165 nm). The capacitor line 64 is formed on the third inter-layer insulation film 33. The surface of the third inter-layer insulation film 33 is flattened by carrying out a flattening process such as a CMP (chemical mechanical polishing) process or the like.

In addition, a second intermediate electrode 65 is formed in the fifth layer as the same film as the capacitor line 64. The second intermediate electrode 65 functions so as to relay an electrical connection between the first intermediate electrode 63 and the pixel electrode 12 via a contact hole 33a, which will be mentioned later. The space between the capacitor line 64 and the second intermediate electrode 65 is formed so that the areas between the respective elements are fragmented through patterning, rather than being formed so as to be continuous in a planar shape. The second intermediate electrode 65 has, like the capacitor line 64, a dual-layer structure having a layer configured of Al as the bottom layer and a layer configured of TiN as the top layer. In this manner, the capacitor line 64 and the second intermediate electrode 65 include aluminum, which has comparatively superior light-reflecting properties, and titanium nitride, which has comparatively superior light-absorption properties; accordingly, these elements can function as a light-blocking layer. In other words, it is possible to stop the progress of light entering into semiconductor layer 44 of the TFT 40 above that layer.

The third inter-layer insulation film 33, configured of, for example, P-TEOS, is formed above the data line 62 and below the capacitor line 64 and so on. The thickness of the third inter-layer insulation film 33 is, for example, more than or equal to 570 nm and less than or equal to 630 nm. A contact hole (not shown) for electrically connecting the stated capacitor line 64 and the capacitance line intermediate layer and the contact hole 33a for electrically connecting the second intermediate electrode 65 and the first intermediate electrode 63 are provided in the third inter-layer insulation film 33.

Finally, the pixel electrodes 12 described earlier are formed in a matrix form in the sixth layer. Each pixel electrode 12 is configured of, for example, aluminum (Al), and the thickness thereof is, for example, more than or equal to 180 nm and less than or equal to 220 nm.

Meanwhile, a flattening film 36 configured of, for example, P-TEOS is formed as the same film as the aforementioned pixel electrodes 12 in a region surrounding the pixel electrodes 12. The thickness of the flattening film 36 is, for example, more than or equal to 180 nm and less than or equal to 220 nm.

The reflection-enhancing film 37 is formed upon the pixel electrodes 12 and the flattening film 36. The reflection-enhancing film 37 is formed as a film having a dual-layer structure, having, for example, from the bottom layer in order, a layer configured of P-TEOS (with a thickness of, for example, more than or equal to 67 nm and less than or equal to 83 nm) and a layer configured of plasma silicon nitride (P—SiN) (with a thickness of, for example, more than or equal to 58 nm and less than or equal to 72 nm).

The first orientation base film 38A configured of, for example, P-TEOS is formed upon the reflection-enhancing film 37. The thickness of the first orientation base film 38A is, for example, more than or equal to 90 nm and less than or equal to 110 nm.

The first orientation film 13 is formed upon the first orientation base film 38A. The thickness of the first orientation film 13 is, for example, more than or equal to 40 nm and less than or equal to 80 nm. Meanwhile, a first pre-tilt angle in the first orientation film 13, which takes the thickness direction of the element substrate 10 as a reference, is, for example, 1.2°. Specifically, the first orientation film 13 is formed by depositing, for example, an inorganic material such as silicon oxide upon the element substrate 10 from an oblique direction (oblique deposition) or sputtering. When the inorganic material is deposited or sputtered upon the element substrate 10, the deposited particles or sputtered particles accumulate on the element substrate 10 from an oblique direction, forming column-shaped liquid crystal bodies. The first orientation film 13 is formed by the multiple column-shaped liquid crystal bodies that have grown obliquely. The liquid crystal molecules align along the growth direction of the column-shaped liquid crystal bodies. The alignment direction of the liquid crystal molecules is controlled by the entry angle of the deposited particles or sputtered particles relative to the element substrate 10. The first orientation film 13 aligns the liquid crystal molecules in a direction that is slanted from the vertical direction relative to the element substrate 10 (that is, the thickness direction of the element substrate 10) by a predetermined pre-tilt angle. If the pre-tilt angle when the liquid crystal molecules are aligned in the vertical direction relative to the element substrate 10 is defined as 0°, the first pre-tilt angle in the first orientation film 13 is, for example, 1.2°.

An electrode pad 39, configured of, for example, an ITO film, is formed upon the first orientation base film 38A in a surrounding region aside from an element portion (for example, the mounting terminal portion and the upper and lower conductive terminal portion). The thickness of the electrode pad 39 is, for example, more than or equal to 135 nm and less than or equal to 165 nm. Part of the electrode pad 39 is embedded within a contact hole that passes through the fourth inter-layer insulation film 34, the fifth inter-layer insulation film 35, the flattening film 36, the reflection-enhancing film 37, and the first orientation base film 38A, and is electrically connected to the capacitor line 64.

The fourth inter-layer insulation film 34 configured of P-TEOS (with a thickness of, for example, more than or equal to 350 nm and less than or equal to 850 nm) and the fifth inter-layer insulation film 35 configured of a silica glass such as BSG or NSG (with a thickness of, for example, more than or equal to 55 nm and less than or equal to 95 nm) are formed, for example, in that order from the bottom layer, below the pixel electrodes 12 and the flattening film 36. A contact hole 34a for electrically connecting the pixel electrode 12 and the stated second intermediate electrode 65 is provided in the fourth inter-layer insulation film 34 and the fifth inter-layer insulation film 35.

The pixel electrode 12 and the TFT 40 are electrically connected via the contact hole 34a and the second intermediate electrode 65, as well as the stated contact hole 33a, the first intermediate electrode 63, the contact hole 32a, the lower capacitance electrode 51, and the contact hole 31b. Note that the surface of the fifth inter-layer insulation film 35 is flattened through a flattening process such as a CMP process, as mentioned earlier. This reduces alignment problems in the liquid crystal layer caused by non-planarities in the various wires, elements, and so on that exist therebelow.

Meanwhile, the second orientation base film 38B configured of, for example, P-TEOS is formed between the opposing electrode 22 and the second orientation film 23 on the side of the opposing substrate 20. The thickness of the second orientation base film 38B is, for example, more than or equal to 90 nm and less than or equal to 110 nm. Meanwhile, a second pre-tilt angle in the second orientation film 23, which takes the thickness direction of the opposing substrate 20 as a reference, is, for example, 7.2°. Specifically, the second orientation film 23 is formed by depositing, for example, an inorganic material such as silicon oxide upon the opposing substrate 20 from an oblique direction (oblique deposition) or sputtering. When the inorganic material is deposited or sputtered upon the opposing substrate 20, the deposited particles or sputtered particles accumulate on the opposing substrate 20 from an oblique direction, forming column-shaped liquid crystal bodies. The second orientation film 23 is formed by the multiple column-shaped liquid crystal bodies that have grown obliquely. The liquid crystal molecules align along the growth direction of the column-shaped liquid crystal bodies. The alignment direction of the liquid crystal molecules is controlled by the entry angle of the deposited particles or sputtered particles relative to the opposing substrate 20. The second orientation film 23 aligns the liquid crystal molecules in a direction that is slanted from the vertical direction relative to the opposing substrate 20 (that is, the thickness direction of the opposing substrate 20) by a predetermined pre-tilt angle. If the pre-tilt angle when the liquid crystal molecules are aligned in the vertical direction relative to the opposing substrate 20 is defined as 0°, the second pre-tilt angle in the second orientation film 23 is, for example, 7.2°.

In this embodiment, the first pre-tilt angle (1.2°) in the first orientation film 13 on the side of the element substrate 10 is set to be lower than the second pre-tilt angle (7.2°) in the second orientation film 23 on the side of the opposing substrate 20. Note that the deposition rate when forming the first orientation film 13 on the side of the element substrate 10 is greater than the deposition rate when forming the second orientation film 23 on the side of the opposing substrate 20, which makes it possible to set the first pre-tilt angle to be lower than the second pre-tilt angle.

Incidentally, in order to suppress display problems such as flicker, display image burn-in, and so on, past liquid crystal devices have employed inversion driving (AC driving) in which the polarity of the driving voltage applied to the pixel electrodes is inverted for each scanning line or data line or inverted for each frame in an image signal.

This is performed in an attempt to suppress the application of a DC voltage component to the liquid crystal layer, an electrical charge shift between the substrates, and so on resulting from the inversion driving, thus eliminating flicker and the like. However, the application of the DC voltage component to the liquid crystal layer, the electrical charge shift, and so on will occur if inversion driving is simply carried out, and thus the display problems have occurred nonetheless. The following two phenomena are known as causes of such display problems.

As described earlier, the first phenomenon is a voltage drop caused by the field-through phenomenon (also called "push-down" and "punch-through"). This can be corrected by compensation with a DC voltage equivalent to the drop in the voltage.

On the other hand, the second phenomenon is an electrical charge shift caused by differences in the electrical properties between the element substrate and the opposing substrate. In order to compensate for this, it is necessary to apply a DC voltage extra at least to cancel out the electrical charge shift.

Figure 14A:
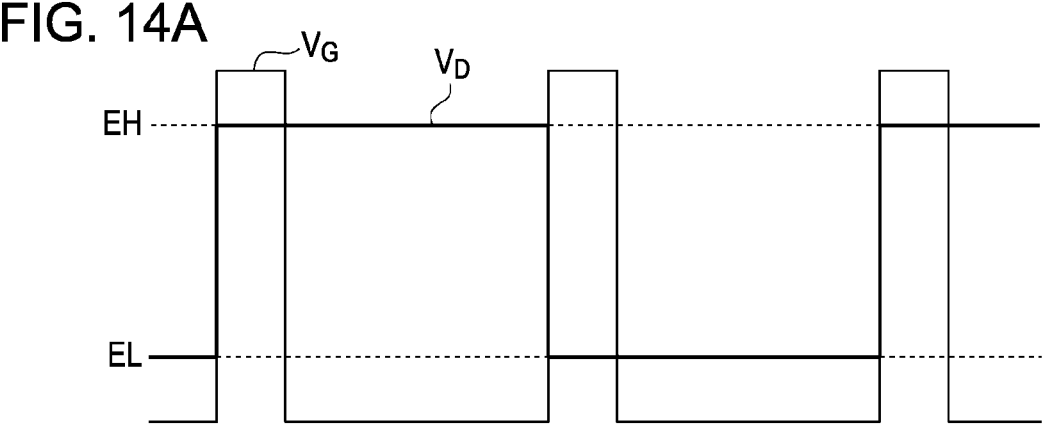
FIG. 14A is a chart illustrating a gate voltage and a driving voltage waveform according to the third embodiment.
Figure 14B:
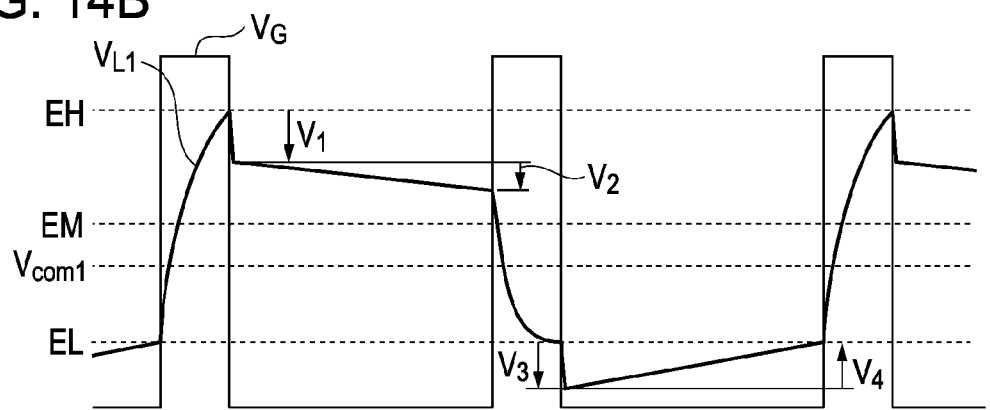
FIG. 14B is a chart illustrating an effective voltage waveform of a liquid crystal layer.
Figure 14C:
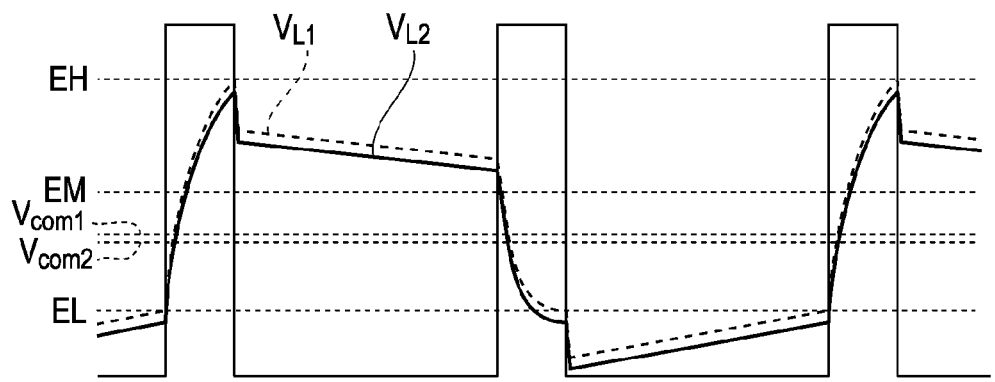
FIG. 14C is a chart illustrating an effective voltage waveform of a liquid crystal layer after a certain amount of driving time has passed from the state shown in FIG. 14B.

Here, the first phenomenon and the second phenomenon will be described using FIGS. 14A to 14C. FIG. 14A is a chart indicating a gate voltage and a driving voltage waveform. FIG. 14B is a chart illustrating an effective voltage waveform of a liquid crystal layer. FIG. 14C is a chart illustrating an effective voltage waveform of a liquid crystal layer after a certain amount of driving time has passed from the state shown in FIG. 14B. Note that in FIGS. 14A through 14C, the horizontal axis represents the passage of time from the start of driving, whereas the vertical axis represents a potential.

As shown in FIG. 14A, the potential of a driving voltage waveform $V_D$ switches alternately between a high potential EH (for example, 12 V) and a low potential EL (for example, 2 V) in synchronization with the rise of a gate voltage $V_G$.

As shown in FIG. 14B, when the gate voltage $V_G$ rises, the switching element turns on, and the pixel electrode 12 is charged. The potential of an effective voltage waveform $V_{L1}$ of the liquid crystal layer essentially rises from the low potential EL to the high potential EH.

Incidentally, in the case where the switching element is configured of a thin-film transistor, there are cases where a punch-through voltage arises when the switching element turns off. In other words, the voltage drop $V_1$ (the punch-through voltage) occurs due to a charge accumulated in the capacities of the gate electrode 41, the channel region, and so on of the switching element flowing through the pixel electrode 12. There are also cases where a voltage drop $V_2$ occurs due to a leaked current flowing through the channel region when the switching element is off. As a result, the next time the gate voltage rises, the potential of the effective voltage waveform $V_{L1}$ will drop to a lower potential than the high potential EH by an amount equivalent to the voltage drops $V_1$ and $V_2$.

The next time the gate voltage $V_G$ rises, the driving voltage waveform $V_D$ falls to the low potential, and the pixel electrode 12 is discharged. Then, the potential of the effective voltage waveform $V_{L1}$ of the liquid crystal layer drops to the low potential EL. After this, when the switching element turns off, a voltage drop $V_3$ occurs due to the punch-through voltage, and a voltage rise occurs due to the leaked current.

The potential of the opposing electrode 22 is held at an opposing electrode potential $V_{com1}$. The opposing electrode potential $V_{com1}$ is set in advance so that the high potential side and the low potential side of the effective voltage waveform $V_{L1}$ with respect to the opposing electrode potential $V_{com1}$ are balanced. The opposing electrode potential $V_{com1}$ is set taking into consideration the voltage drops $V_1$ through $V_3$ and the voltage rise $V_4$, and is generally a value that differs from a middle potential EM (for example, 7 V) between the high potential EH and the low potential EL. For example, a value, in which the absolute value of a time-integrated value of the difference between the effective voltage waveform $V_{L1}$ and the opposing electrode potential $V_{com1}$ is optimized so that the driving voltage waveform $V_D$ is approximately the same during the high potential EH interval and the low potential EL interval, is set as the opposing electrode potential $V_{com1}$.

As shown in FIG. 14C, the effective voltage waveform $V_{L2}$ after the liquid crystal layer has been driven for a certain amount of time often shifts from the effective voltage waveform $V_{L1}$ found immediately after the start of the driving. Note that although there are cases where the potential of the effective voltage waveform $V_{L2}$ shifts in the positive or negative direction, FIG. 14C illustrates a state in which the effective voltage waveform $V_{L2}$ has shifted in the negative direction. In response to the shifted effective voltage waveform $V_{L2}$, an opposing electrode potential $V_{com2}$ that has been optimized to achieve balance between the positive and negative is considered. The post-shift opposing electrode potential $V_{com2}$ is shifted in the negative direction from the pre-shift opposing electrode potential $V_{com1}$.

Here, with the past technology, whether the potential of the effective voltage waveform $V_{L2}$ would shift in the negative or the positive direction was uncertain. In other words, whether the post-shift opposing electrode potential $V_{com2}$ would shift in the negative or positive direction from the pre-shift opposing electrode potential $V_{com1}$ was uncertain.

However, the inventors of this invention discovered that the potential of the effective voltage waveform $V_{L2}$ optimized to achieve balance between the positive and the negative shifts in the negative direction (that is, that the $V_{com}$ shift is a shift in the negative direction) by setting the first pre-tilt angle in the first orientation film 13 on the side of the element substrate 10 to be lower than the second pre-tilt angle in the second orientation film 23 on the side of the opposing substrate 20 (that is, by setting the first pre-tilt angle to be closer to a vertical orientation than the second pre-tilt angle). This was confirmed from the results of experiments carried out by the inventors.

Figure 15:
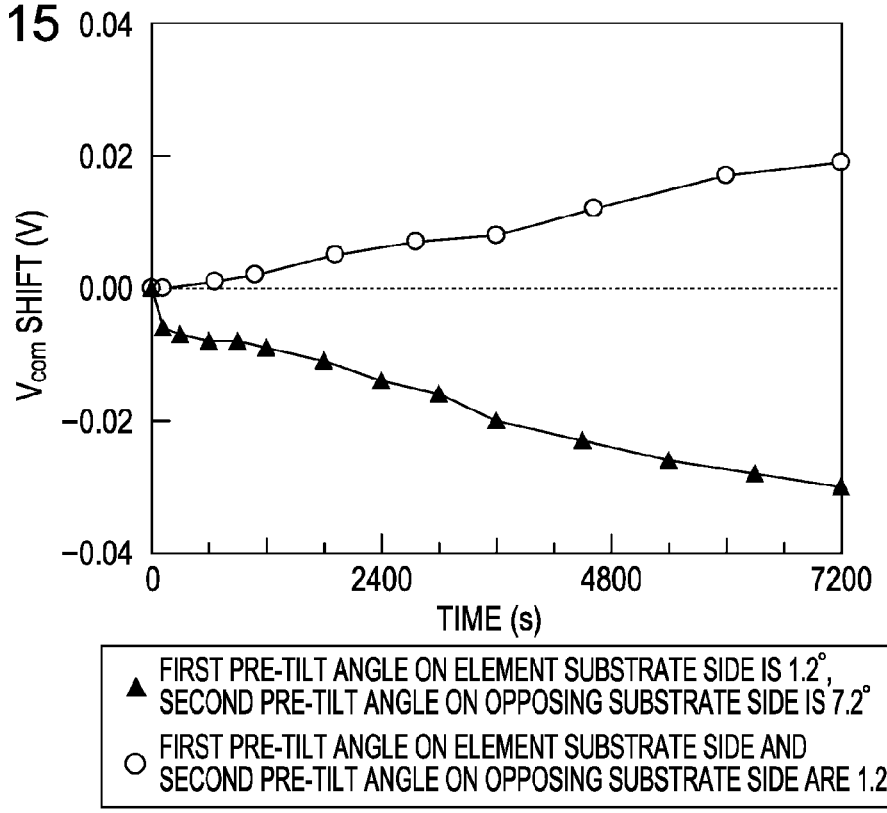
FIG. 15 is a diagram illustrating the relationship between the passage of time and a $V_{com}$ shift according to the third embodiment.

FIG. 15 is a diagram illustrating a relationship between the passage of time and $V_{com}$ shift, obtained through an experiment carried out by the inventors. Note that in FIG. 15, the horizontal axis represents the passage of time, whereas the vertical axis represents the $V_{com}$ shift. Here, the $V_{com}$ shift is a value equal to the difference between the pre-shift opposing electrode potential $V_{com1}$ and the post-shift opposing electrode potential $V_{com2}$, or in other words, $V_{com2}-V_{com1}$. In FIG. 15, the black triangles indicate a state in which the first pre-tilt angle (1.2°) in the first orientation film 13 on the side of the element substrate 10 is set to be lower than the second pre-tilt angle (7.2°) in the second orientation film 23 on the side of the opposing substrate 20. On the other hand, the white circles (○) indicate a state in which both the first pre-tilt angle and the second pre-tilt angle are set to 1.2°, or in other words, a state in which the first pre-tilt angle in the first orientation film 13 on the side of the element substrate 10 and the second pre-tilt angle in the second orientation film 23 on the side of the opposing substrate 20 are set to the same value. Furthermore, in FIG. 15, the $V_{com}$ shift is measured when a short waveform having an amplitude of 5 V is applied.

As shown in FIG. 15, the $V_{com}$ shift amount in the white circle state, in which the first pre-tilt angle in the first orientation film 13 on the side of the element substrate 10 and the second pre-tilt angle in the second orientation film 23 on the side of the opposing substrate 20 are set to the same value, increases with the passage of time. The $V_{com}$ shift amount and the passage of time are thus in a proportional relationship. Furthermore, the $V_{com}$ shift amount is approximately +0.02 V when 7,200 seconds have passed. On the other hand, the $V_{com}$ shift amount in the black triangle state (▲), in which the first pre-tilt angle (1.2°) in the first orientation film 13 on the side of the element substrate 10 is set to be lower than the second pre-tilt angle (7.2°) in the second orientation film 23 on the side of the opposing substrate 20, decreases with the passage of time. The $V_{com}$ shift amount and the passage of time are thus in a proportional relationship. Furthermore, the $V_{com}$ shift amount is approximately −0.03 V when 7,200 seconds have passed. The $V_{com}$ shift direction in the black triangle state (▲), in which the first pre-tilt angle (1.2°) in the first orientation film 13 on the side of the element substrate 10 is set to be lower than the second pre-tilt angle (7.2°) in the second orientation film 23 on the side of the opposing substrate 20, is shifted in the negative direction across the entire range of time, compared to the white circle state (○), in which the first pre-tilt angle in the first orientation film 13 on the side of the element substrate 10 and the second pre-tilt angle in the second orientation film 23 on the side of the opposing substrate 20 are set to the same value. Accordingly, it can be confirmed that the $V_{com}$ shift is −0.05 V when the difference between the first pre-tilt angle and the second pre-tilt angle is 6°. In addition, because the $V_{com}$ shift amount and the passage of time are in a proportional relationship, it is thought that $V_{com}$ will shift by 0.01 V each time the difference between the first pre-tilt angle and the second pre-tilt angle changes by 1°.

When the $V_{com}$ shift becomes greater than a certain amount, the difference between the modulation effects of the liquid crystal layer during the low potential interval and the high potential interval becomes greater. When this happens, a difference can be seen, in the displayed image, in the amount of light modulated during the low potential interval and the amount of light modulated during the high potential interval, which leads to the occurrence of flicker in the image.

As a result of considerations made based on knowledge obtained from experimental data, the inventors determined that it is most effective to carry out separate corrections for the first phenomenon and the second phenomenon. In other words, a method for correcting the first phenomenon involves applying a constant correction voltage regardless of the driving voltage, whereas a method for correcting the second phenomenon is a method in which the length of the interval in which the positive polarity is held is shortened compared to the length of the interval in which the negative polarity is held in accordance with the direction and size of the DC voltage component caused by the stated difference in properties.

Meanwhile, searching for a polarity duty in which the change over time of flicker is a minimum (called simply "searching" hereinafter) takes a significant amount of time. For example, adjustments when carrying out the search required approximately 10 to 60 minutes of electrification for a single measurement.

However, the inventors discovered that the $V_{com}$ shifts in the negative direction when the first pre-tilt angle in the first orientation film 13 on the side of the element substrate 10 is set to be lower than the second pre-tilt angle in the second orientation film 23 on the side of the opposing substrate 20, which makes it possible to reduce the amount of time required for the search.

Figure 16:
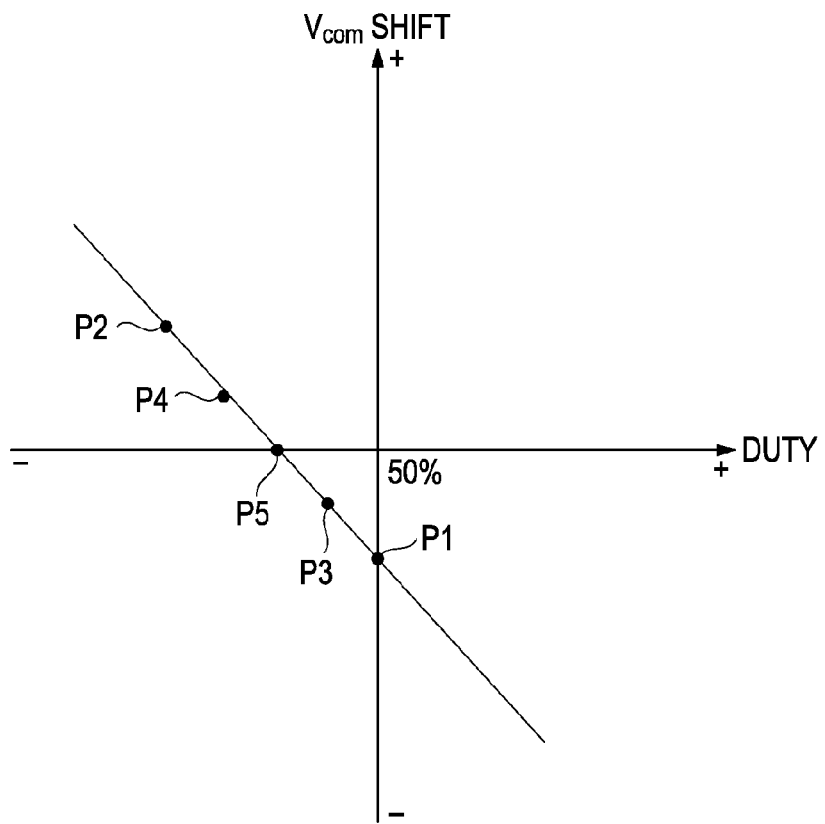
FIG. 16 is a diagram illustrating the relationship between a duty and a $V_{com}$ shift according to the third embodiment.

FIG. 16 is a diagram illustrating a relationship between the duty and $V_{com}$ shift, obtained through searching carried out by the inventors. Note that in FIG. 16, the horizontal axis represents the duty (that is, the proportion of time between the application time of a positive polarity voltage and the application time of a negative polarity voltage), whereas the vertical axis represents the $V_{com}$ shift ($V_{com2}-V_{com1}$). Here, the intersection between the horizontal axis and the vertical axis is taken as a duty of 50:50, and the right side of the horizontal axis is taken as the direction in which the positive polarity voltage application time is increased. Likewise, the upward side of the vertical axis is taken as the direction in which the $V_{com}$ shift is positive. Furthermore, in FIG. 16, the reference numeral P1 indicates the first (initial) point of measurement, the reference numeral P2 indicates the second point of measurement, the reference numeral P3 indicates the third point of measurement, the reference numeral P4 indicates the fourth point of measurement, and the reference numeral P5 indicates the fifth (final) point of measurement. Although the searching is carried out using a total of five measurements in FIG. 16, the invention is not limited to this number, and the number of measurements may be changed as necessary and appropriate.

As shown in FIG. 16, the first measurement point P1 is set to a region in which the duty is less than 50%. This is clear based on the discovery, through the stated experimental result, that disposing the stated dielectric film between the opposing electrode 22 and the second orientation film 23 on the side of the opposing substrate 20 causes the $V_{com}$ shift direction to shift in the negative direction. In other words, because the line descends to the right and because the fifth measurement point P5 is less than a duty of 50%, a range excluding regions where the duty is greater than 50% (that is, a region in which the duty is less than or equal to 50%) may be measured. Accordingly, it is not necessary to set the first measurement point P1 to a region in which the duty is greater than 50%, which makes it possible to reduce the frequency of the measurement.

Next, the second measurement point P2 is set further down the horizontal axis, to an area with a lower duty than the first measurement point P1. In this manner, the positive/negative direction to which the parameters (duty) are to be changed can be determined based on the first measurement result. In other words, it is not necessary to set the second measurement point P2 to a region in which the duty is greater than the first measurement point P1, which makes it possible to reduce the frequency of the measurement. Furthermore, plotting the first measurement point P1 and the second measurement point P2 makes it possible to approximate the slope of the line that slopes downward and to the right.

Next, the third measurement point P3 is set along the approximated slope, between the first measurement point P1 and the horizontal axis. Furthermore, the fourth measurement point P4 is set along the approximated slope, between the second measurement point P2 and the horizontal axis. In this manner, the search range is narrowed while estimating the value of $(V_{com2}-V_{com1})$ at which the $V_{com}$ shift becomes essentially 0. Plotting the third measurement point P3 and the fourth measurement point P4 makes it possible to approximate the $V_{com}$ shift that corresponds to an allowable limit for flicker.

The fifth measurement point P5 is set on the horizontal axis. Specifically, the fifth measurement point P5 is set to the point where a straight line that approximately connects the measurement points P1 through P4 and the horizontal axis intersect. As described thus far, the polarity duty in which the change in the flicker over time is a minimum can be calculated. Accordingly, through this adjustment method, it is possible to reduce the amount of time required for the search by reducing the frequency of measurements.

Liquid Crystal Device Driving Method

The liquid crystal device driving method described hereinafter was devised by the inventors based on careful consideration and inventive ideas for concretely realizing the content discussed herein.

Figure 17:
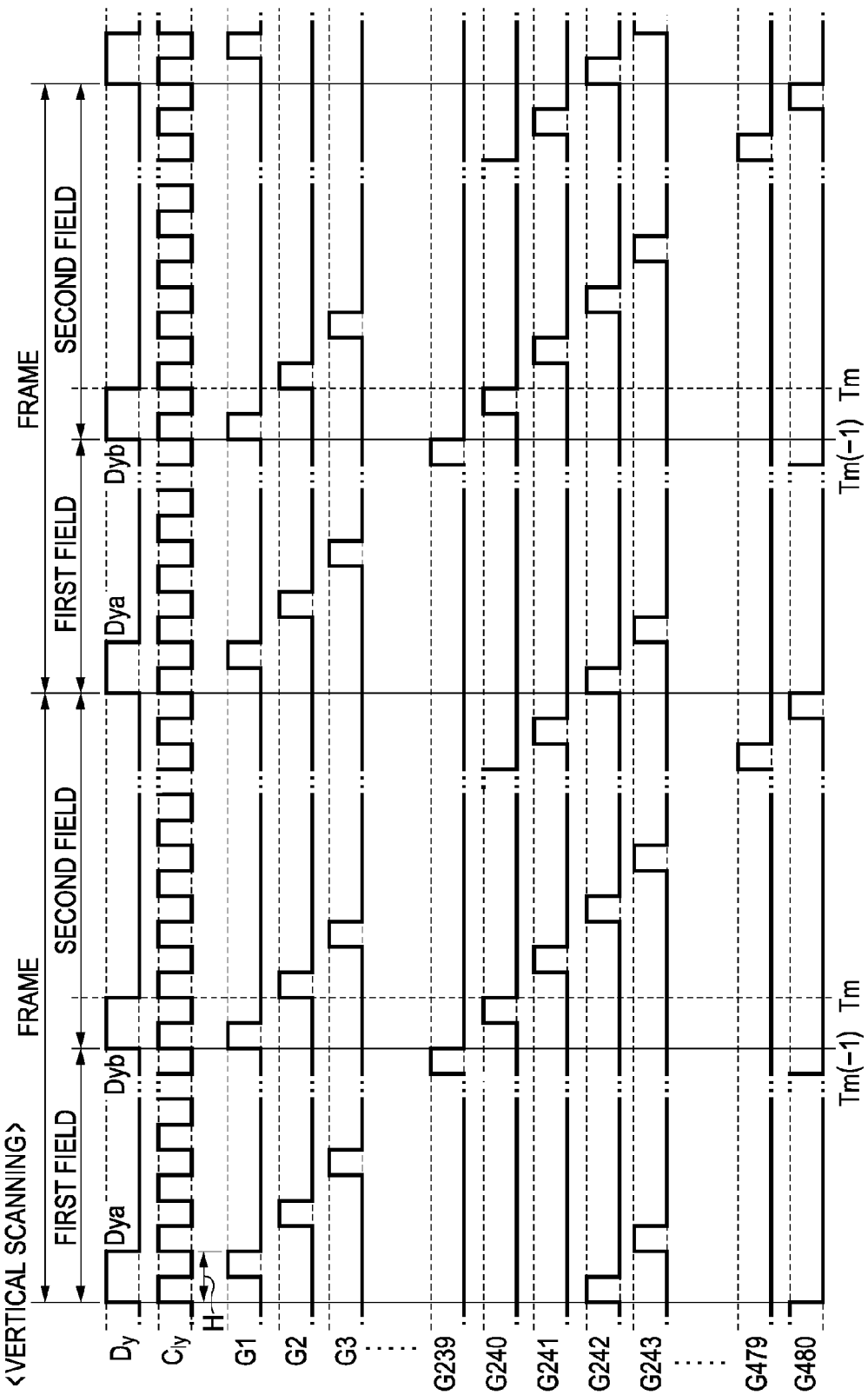
FIG. 17 is a timing chart illustrating a scanning signal system when a specified value is "−1".

FIG. 17 is a timing chart of a scanning signal system when a specified value Q is −1. In this embodiment, the multiple scanning lines 61 are divided into a first scanning line group and a second scanning line group; furthermore, in a single frame, one scanning line 61 in the first scanning line group and one scanning line 61 in the second scanning line group are selected in an alternating manner, and each scanning line 61 is selected twice in a single frame. In other words, double-speed area scanning inversion driving is used.

First, a driving method of the scanning lines 61 will be described. FIG. 17 is a timing chart illustrating scanning signals G1 through G480 outputted by the scanning line driving circuit 130 within the context of the relationship between a start pulse and a clock signal. Here, a "frame" refers to the interval required for the liquid crystal panel 100A to display a single image. Furthermore, in a single frame interval (a predetermined interval), the interval spanning from the output of a first start pulse Dya to the output of the second start pulse Dyb is taken as a first field (a first interval), and the interval spanning from the output of the second start pulse Dyb to the output of the next first start pulse Dya is taken as a second field (a second interval). In addition, each scanning line 61 is selected once in each field in a single frame interval, or in other words, is selected twice.

The vertical synchronization signal $V_S$ in this embodiment has a frequency of 120 Hz as mentioned above, and therefore a single frame interval is fixed at 8.33 ms. A control circuit 152 (see FIG. 9) outputs a clock signal, whose duty ratio is 50%, for 480 cycles, which is equal to the number of scanning lines 61, throughout a single frame interval. Note that the interval of a single cycle of the clock signal is expressed as H.

Meanwhile, the control circuit 152 outputs start pulses having a pulsewidth equal to one cycle of the clock signal in the following manner, each time the clock signal rises to the H level. That is, the control circuit 152 outputs the first start pulse Dya at the beginning of a single frame interval (at the beginning of the first field). Meanwhile, because the specified value Q is a negative value, the control circuit 152 outputs the second start pulse Dyb an amount of time, following the first start pulse Dya of "Q×H" prior to a timing Tm at which 240 cycles' worth of the clock signal was outputted.

Accordingly, as shown in FIG. 17, in the case where the specified value Q is −1, the second start pulse Dyb is outputted at a timing Tm(−1), which is prior to the timing Tm by one clock signal cycle.

Here, although the start pulses are outputted alternately, the output timing of the first start pulse Dya does not change regardless of the specified value Q. Accordingly, specifying the first start pulse Dya outputted every frame (every 8.33 ms) also makes it possible to specify the second start pulse Dyb that necessarily defines the start of the second field.

The scanning line driving circuit 130 outputs operational signals as described hereinafter after such start pulses and clock signal. That is, when the first start pulse Dya is supplied, the scanning line driving circuit 130 sequentially sets the scanning signals G1 to G480 to the H level each time the clock signal changes to the L level. On the other hand, when the second start pulse Dyb is supplied, the scanning line driving circuit 130 sequentially sets the scanning signals G1 to G480 to the H level each time the clock signal changes to the H level.

The first start pulse Dya is supplied at the start of a single frame interval (the first field), and thus the selection of the scanning line 61 triggered by the supply of the first start pulse Dya does not change based on the specified value Q. Furthermore, the selection of the scanning line 61 due to the supply of the first start pulse Dya is executed during an interval in which the clock signal is at the L level, and thus is executed at an interval equivalent to half of a clock signal cycle across the first field and the second field, starting with the scanning line 61 in the first row and continuing down the screen, in order, with the second, third, fourth, and so on up to the 480th row.

On the other hand, the second start pulse Dyb is supplied at the start of the second field, and thus the selection of the scanning line 61 triggered by this start pulse is shifted forward or backward overall, depending on the specified value Q. That is, the selection of the scanning line 61 due to the supply of the second start pulse Dyb is executed during an interval in which the clock signal is at the H level, and thus is executed between the selections triggered by the supply of the first start pulse Dya, across the second field of a frame and the first field of the next frame, starting with the scanning line 61 in the first row and continuing down the screen, in order, with the second, third, fourth, and so on up to the 480th row. In other words, the selections of the first through 240th rows in the second field of a certain frame are, when the specified value Q is, for example, −1, shifted an amount equivalent one clock signal cycle previous to the timing Tm.

Figure 18:
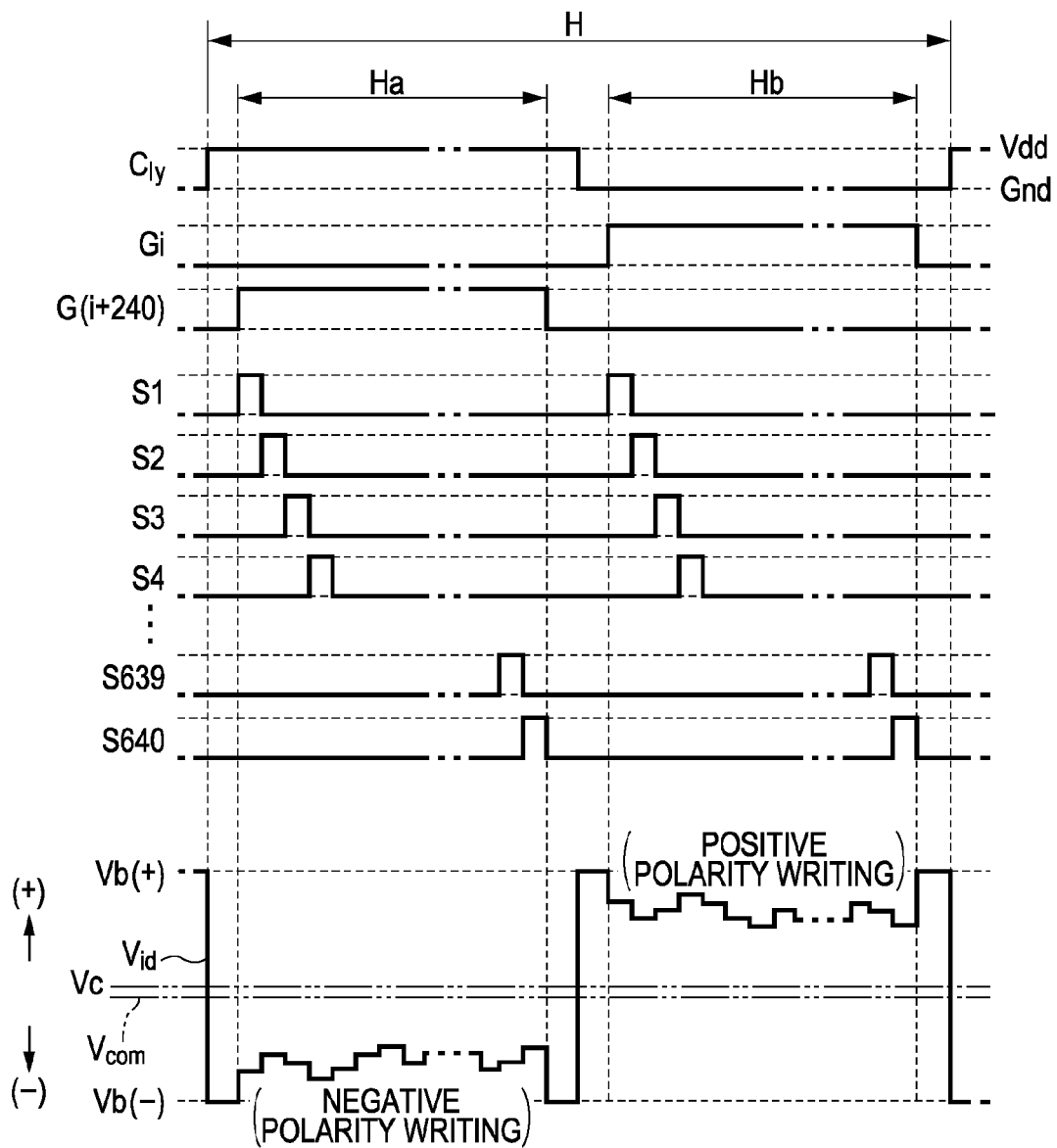
FIG. 18 is a timing chart illustrating a first field in a data signal system.
Figure 19:
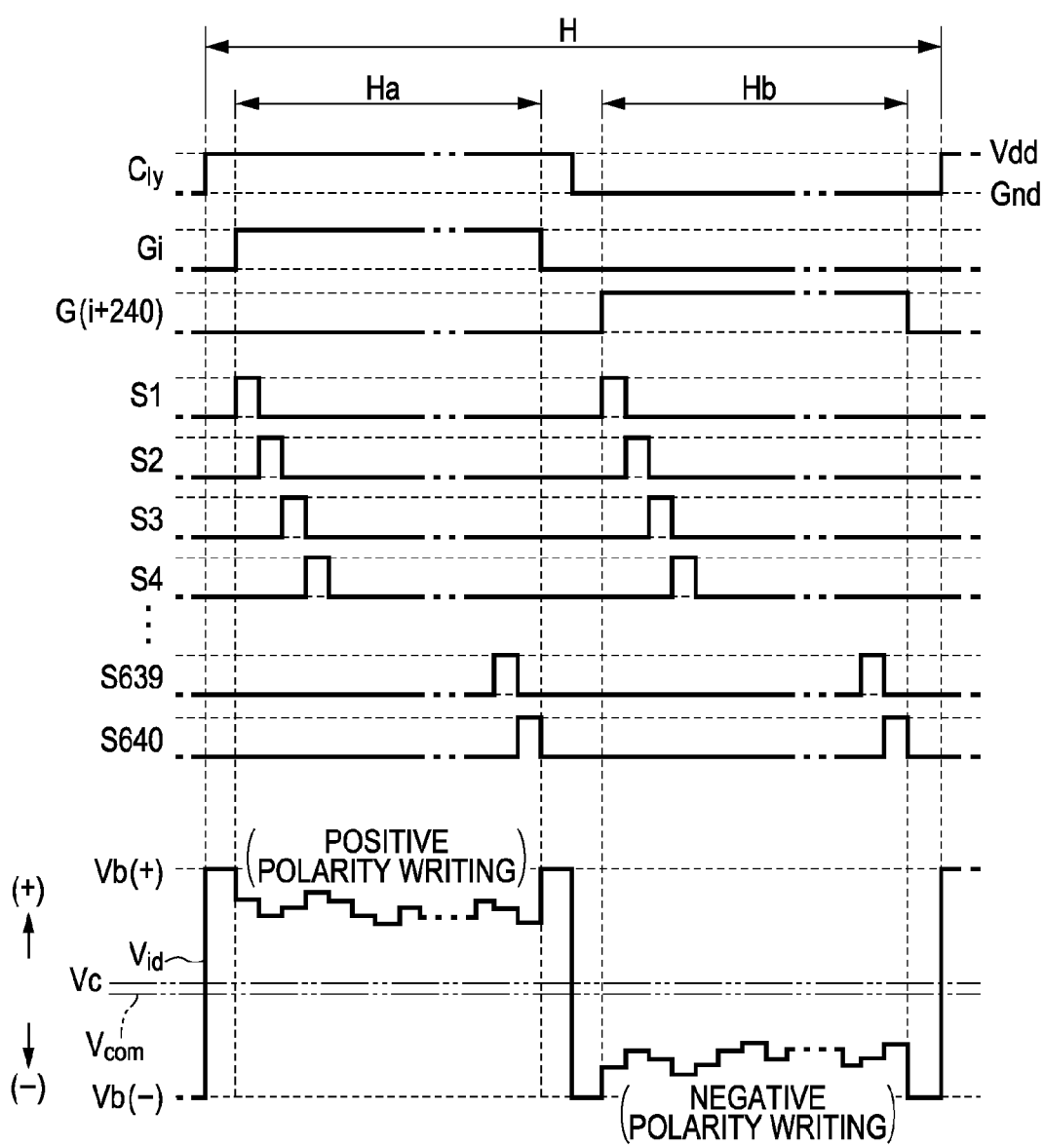
FIG. 19 is a timing chart illustrating a second field in a data signal system.

FIG. 18 is a timing chart illustrating the first field for the data signal $V_{id}$ system. FIG. 19 is a timing chart illustrating the second field for the data signal $V_{id}$ system. Next, a driving method for the data lines 62 will be described focusing on FIGS. 18 and 19.

In accordance with a control signal from the control circuit 152, the sampling signal output circuit 142 of the data line driving circuit 140 sequentially outputs, to the respective data lines 62, sampling signals S1, S2, S3, and so on up to S640, that are exclusively H level, across an interval in which one of the scanning lines 61 is selected and an operation signal supplied to the scanning line 61 is H level. Note that the "control signal" is actually a start pulse, a clock signal, or the like, and thus descriptions thereof will be omitted.

The interval in which the scanning signal is H level is actually slightly narrower than an interval equivalent to half a clock signal cycle. In this case, as shown in FIG. 18, in the first field, a scanning signal Gi transitions to the H level after a scanning signal G(i+240) has transitioned to the H level.

Likewise, as shown in FIG. 19, in the second field, the scanning signal Gi transitions to the H level after the scanning signal G(i+240) has transitioned to the H level.

Meanwhile, a display data processing circuit 156 (see FIG. 9) converts one pixel row's worth of display data $V_{id}$eo in a selected scanning line 61 into a data signal $V_{id}$ having the polarities described hereinafter in accordance with the output of the sampling signals S1 to S640 by the sampling signal output circuit 142. In other words, the display data processing circuit 156 converts the data signal $V_{id}$ of the pixels in the pixel row selected when the clock signal is at the L level to a positive polarity (+) and converts the data signal $V_{id}$ of the pixels in the pixel row selected when the clock signal is at the H level to a negative polarity (−). To rephrase, the display data processing circuit 156 converts the data signal $V_{id}$ of the pixels in the pixel row selected due to the supply of the first start pulse Dya to the positive polarity (+), and converts the data signal $V_{id}$ of the pixels in the pixel row selected due to the supply of the second start pulse Dyb to the negative polarity (−).

Here, the positive polarity (+) and the negative polarity (−) refer to a positive polarity (+) on the high-potential side of a reference voltage Vc and a negative polarity (−) on the low-potential side of the reference voltage Vc. Furthermore, although the standard potential is set to 0 V here, the invention is not limited thereto.

Furthermore, the opposing electrode potential $V_{com}$ is set to be shifted more toward the negative polarity (−) side than the reference voltage Vc. Specifically, the opposing electrode potential $V_{com}$ is set to a voltage value that is within a range from, for example, approximately −0.1 V to −0.2 V. This is because the voltage fluctuation caused by the aforementioned first phenomenon (field-through) is from approximately −0.1 V to −0.2 V, and thus this is taken as the correction voltage, and the set value of the opposing electrode potential $V_{com}$ is shifted from the reference voltage Vc. In other words, the opposing electrode potential $V_{com}$ is shifted in order to reduce the influence of the first phenomenon.

Meanwhile, it is preferable for the correction voltage for the first phenomenon to be found through measurements for each individual liquid crystal panel 100A. Specifically, the opposing electrode potential $V_{com}$ in which the flicker is sufficiently low is found when alternately applying positive and negative polarity driving voltages corresponding to the same tone, and the correction voltage is taken as the difference between that opposing electrode potential $V_{com}$ and the reference voltage Vc. In addition, it is preferable for the driving voltage at this time to be a voltage that corresponds to a medium tone that makes it easy to see flicker.

In this manner, the correction voltage is found, and is set in the control circuit 152 (see FIG. 9) or the voltage generation circuit 160. The voltage generation circuit 160 then generates an opposing electrode potential $V_{com}$ shifted by the amount of the correction voltage, and supplies this to the opposing electrode 22 of the liquid crystal panel 100A.

Next, a description of the overall driving method will be given.

First, in FIG. 9, the control circuit 152 stores the display data $V_{id}$eo supplied from an external device in a frame memory 157. Thereafter, when the scanning line 61 in a certain pixel row in the liquid crystal panel 100A is selected, the display data $V_{id}$eo of that pixel row is read out at a speed that is twice the storage speed. The display data $V_{id}$eo is then converted into an analog data signal $V_{id}$ by a DA converter 158. Furthermore, in accordance with the readout of the display data $V_{id}$eo, the sampling signal output circuit 142 is controlled via a control signal so that the sampling signals S1 to S640 sequentially transition to H level.

As shown in FIG. 17, when the specified value Q is, for example, −1, the second start pulse Dyb is outputted at a timing that is temporally prior to the timing Tm by an amount equivalent to one clock signal cycle. Accordingly, if the specified value Q is −1, the first field interval is 239 cycles' worth of the clock signal, whereas the second field interval is 241 cycles' worth of the clock signal.

The scanning lines 61 in the first field are selected in the following order: 242, 1, 243, 2, 244, 3, and so on up to 480 and 239. Accordingly, the control circuit 152 controls the scanning line driving circuit 130 so that the 242nd scanning line 61 is selected first. Meanwhile, the control circuit 152 causes the display data processing circuit 156 to read out the display data $V_{id}$eo stored in the frame memory 157 that corresponds to the 242nd frame at double speed. Then, a negative polarity data signal $V_{id}$ is generated from the display data $V_{id}$eo by the DA converter 158, and, as shown in FIG. 18, the sampling signal output circuit 142 is controlled so that the sampling signals S1 to S640 are sequentially and exclusively set to the H level, in accordance with the readout of the data signal $V_{id}$. When the sampling signals S1 to S640 sequentially transition to the H level, the TFTs 40 are turned on in order, and the data signal $V_{id}$ supplied to the image signal lines is sampled by the data lines 62 in the first through 640th columns.

On the other hand, when the scanning line 61 is selected, the scanning signal G242 transitions to the H level, and thus all of the TFTs 40 of the pixels located in the 242nd row are turned on. Accordingly, the negative polarity voltage of the data signal $V_{id}$ sampled by the data lines 62 is applied as-is to the pixel electrodes 12. Through this, a negative polarity voltage based on the tone specified by the display data $V_{id}$eo is written into and held in the liquid crystal capacitors 120 in the pixels in the 242nd row and the first, second, third, fourth, and so on up to the 639th and 640th column. Thereafter, in the first field, similar voltage writing operations are executed in the following order of rows: 1, 243, 2, 244, 3, and so on up to 480 and 239. Through this, a positive polarity voltage based on the tone is written into and held in the pixels in the first through the 239th rows, and a negative polarity voltage based on the tone is written into and held in the pixels in the 240th through the 480th rows.

On the other hand, in the second field, the scanning lines 61 are selected in the order of rows 1, 240, 2, 241, 3, 242, and so on up to 241 and 480, and the writing polarities in the same rows are inverted. Accordingly, a negative polarity voltage based on the tone is written into and held in the pixels in the first through the 239th rows, and a positive polarity voltage based on the tone is written into and held in the pixels in the 240th through the 480th rows.

Figure 20:
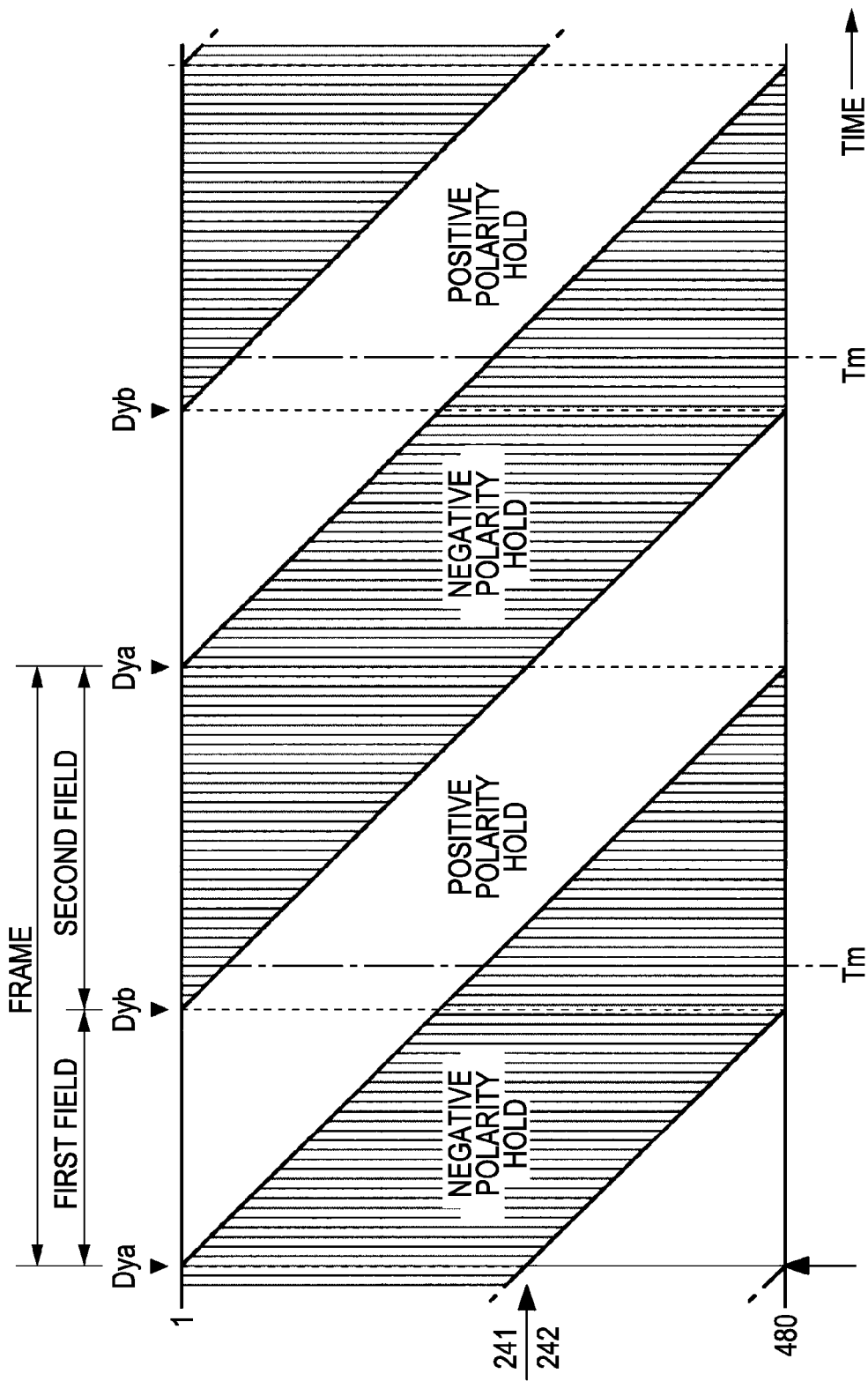
FIG. 20 is a diagram illustrating the writing states of respective lines along with the passage of time over consecutive frames in the case where a specified value is "−1".

FIG. 20 is a diagram illustrating the writing states of respective rows along with the passage of time over consecutive frames in the case where the specified value Q is "−1". Note that the writing into the scanning line 61 in the uppermost stage, or in other words, the start time of the positive polarity holding interval, is a timing that is technically half a clock signal cycle ahead after the first start pulse Dya has been supplied; however, in FIG. 20, this is aligned with the first start pulse Dya for the sake of simplicity.

As shown in FIG. 20, a negative polarity is written into the pixels in the rows 242, 243, 244, and so on up to 480 in the first field, whereas a positive polarity is written into the pixels in the rows 1, 2, 3, and so on up to 241, and these polarities are held until the next write. On the other hand, a negative polarity is written into the pixels in the rows 1, 2, 3, and so on up to 241 in the second field, whereas a positive polarity is written into the pixels in the rows 242, 243, 244, and so on up to 480, and these polarities are held until the next write. In other words, it can also be said that in each field, two scanning lines 61, or the scanning line 61 into which the positive polarity is written and the scanning line 61 into which the negative polarity is written, are selected.

In this manner, in the case where the specified value Q is −1, the output timing of the second start pulse Dyb is earlier. For this reason, the holding time of the negative polarity voltage written through the selection triggered by the supply of the second start pulse Dyb is longer than the holding time of the positive polarity voltage written through the selection triggered by the supply of the first start pulse Dya. In other words, if the specified value Q is a negative value, the holding time of the negative polarity voltage written due to the selection triggered by the supply of the second start pulse Dyb becomes longer than the holding time of the positive polarity voltage written through the selection triggered by the supply of the first start pulse Dya as the absolute value of the specified value Q increases. For this reason, the negative polarity effective voltage value applied to the liquid crystal capacitor 120 is greater than the positive polarity effective voltage value.

In other words, the first field in which the positive polarity voltage is applied is shorter than the second field in which the negative polarity voltage is applied. Accordingly, in a single frame, the positive polarity voltage application time is set to be shorter than the negative polarity voltage application time, and thus the $V_{com}$ shift correction can be carried out in an effective manner.

Duty Determination Method $V_{com}$ shift is thought to occur due to a potential difference caused by charge accumulation that arises due to a polarity difference in a current. Assuming that the positive polarity voltage application duty is (1+X), the negative polarity voltage application duty is (1−X), and the application time is T, relational expressions between the accumulated charge amount and the current (voltage, resistance) are expressed by the following Equations (8) and (9). Here, $q_+$ represents the positive accumulated charge amount, $q_-$ represents the negative accumulated charge amount, i represents the current, v represents the voltage, and R represents the resistance.

$$q_+ = \int_0^{(1+x)T} i\,dt = \frac{1}{R}\int_0^{(1+x)T} v\,dt \qquad \text{Equation (8)}$$

$$q_- = \int_0^{(1-x)T} i\,dt = \frac{1}{R}\int_0^{(1-x)T} v\,dt \qquad \text{Equation (9)}$$

According to this line of thought, $V_{com}$ shift can be prevented by controlling the accumulated charge amount per unit of time. It is also possible to estimate the optimum time distribution ratio from the rectangular wave amplitude during electrification and the $V_{com}$ shift at that time. In order for $q_+$ to equal $q_-$, the following Equations 10 and 11 are used, taking the positive polarity voltage application duty as (1+X) and the negative polarity voltage application duty as (1−X). Here, the rectangular wave amplitude is represented by E, and the $V_{com}$ shift is represented by $\delta V$. Note that the $V_{com}$ shift is a value equal to the difference between the pre-shift opposing electrode potential $V_{com1}$ and the post-shift opposing electrode potential $V_{com2}$, or in other words, $V_{com2} - V_{com1}$.

$$\left(E - \frac{\delta V}{2}\right)(1+x) = \left(E + \frac{\delta V}{2}\right)(1-x) \qquad \text{Equation (10)}$$

$$\therefore x = \frac{\delta V}{2E} \qquad \text{Equation (11)}$$

For example, when the rectangular wave amplitude applied to the pixel electrodes 12 is ±5 V and the $V_{com}$ shift is −0.05 V, X=−0.005. For this reason, a $V_{com}$ shift will not arise if the positive polarity voltage application time:negative polarity voltage application time is 49.5:50.5.

It is known, from the results of experiments carried out by the inventors, that in the case where the frame rate is 120 fps, the $V_{com}$ shift, which corresponds to the allowable limit of flicker, will be ±0.15 V. For this reason, in actuality, X may be set to −0.020 to 0.010. Accordingly, when the first pre-tilt angle is set to be 6° less than the second pre-tilt angle, the ratio between the length of the first field and the length of the second field should be set to a range from more than or equal to 49.0/51.0 to less than or equal to 52.0/48.0. In other words, settings should be made so that the positive polarity voltage application time:negative polarity voltage application time is equal to 48.0:52.0 to 52.0:48.0. However, because this assumes that the length of the first field is set to be shorter than the length of the second field, the ratio between the length of the second field and the length of the first field is set to a range from more than or equal to 50.0/50.0 and less than or equal to 52.0/48.0. When the frame rate is 120 fps, one frame is 8.3 ms, and thus the positive polarity voltage application time:negative polarity voltage application time=8.42 ms: 8.25 ms to 8.92 ms:7.75 ms.

According to the liquid crystal device 100 of this embodiment, the opposing electrode potential $V_{com}$ is shifted in advance and set so that flicker caused by parasitic capacitance in the switching elements is reduced, and thus the first phenomenon can be corrected. Furthermore, because of predetermined intervals, the length of the first interval is set to be shorter than the length of the second interval, the second phenomenon can also be corrected. The inventors discovered that this correction shifts the effective voltage waveform in the negative direction of the potential, by setting the first pre-tilt angle in the first orientation film 13 on the side of the element substrate 10 to be less than the second pre-tilt angle in the second orientation film 23 on the side of the opposing substrate 20 (that is, setting the first pre-tilt angle to be closer to a vertical orientation than the second pre-tilt angle). This was confirmed from the results of experiments carried out by the inventors. In other words, it is clear that setting the first pre-tilt angle in the first orientation film 13 on the side of the element substrate 10 to be less than the second pre-tilt angle in the second orientation film 23 on the side of the opposing substrate 20 $V_{com}$ shifts in the negative direction (that is, the post-shift opposing electrode potential $V_{com2}$ shifts in the negative direction from the pre-shift opposing electrode potential $V_{com1}$), compared to the case in which the first pre-tilt angle and the second pre-tilt angle are the same. In this manner, the direction in which $V_{com}$ shifts is set in advance, and thus the $V_{com}$ shift can be carried out more precisely than in the case of the past techniques, where which direction the shift would occur in was not set. Accordingly, a liquid crystal device 100 capable of improving the display quality by suppressing the occurrence of display problems such as flicker can be provided.

Furthermore, it is clear that according to this configuration, $V_{com}$ will shift in the negative direction, as compared to the case where the pixel electrodes 12 and the opposing electrode 22 are configured of the same material (for example, ITO), and thus there is a marked asymmetry between the properties of the element substrate 10 and the properties of the opposing substrate 20. This was confirmed from the results of experiments carried out by the inventors. For this reason, there is a marked occurrence of the DC voltage component caused by the difference in properties between the element substrate 10 and the opposing substrate 20 that hold the liquid crystal layer, compared to the case where both the pixel electrodes 12 and the opposing electrode 22 are configured of, for example, ITO. Accordingly, it is possible to improve the display quality by suppressing the occurrence of display problems such as flicker.

According to the driving method for the liquid crystal device 100 of this embodiment, the opposing electrode potential $V_{com}$ is shifted in advance and set so that flicker caused by parasitic capacitance in the switching elements is reduced, and thus the first phenomenon can be corrected. Furthermore, in a predetermined interval, because the length of the first interval is set to be shorter than the length of the second interval, the second phenomenon can also be corrected. This correction is derived from a discovery done by the inventors such that the effective voltage waveform shifts in the negative direction of the potential, by setting the first pre-tilt angle in the first orientation film 13 on the side of the element substrate 10 to be less than the second pre-tilt angle in the second orientation film 23 on the side of the opposing substrate 20. This was confirmed from the results of experiments carried out by the inventors. Accordingly, it is possible to improve the display quality by suppressing the occurrence of display problems such as flicker.

Furthermore, according to the driving method of the liquid crystal device 100, the optimum time distribution ratio corresponding to the allowable limit of flicker is achieved, and thus the second phenomenon can be effectively corrected. However, there are cases where the length of the first interval will be too long, making the correction ineffective, if the ratio between the length of the first interval and the length of the second interval is lower than 50.0/50.0. Furthermore, there are cases where the length of the first interval will be too short, making the correction ineffective, if the ratio between the length of the first interval and the length of the second interval is greater than 52.0/48.0.

Although this embodiment describes an example of a case where the first pre-tilt angle in the first orientation film 13 on the side of the element substrate 10 is set to be lower than the second pre-tilt angle in the second orientation film 23 on the side of the opposing substrate 20, the invention is not limited thereto. Next, a liquid crystal panel including an orientation film having a different form than that in this embodiment will be described using FIG. 21.

Fourth Embodiment

Figure 21:
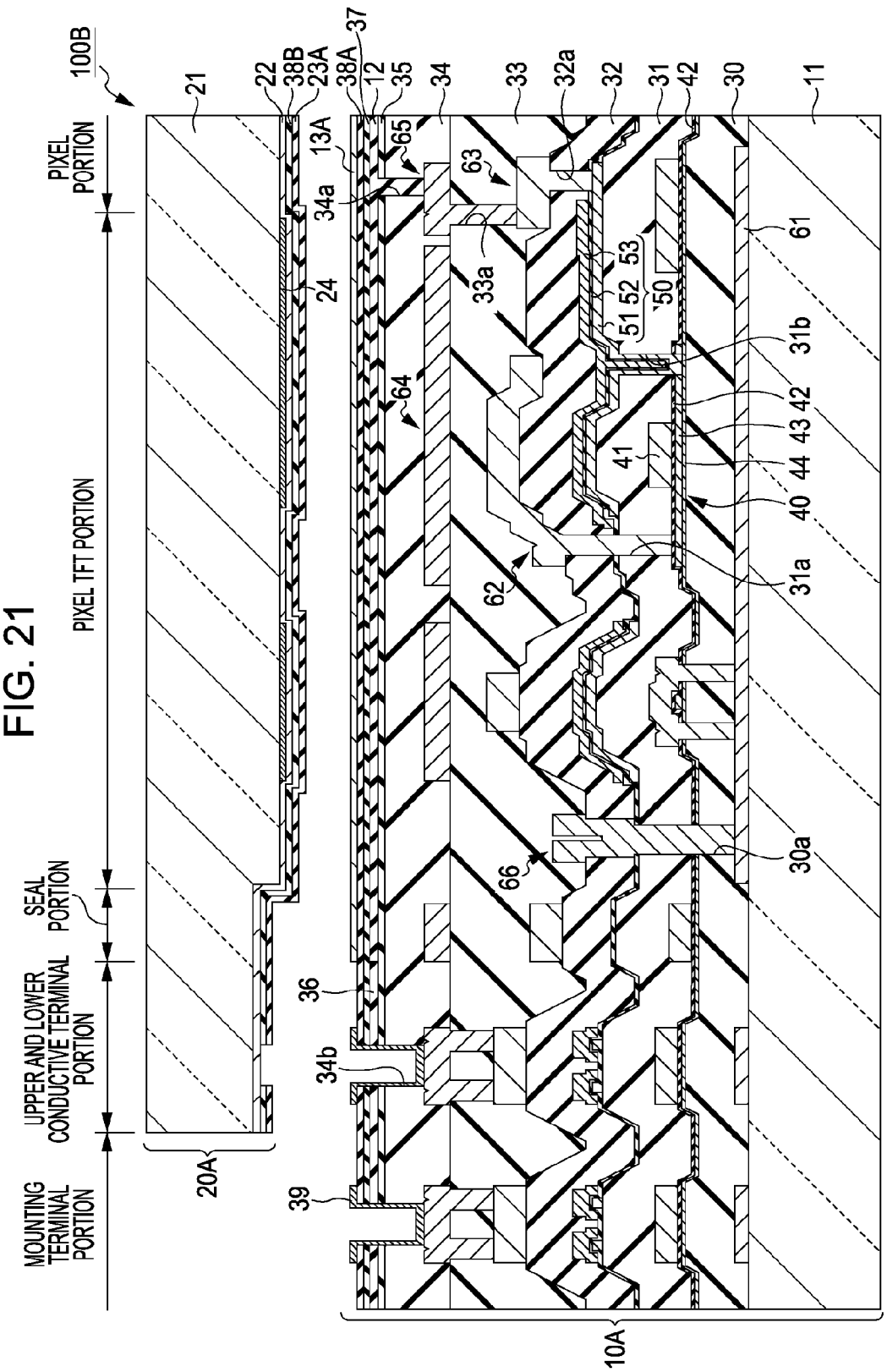
FIG. 21 is a cross-sectional view illustrating the overall configuration of a liquid crystal panel according to a fourth embodiment.

FIG. 21 is a cross-sectional view illustrating the overall configuration of a liquid crystal panel 100B according to the fourth embodiment. Note that FIG. 21 is a cross-sectional view illustrating the overall configuration of the liquid crystal panel 100B, which corresponds to that in FIG. 13. The liquid crystal panel 100B according to this embodiment differs from the liquid crystal panel 100A of the third embodiment in that the first pre-tilt angle in a first orientation film 13A on the side of an element substrate 10A is set to be greater than the second pre-tilt angle in a second orientation film 23A on the side of an opposing substrate 20A (that is, that the second pre-tilt angle is set to be closer to a vertical orientation than the first pre-tilt angle). In FIG. 21, elements identical to those in FIG. 13 are given identical reference numerals, and detailed descriptions thereof will be omitted.

As shown in FIG. 21, the liquid crystal panel 100B includes the element substrate 10A, the opposing substrate 20A disposed opposite to the element substrate 10A, and a liquid crystal layer held between the two substrates.

The element substrate 10A includes: a substrate main body 11 configured of a light-transmissive material such as glass, silica, or the like; the TFTs 40 and pixel electrodes 12 formed within the substrate main body 11 (that is, on the side of the liquid crystal layer), and a first orientation base film 38A and the first orientation film 13A that cover the pixel electrodes 12; and so on.

The opposing substrate 20A includes: a substrate main body 21 configured of a light-transmissive material such as glass, silica, or the like; a light-blocking film 24 formed in the substrate main body 21 (on the side of the liquid crystal layer); an opposing electrode 22 that covers the light-blocking film 24; and a second orientation base film 38B and second orientation film 23A that cover the opposing electrode 22; and so on.

The pixel electrodes 12 are provided in the element substrate 10A, and the first orientation film 13A is provided thereabove. The pixel electrodes 12 are configured of, for example, a conductive film such as aluminum (Al) or the like. The thickness of each pixel electrode 12 is, for example, more than or equal to 180 nm and less than or equal to 220 nm. Meanwhile, the thickness of the first orientation film 13A is, for example, more than or equal to 40 nm and less than or equal to 80 nm. Meanwhile, the first pre-tilt angle in the first orientation film 13A, which takes the thickness direction of the element substrate 10A as a reference, is, for example, 7.2°.

The opposing electrode 22A is provided across the entire surface of the opposing substrate 20A, and the second orientation film 23A is provided thereabove. The opposing electrode 22A is configured of a transparent conductive film such as, for example, an ITO film or the like. The thickness of the opposing electrode 22A is, for example, more than or equal to 120 nm and less than or equal to 160 nm. Meanwhile, the thickness of the second orientation film 23A is, for example, more than or equal to 40 nm and less than or equal to 80 nm. Furthermore, the second pre-tilt angle in the second orientation film 23A, which takes the thickness direction of the opposing substrate 20A as a reference, is, for example, 1.2°.

In this embodiment, the first pre-tilt angle (7.2°) in the first orientation film 13A on the side of the element substrate 10A is set to be greater than the second pre-tilt angle (1.2°) in the second orientation film 23A on the side of the opposing substrate 20A. Note that the first pre-tilt angle can be made greater than the second pre-tilt angle by making the deposition rate when forming the first orientation film 13A on the side of the element substrate 10A lower than the deposition rate when forming the second orientation film 23A on the side of the opposing substrate 20A.

Figure 22A:
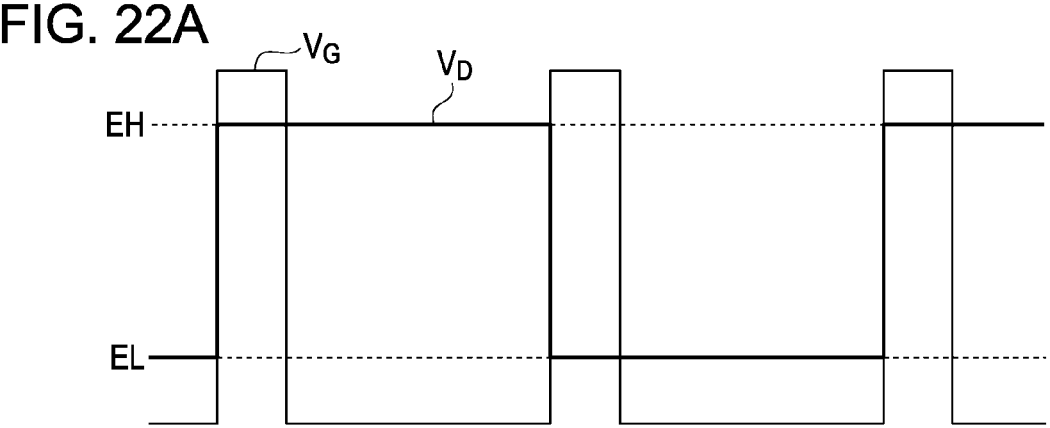
FIG. 22A is a chart illustrating a gate voltage and a driving voltage waveform according to the fourth embodiment.
Figure 22B:
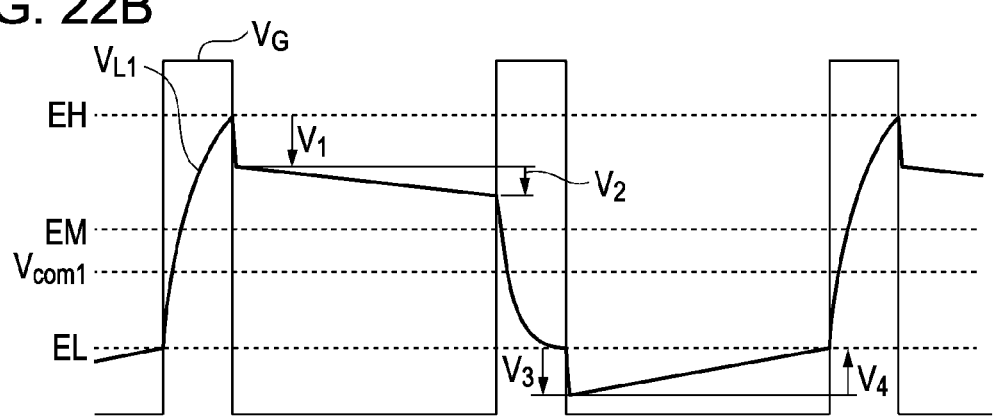
FIG. 22B is a chart illustrating an effective voltage waveform of a liquid crystal layer.
Figure 22C:
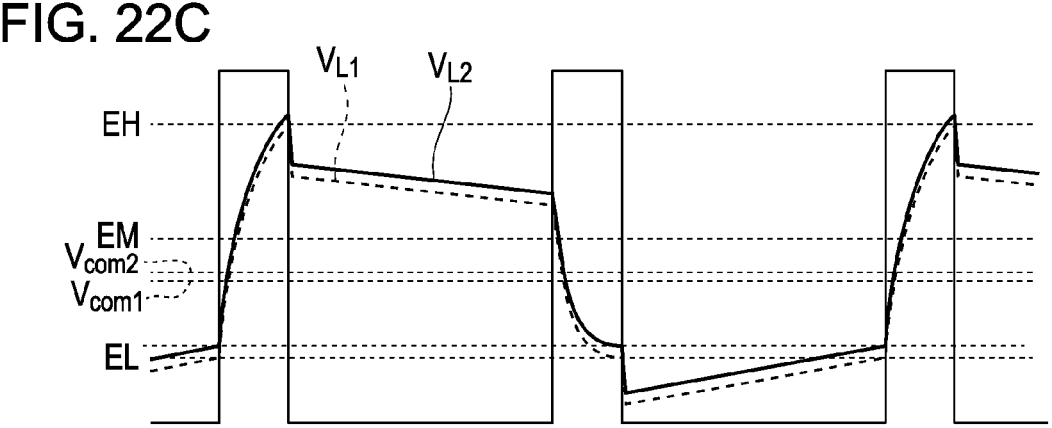
FIG. 22C is a chart illustrating an effective voltage waveform of a liquid crystal layer after a certain amount of driving time has passed from the state shown in FIG. 22B.

FIGS. 22A through 22C are charts illustrating a gate voltage and a driving voltage waveform according to the fourth embodiment. FIG. 22A is a chart indicating a gate voltage and a driving voltage waveform that corresponds to that shown in FIG. 14A. FIG. 22B is a chart illustrating an effective voltage waveform of a liquid crystal layer that corresponds to that shown in FIG. 14B. FIG. 22C is a chart illustrating an effective voltage waveform of a liquid crystal layer after a certain amount of driving time has passed from the state shown in FIG. 22B, corresponding to that shown in FIG. 14C. The effective voltage waveform of the liquid crystal layer according to this embodiment differs from the effective voltage waveform of the liquid crystal layer according to the third embodiment in that the waveform is shifted in the positive direction of the potential after a certain amount of driving time has passed. In FIGS. 22A through 22C, elements identical to those in FIGS. 14A through 14C are given identical reference numerals, and detailed descriptions thereof will be omitted. Note that in FIGS. 22A through 22C, the horizontal axis represents the passage of time, whereas the vertical axis represents a potential.

As shown in FIG. 22A, the potential of a driving voltage waveform $V_D$ switches alternately between a high potential EH (for example, 12 V) and a low potential EL (for example, 2 V) in synchronization with the rise of a gate voltage $V_G$.

As shown in FIG. 22B, when the gate voltage $V_G$ rises, the switching element turns on, and the pixel electrode 12 is charged. The potential of an effective voltage waveform $V_{L1}$ of the liquid crystal layer essentially rises from the low potential EL to the high potential EH.

As shown in FIG. 22C, the effective voltage waveform $V_{L2}$ after the liquid crystal layer has been driven for a certain amount of time often shifts from the effective voltage waveform $V_{L1}$ found immediately after the start of the driving. Note that although there are cases where the potential of the effective voltage waveform $V_{L2}$ shifts in the positive or negative direction, FIG. 22C illustrates a state in which the effective voltage waveform $V_{L2}$ has shifted in the positive direction. In response to the shifted effective voltage waveform $V_{L2}$, an opposing electrode potential $V_{com2}$ that has been optimized to achieve balance between the positive and negative is considered. The post-shift opposing electrode potential $V_{com2}$ is shifted in the positive direction from the pre-shift opposing electrode potential $V_{com1}$.

Here, with the past technology, whether the potential of the effective voltage waveform $V_{L2}$ would shift in the negative or the positive direction was uncertain. In other words, whether the post-shift opposing electrode potential $V_{com2}$ will shift in the negative or positive direction from the pre-shift opposing electrode potential $V_{com1}$ has been uncertain.

However, the inventors discovered that the effective voltage waveform $V_{L2}$, optimized so as to be balanced between positive and negative, shifts in the positive direction of the potential (that is, the $V_{com}$ shift is a shift in the positive direction) by the first pre-tilt angle in the first orientation film 13A on the side of the element substrate 10A being set to be greater than the second pre-tilt angle in the second orientation film 23A on the side of the opposing substrate 20A (that is, the second pre-tilt angle is set to be closer to a vertical orientation than the first pre-tilt angle). This was also estimated based on the results of experiments carried out by the inventors (see FIG. 15).

When the $V_{com}$ shift becomes greater than a certain amount, the difference between the modulation effects of the liquid crystal layer during the low potential side interval and the high potential side interval becomes greater. When this happens, a difference can be seen, in the displayed image, in the amount of light modulated during the low potential side interval and the amount of light modulated during the high potential side interval, which leads to the occurrence of flicker in the image.

As a result of intensive considerations made based on knowledge obtained from experimental data, the inventors determined that it is most effective to carry out separate corrections for the first phenomenon and the second phenomenon. In other words, a method for correcting the first phenomenon involves applying a constant correction voltage regardless of the driving voltage, whereas a method for correcting the second phenomenon is a method in which the length of the interval in which the positive polarity is held is lengthened compared to the length of the interval in which the negative polarity is held in accordance with the direction and size of the DC voltage component caused by the stated difference in properties.

Meanwhile, searching for a polarity duty in which the change over time of flicker is a minimum (called simply "searching" hereinafter) takes a significant amount of time. For example, adjustments when carrying out the search required approximately 10 to 60 minutes of electrification for a single point of measurement.

However, because the inventors discovered that the effective voltage waveform $V_{L2}$ shifts in the positive potential direction by setting the first pre-tilt angle in the first orientation film 13A on the side of the element substrate 10A to be greater than the second pre-tilt angle in the second orientation film 23A on the side of the opposing substrate 20A, the time required for the searching can be shortened.

Figure 23:
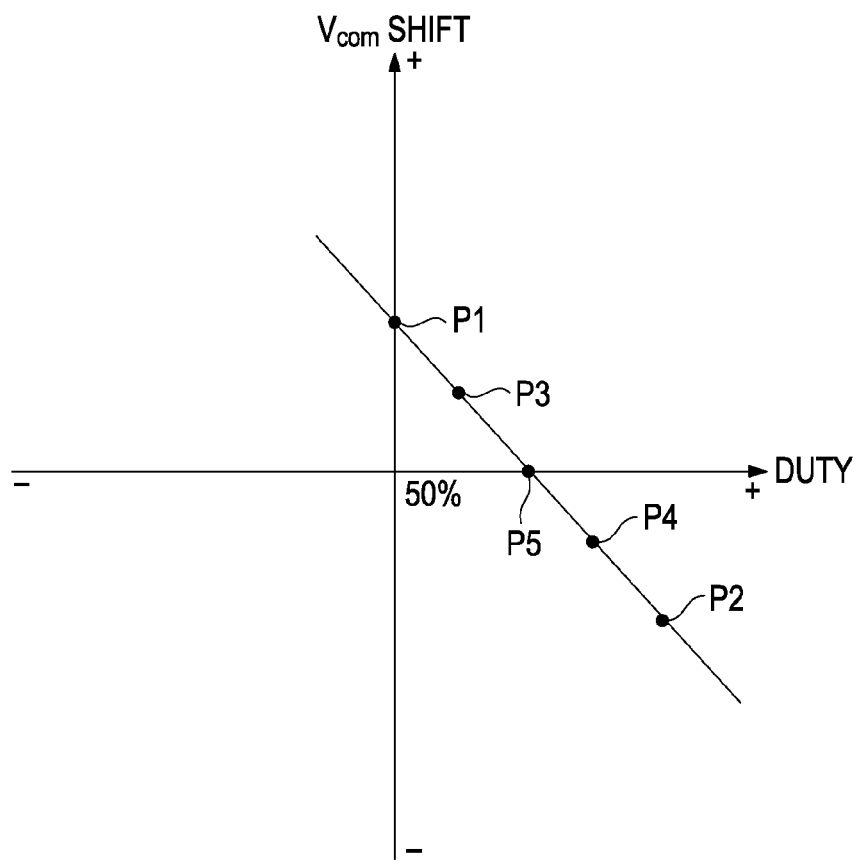
FIG. 23 is a diagram illustrating the relationship between a duty and a $V_{com}$ shift according to the fourth embodiment.

FIG. 23 is a diagram illustrating a relationship between the duty and $V_{com}$ shift, obtained through searching carried out by the inventors. Note that in FIG. 23, the horizontal axis represents the duty (that is, the proportion of time between the application time of a positive polarity voltage and the application time of a negative polarity voltage), whereas the vertical axis represents the $V_{com}$ shift ($V_{com2}$-$V_{com1}$). Here, the intersection between the horizontal axis and the vertical axis is taken as a duty of 50:50, and the right side of the horizontal axis is taken as the direction in which the positive polarity voltage application time is increased. Likewise, the upward side of the vertical axis is taken as the direction in which the $V_{com}$ shift is positive. Furthermore, in FIG. 23, the numeral P1 indicates the first (initial) point of measurement, the numeral P2 indicates the second point of measurement, the numeral P3 indicates the third point of measurement, the numeral P4 indicates the fourth point of measurement, and the numeral P5 indicates the fifth (final) point of measurement. Although the searching is carried out using a total of five measurements in FIG. 23, the invention is not limited to this number, and the number of measurements may be changed as necessary and appropriate.

As shown in FIG. 23, the first point of measurement P1 is set to a region in which the duty is more than or equal to 50%. This is clear, through the stated experimental result, that disposing the stated dielectric film between the pixel electrodes 12 and the first orientation film 13 on the side of the element substrate 10 causes the $V_{com}$ shift direction to shift in the positive direction. In other words, because the line descends to the right and because the fifth point of measurement P5 is greater than a duty of 50%, a range at least excluding regions where the duty is lower than 50% (that is, a region in which the duty is greater than or equal to 50%) may be measured. Accordingly, it is not necessary to set the first point of measurement P1 to a region in which the duty is lower than 50%, which makes it possible to reduce the frequency of the measurement.

Next, the second point of measurement P2 is set further down the horizontal axis, to an area with a higher duty than the first point of measurement P1. In this manner, the positive/negative direction to which the parameters (duty) are to be changed can be determined based on the first measurement result. In other words, it is not necessary to set the second point of measurement P2 to a region in which the duty is less than the first point of measurement P1, which makes it possible to reduce the frequency of the measurement. Furthermore, plotting the first point of measurement P1 and the second point of measurement P2 makes it possible to calculate the approximate slope of the line that slopes downward and to the right.

Next, the third point of measurement P3 is set along the approximated slope, between the first point of measurement P1 and the horizontal axis. Furthermore, the fourth point of measurement P4 is set along the approximated slope, between the second point of measurement P2 and the horizontal axis. In this manner, the search range is narrowed while estimating the value of $(V_{com2}-V_{com1})$ at which the $V_{com}$ shift becomes essentially 0. Plotting the third point of measurement P3 and the fourth point of measurement P4 makes it possible to approximate the $V_{com}$ shift that corresponds to an allowable limit for flicker.

The fifth point of measurement P5 is set on the horizontal axis. Specifically, the fifth point of measurement P5 is set to the point where a straight line that approximately connects the measurement points P1 through P4 and the horizontal axis intersect. As described thus far, the polarity duty in which the change in the flicker over time is a minimum can be calculated. Accordingly, through this adjustment method, it is possible to reduce the amount of time required for the search by reducing the frequency of measurements.

Liquid Crystal Device Driving Method

The liquid crystal device driving method described hereinafter was devised by the inventors based on careful consideration and inventive ideas for concretely realizing the content discussed herein.

Figure 24:
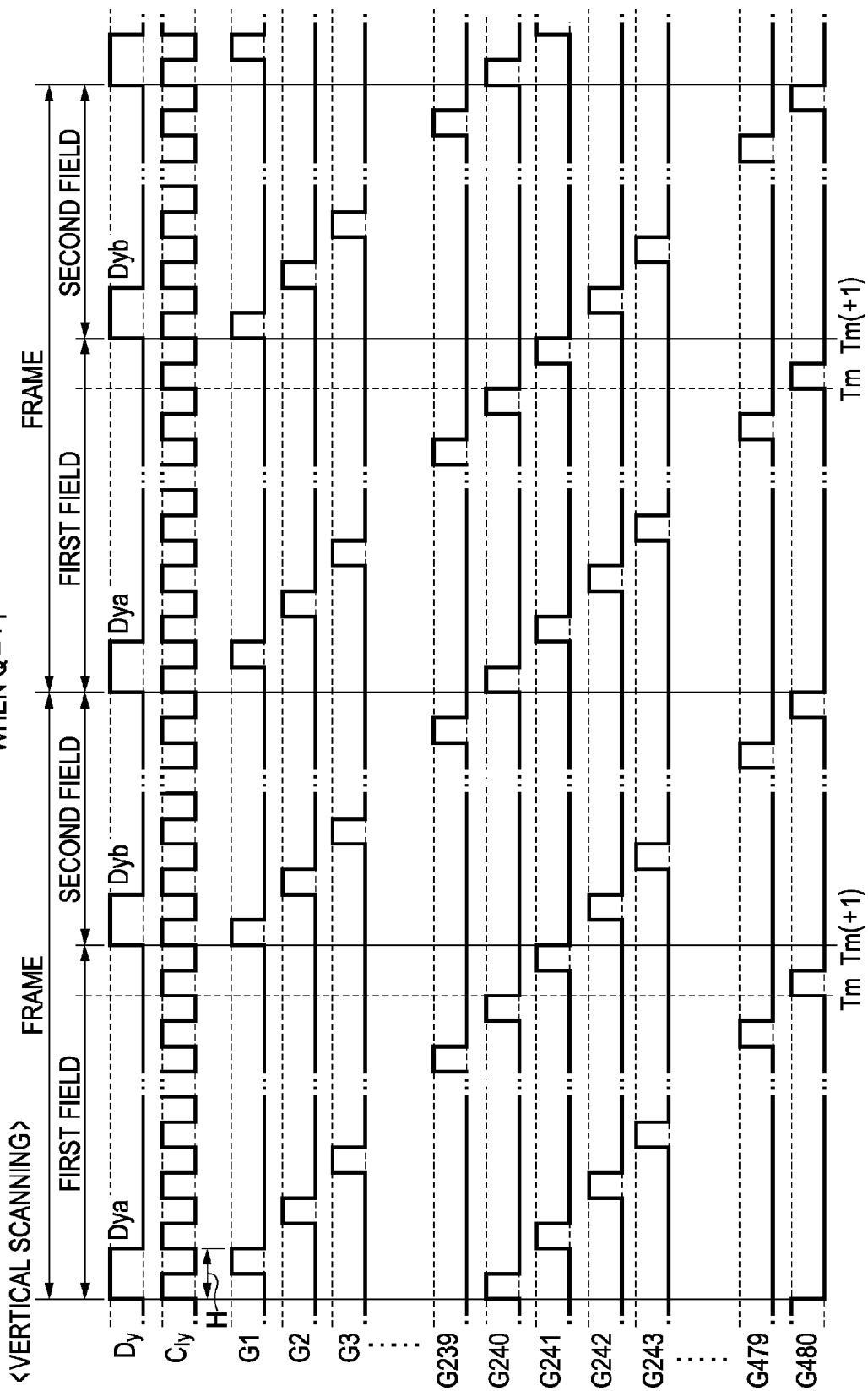
FIG. 24 is a timing chart illustrating a scanning signal system when a specified value is "+1".

FIG. 24 is a timing chart of a scanning signal system when a specified value Q is "+1". In this embodiment, the multiple scanning lines 61 are divided into a first scanning line group and a second scanning line group; furthermore, in a single frame, either one of scanning lines 61 in the first scanning line group and either one of scanning lines 61 in the second scanning line group are selected in an alternating manner, and each scanning line 61 is selected twice in a single frame. In other words, double-speed area scanning inversion driving is used. Note that in this embodiment, the operator 170 (see FIG. 9) is operated by, for example, a user, and the specified value Q, in a range from, for example, "0" to "+10", can be outputted in accordance with those operations.

First, a driving method of the scanning lines 61 will be described. FIG. 24 is a timing chart illustrating scanning signals G1 to G480 outputted by the scanning line driving circuit 130 within the context of the relationship between a start pulse and a clock signal. Here, a "frame" refers to the interval required for the liquid crystal panel 100B to display a single image. Furthermore, in a single frame interval (a predetermined interval), the interval spanning from the output of a first start pulse Dya to the output of the second start pulse Dyb is taken as a first field (a first interval), and the interval spanning from the output of the second start pulse Dyb to the output of the next first start pulse Dya is taken as a second field (a second interval). In addition, each scanning line 61 is selected once in each field in a single frame interval, or in other words, is selected twice.

The vertical synchronization signal $V_S$ in this embodiment has a frequency of 120 Hz as mentioned above, and therefore a single frame interval is fixed at 8.33 ms. A control circuit 152 (see FIG. 9) outputs a clock signal, whose duty ratio is 50%, for 480 cycles, which is equal to the number of scanning lines 61, throughout a single frame interval. Note that the interval of a single cycle of the clock signal is expressed as H.

Meanwhile, the control circuit 152 outputs start pulses having a pulsewidth equal to one cycle of the clock signal in the following manner, each time the clock signal rises to the H level. That is, the control circuit 152 outputs the first start pulse Dya at the beginning of a single frame interval (at the beginning of the first field). Meanwhile, because the specified value Q is a negative value, the control circuit 152 outputs the second start pulse Dyb an amount of time, following the first start pulse Dya, of "Q×H" following a timing Tm at which 240 cycles' worth of the clock signal was outputted.

Accordingly, as shown in FIG. 24, in the case where the specified value Q is "+1", the second start pulse Dyb is outputted at a timing Tm(+1), which is after the timing Tm by one clock signal cycle.

Here, although the start pulses are outputted alternately, the output timing of the first start pulse Dya does not change regardless of the specified value Q. Accordingly, specifying the first start pulse Dya outputted every frame (every 8.33 ms) also makes it possible to specify the second start pulse Dyb that necessarily defines the start of the second field.

The scanning line driving circuit 130 outputs operational signals as described hereinafter after such start pulses and clock signal. That is, when the first start pulse Dya is supplied, the scanning line driving circuit 130 sequentially sets the scanning signals G1 to G480 to the H level each time the clock signal changes to the L level. On the other hand, when the second start pulse Dyb is supplied, the scanning line driving circuit 130 sequentially sets the scanning signals G1 to G480 to the H level each time the clock signal changes to the H level.

The first start pulse Dya is supplied at the start of a single frame interval (the first field), and thus the selection of the scanning line 61 triggered by the supply of the first start pulse Dya does not change based on the specified value Q. Furthermore, the selection of the scanning line 61 triggered by the supply of the first start pulse Dya is executed during an interval in which the clock signal is at the L level, and thus is executed at an interval equivalent to half of a clock signal cycle across the first field and the second field, starting with the scanning line 61 in the first row and continuing down the screen, in order, with the second, third, fourth, and so on up to the 480th row.

On the other hand, the second start pulse Dyb is supplied at the start of the second field, and thus the selection of the scanning line 61 triggered by this start pulse is shifted forward or backward overall, depending on the specified value Q. That is, the selection of the scanning line 61 triggered by the supply of the second start pulse Dyb is executed during an interval in which the clock signal is at the H level, and thus is executed between the selections caused by the supply of the first start pulse Dya, across the second field of a frame and the first field of the next frame, starting with the scanning line 61 in the first row and continuing down the screen, in order, with the second, third, fourth, and so on up to the 480th row. In other words, the selections of the first through 240th rows in the second field of a certain frame are, when the specified value Q is, for example, "+1", shifted overall an amount equivalent one clock signal cycle later than the timing Tm.

Note that the driving method for the data lines 62 is the same as that described in the third embodiment, and thus detailed descriptions thereof will be omitted here (see FIGS. 18 and 19).

Next, a description of the overall driving method will be given.

First, in FIG. 9, the control circuit 152 stores the display data $V_{id}eo$ supplied from an external device in a frame memory 157. Thereafter, when the scanning line 61 in a certain pixel row in the liquid crystal panel 100A is selected, the display data $V_{id}eo$ of that pixel row is read out at a speed that is twice the storage speed. The display data $V_{id}eo$ is then converted into an analog data signal $V_{id}$ by the DA converter 158. Furthermore, in accordance with the readout of the display data $V_{id}eo$, the sampling signal output circuit 142 is controlled via a control signal so that the sampling signals S1 to S640 sequentially transition to H level.

As shown in FIG. 24, when the specified value Q is, for example, "+1", the second start pulse Dyb is outputted at a timing that is temporally after the timing Tm by an amount equivalent to one clock signal cycle. Accordingly, if the specified value Q is "+1", the first field interval is 241 cycles' worth of the clock signal, whereas the second field interval is 239 cycles' worth of the clock signal.

The scanning lines 61 in the first field are selected in the following order: 240, 1, 241, 2, 242, 3, and so on up to 480. Accordingly, the control circuit 152 controls the scanning line driving circuit 130 so that the 240th scanning line 61 is selected first. Meanwhile, the control circuit 152 causes the display data processing circuit 156 to read out the display data $V_{id}eo$ stored in the frame memory 157 that corresponds to the 240th frame at double speed. Then, a negative polarity data signal $V_{id}$ is generated from the display data $V_{id}eo$ by the DA converter 158, and, as shown in FIG. 10, the sampling signal output circuit 142 is controlled so that the sampling signals S1 to S640 are sequentially and exclusively set to the H level, in accordance with the readout of the data signal $V_{id}$. When the sampling signals S1 to S640 sequentially transition to the H level, the TFTs 40 are turned on in order, and the data signal $V_{id}$ supplied to the image signal lines is sampled by the data lines 62 in the first through 640th columns.

On the other hand, when the scanning line 61 is selected, the scanning signal G240 transitions to the H level, and thus all of the TFTs 40 of the pixels located in the 240th row are turned on. Accordingly, the negative polarity voltage of the data signal $V_{id}$ sampled by the data lines 62 is applied as-is to the pixel electrodes 12. Through this, a negative polarity voltage based on the tone specified by the display data $V_{id}eo$ is written into and held in the liquid crystal capacitors 120 in the pixels in the 240th row and the first, second, third, fourth, and so on up to the 639th and 640th column. Thereafter, in the first field, similar voltage writing operations are executed in the following order of rows: 1, 241, 2, 242, 3, and so on up to 480. Through this, a positive polarity voltage based on the tone is written into and held in the pixels in the first through the 241st rows, and a negative polarity voltage based on the tone is written into and held in the pixels in the 242nd through the 480th rows.

On the other hand, in the second field, the scanning lines 61 are selected in the order of rows 1, 242, 2, 243, 3, 244, and so on up to 239 and 480, and the writing polarities in the same rows are inverted. Accordingly, a negative polarity voltage based on the tone is written into and held in the pixels in the first through the 241st rows, and a positive polarity voltage based on the tone is written into and held in the pixels in the 242nd through the 480th rows.

Figure 25:
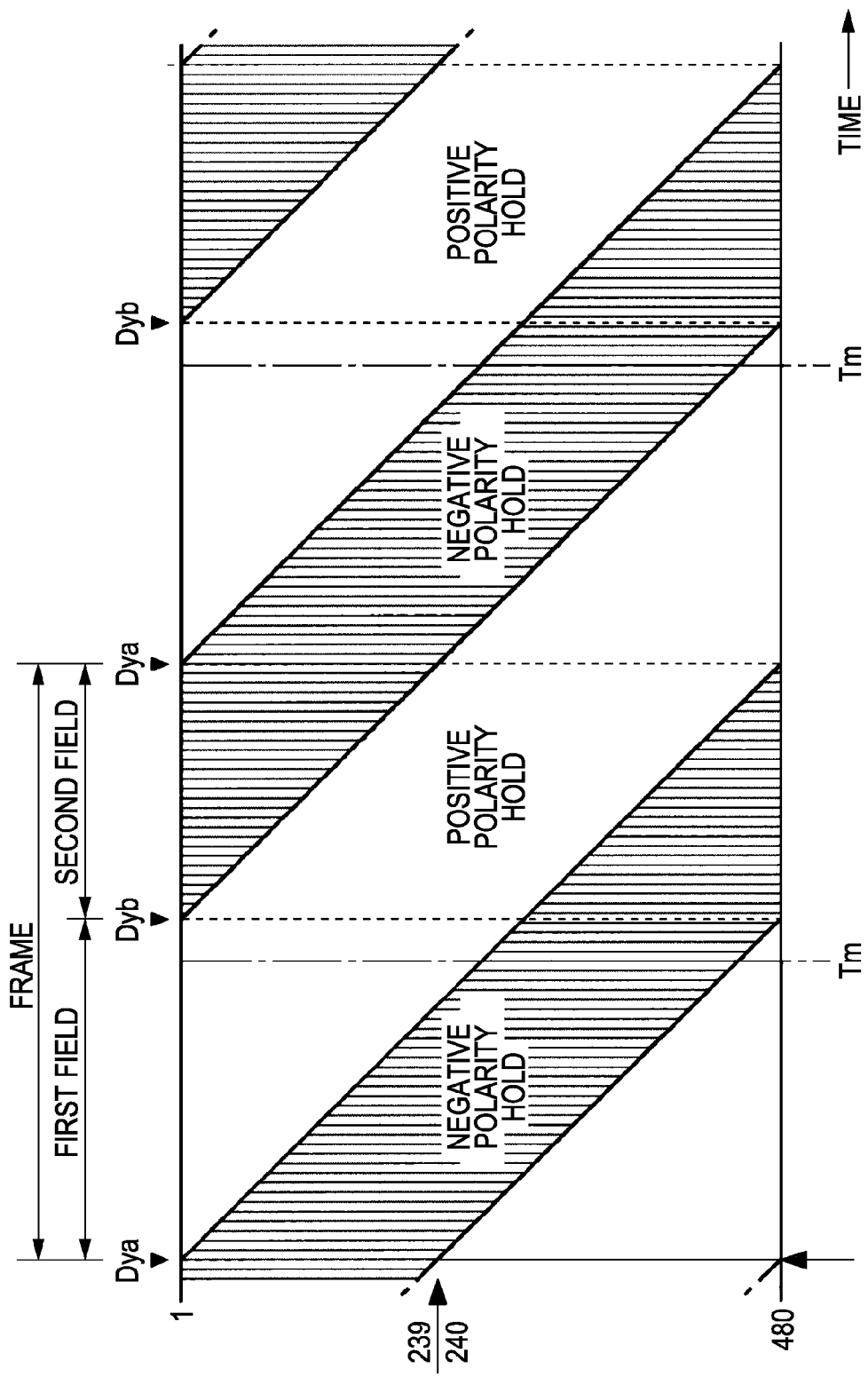
FIG. 25 is a diagram illustrating the writing states of respective lines along with the passage of time over consecutive frames in the case where a specified value is "+1".

FIG. 25 is a diagram illustrating the writing states of respective rows along with the passage of time over consecutive frames in the case where the specified value Q is "+1". Note that the writing into the scanning line 61 in the uppermost stage, or in other words, the start time of the positive polarity holding interval, is technically a timing that is half a clock signal cycle delayed after the first start pulse Dya has been supplied; however, in FIG. 25, this is aligned with the first start pulse Dya for the sake of simplicity.

As shown in FIG. 25, a negative polarity is written into the pixels in the rows 240, 241, 242, and so on up to 480 in the first field, whereas a positive polarity is written into the pixels in the rows 1, 2, 3, and so on up to 239, and these polarities are held until the next write. On the other hand, a negative polarity is written into the pixels in the rows 1, 2, 3, and so on up to 239 in the second field, whereas a positive polarity is written into the pixels in the rows 240, 241, 242, and so on up to 480, and these polarities are held until the next write. In other words, it can also be said that in each field, two scanning lines 61, or the scanning line 61 into which the positive polarity is written and the scanning line 61 into which the negative polarity is written, are selected.

In this manner, in the case where the specified value Q is "+1", the output timing of the second start pulse Dyb is later. For this reason, the holding time of the negative polarity voltage written due to the selection triggered by the supply of the second start pulse Dyb is shorter than the holding time of the positive polarity voltage written due to the selection triggered by the supply of the first start pulse Dya. In other words, if the specified value Q is a positive value, the holding time of the negative polarity voltage written due to the selection triggered by the supply of the second start pulse Dyb becomes shorter than the holding time of the positive polarity voltage written due to the selection triggered by the supply of the first start pulse Dya as the absolute value of the specified value Q increases. For this reason, the negative polarity effective voltage value applied to the liquid crystal capacitor 120 is less than the positive polarity effective voltage value.

In other words, the first field in which the positive polarity voltage is applied is longer than the second field in which the negative polarity voltage is applied. Accordingly, in a single frame, the positive polarity voltage application time is set to be longer than the negative polarity voltage application time, and thus the $V_{com}$ shift correction can be carried out in an effective manner.

According to the liquid crystal device of this embodiment, the opposing electrode potential $V_{com}$ is shifted in advance and set so that flicker caused by parasitic capacitance in the switching elements is reduced, and thus the first phenomenon can be corrected. Furthermore, in a predetermined interval, because the length of the first interval is set to be longer than the length of the second interval, the second phenomenon can also be corrected. This correction is derived from a discovery done by the inventors such that the effective voltage waveform shifts in the positive direction of the potential, by setting the first pre-tilt angle in the first orientation film 13A on the side of the element substrate 10A to be greater than the second pre-tilt angle in the second orientation film 23A on the side of the opposing substrate 20A (that is, setting the second pre-tilt angle to be closer to a vertical orientation than the first pre-tilt angle). This was estimated based on the results of experiments carried out by the inventors. In other words, it is clear that setting the first pre-tilt angle in the first orientation film 13A on the side of the element substrate 10A to be greater than the second pre-tilt angle in the second orientation film 23A on the side of the opposing substrate 20A shifts $V_{com}$ in the positive direction (that is, the post-shift opposing electrode potential $V_{com2}$ shifts in the positive direction from the pre-shift opposing electrode potential $V_{com1}$), compared to the case in which the first pre-tilt angle and the second pre-tilt angle are the same. In this manner, the direction of the $V_{com}$ shift is clearly recognized in advance, and thus the correction to cope with the $V_{com}$ shift can be carried out more precisely than in the case of the past techniques, where which direction the shift would occur in was not clear. Accordingly, a liquid crystal device capable of improving the display quality by suppressing the occurrence of display problems such as flicker can be provided.

Furthermore, it is clear that according to this configuration, $V_{com}$ will shift in the positive direction, as compared to the case where the pixel electrodes 12 and the opposing electrode 22 are configured of the same material (for example, ITO), and thus there is a marked asymmetry between the properties of the element substrate 10A and the properties of the opposing substrate 20A. This was estimated based on the results of experiments carried out by the inventors. For this reason, there is a marked occurrence of the DC voltage component caused by the difference in properties between the element substrate 10A and the opposing substrate 20A that hold the liquid crystal layer, compared to the case where both the pixel electrode 12 and the opposing electrode 22 are configured of, for example, ITO. Accordingly, it is possible to improve the display quality by suppressing the occurrence of display problems such as flicker.

According to the driving method for the liquid crystal device of this embodiment, the opposing electrode potential $V_{com}$ is shifted in advance and set so that flicker caused by parasitic capacitance in the switching elements is reduced, and thus the first phenomenon can be corrected. Furthermore, in a predetermined interval, because the length of the first interval is set to be longer than the length of the second interval, the second phenomenon can also be corrected. This correction is derived from a discovery done by the inventors such that the effective voltage waveform shifts in the positive direction of the potential, by setting the first pre-tilt angle in the first orientation film 13A on the side of the element substrate 10A to be greater than the second pre-tilt angle in the second orientation film 23A on the side of the opposing substrate 20A. This was estimated based on the results of experiments carried out by the inventors. Accordingly, it is possible to improve the display quality by suppressing the occurrence of display problems such as flicker.

The stated embodiments describe what is known as a dot-sequential configuration, in which the pixels of a row are written into in order from the first column to the 640th column by sampling the voltages of the data signals $V_{id}$ corresponding to tones in the pixels located along a single scanning line 61 in order from the first to the 640th columns; however, the invention is not limited thereto. For example, a configuration that employs what is known as phase expansion (also known as serial-parallel conversion) driving, in which the data signal $V_{id}$ is expanded by n times (where n is an integer greater than or equal to 2) along the time axis and is supplied to n image signal lines, may be used as well (see JP-A-2000-112437).

Alternatively, a so-called line-sequential configuration may be employed, whereby the data signal $V_{id}$ is supplied to all the data lines 62 at once.

The same effects described thus far in the embodiments can be obtained using these driving methods as well.

Furthermore, the aforementioned embodiments describe employing, as the liquid crystal mode, either a normally-black mode in which black is displayed when no voltage is being applied or a normally-white mode in which white is displayed when no voltage is being applied; however, the invention can also be applied in a case where another liquid crystal mode is employed.

Next, an example of an electronic apparatus in which the liquid crystal device of the invention is applied will be described with reference to FIG. 26.

Figure 26:
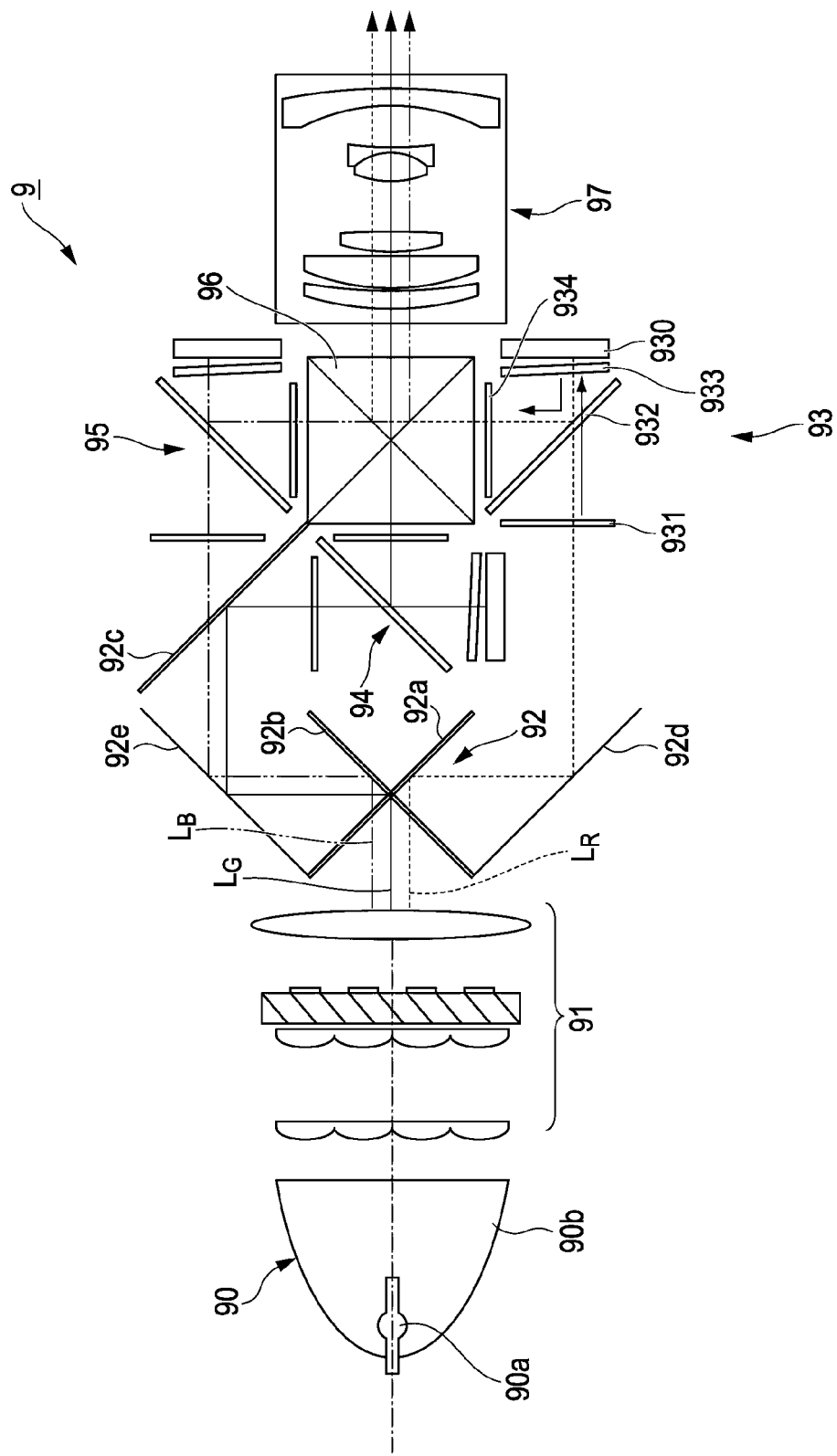
FIG. 26 is a schematic diagram illustrating the overall configuration of a projector serving as an example of an electronic apparatus.

FIG. 26 is a schematic diagram illustrating the overall configuration of a projector serving as an example of an electronic apparatus.

A projector 9 illustrated in FIG. 26 includes a light source 90, an integrator optical system 91, a color separation optical system 92, three image forming systems 93 to 95, a color combining element 96, and a projection optical system 97. The three image forming systems 93 to 95 each include the liquid crystal device according to the invention.

The light source light emitted from the light source 90 enters into the integrator optical system 91. The light source light that has entered into the integrator optical system 91 undergoes brightness equalization, and the deflection state of the light is aligned; the light is then emitted. The light source light emitted from the integrator optical system 91 is separated by the color separation optical system 92 into red light $L_R$, green light $L_G$, and blue light $L_B$, and the respective color lights enter into respective image forming systems 93 to 95. The image forming system 93 forms a red image, the image forming system 94 forms a green image, and the image forming system 95 forms a blue image. In other words, the colored light that has entered the image forming systems becomes an image that is modulated based on image data of an image to be displayed. The three colors of image light emitted from the three image forming systems 93 to 95 are combined by the color combining element 96, and are then projected onto a projection surface (not shown) such as a screen by the projection optical system 97. Through this, a full-color image is projected on the projection surface.

Next, the constituent elements of the projector 9 will be described in detail.

The light source 90 includes a light source lamp 90a and a paraboloid reflector 90b. Light emitted from the light source lamp 90a is reflected in one direction by the paraboloid reflector 90b, becoming an approximately parallel beam of light as a result, which then enters into the integrator optical system 91 as the light source light. The light source lamp 90a is configured of, for example, a metal halide lamp, a xenon lamp, a high-pressure mercury lamp, a halogen lamp, or the like. Meanwhile, the reflector can be configured using an oval reflector, a spherical reflector, or the like instead of the paraboloid reflector 90b. A parallelizing lens that makes the light emitted from the reflector parallel may be used depending on the shape of the reflector.

The integrator optical system 91 includes a first lens array, a second lens array, a light entry opening aperture, a polarization conversion element, and a compound lens. The optical axis of the integrator optical system 91 matches approximately with the optical axis of the light source 90, and each of the constituent elements of the integrator optical system 91 as stated above is disposed so that its center is arranged along the optical axis of the integrator optical system 91.

The color separation optical system 92 includes first through third dichroic mirrors 92a, 92b, and 92c having wavelength selection surfaces, and first and second reflective mirrors 92d and 92e. The first dichroic mirror 92a has properties of reflecting red light but allowing green light and blue light to pass. The second dichroic mirror 92b has properties of allowing red light to pass but reflecting green light and blue light. The third dichroic mirror 92c has properties of reflecting green light but allowing blue light to pass. The first and second dichroic mirrors 92a and 92b are disposed so that the respective wavelength selection surfaces are approximately orthogonal to each other and so that the respective wavelength selection surfaces are at an approximately 45° to the optical axis of the integrator optical system 91.

The red light $L_R$, the green light $L_G$, and the blue light $L_B$ contained in the light source light that has entered the color separation optical system 92 are separated as described below, and the respective colors of light into which the light source light has been separated enter into the corresponding image forming systems 93 to 95.

The light $L_R$ passes through the second dichroic mirror 92b and is reflected by the first dichroic mirror 92a, is then reflected by the first reflective mirror 92d, and finally enters into the first image forming system 93.

The light $L_G$ passes through the first dichroic mirror 92a and is reflected by the second dichroic mirror 92b, is then reflected by the second reflective mirror 92e, and is then reflected by the third dichroic mirror 92c; the light $L_G$ then enters into the second image forming system 94.

The light $L_B$ passes through the first dichroic mirror 92a and is reflected by the second dichroic mirror 92b, is then reflected by the second reflective mirror 92e, and then passes through the third dichroic mirror 92c; the light $L_B$ then enters into the third image forming system 95.

The three image forming systems 93 to 95 all have the same configurations, and thus the image forming system 93 for red light will be described here as a representative example.

The image forming system 93 includes a liquid crystal device 930, an entry-side polarizer 931, a polarizing separation element 932, an optical compensation plate 933, and an exit-side polarizer 934. The entry-side polarizer 931 allows P-polarized red light to pass through the polarizing separation element 932. The red light that has passed through the polarizing separation element 932 then passes through the optical compensation plate 933 and enters into the liquid crystal device 930, where the red light is modulated, thus becoming light that includes a polarized component representing an image (that is, S-polarized light with respect to the polarizing separation element 932).

The light emitted from the liquid crystal device 930 passes through the optical compensation plate 933 and enters into the polarizing separation element 932. Of the light modulated by the liquid crystal device 930, the S-polarized light is reflected by the polarizing separation element 932, and enters into the exit-side polarizer 934. The exit-side polarizer 934 allows the S-polarized light to pass through. The light that has passed through the exit-side polarizer 934 enters into the color combining element 96, and is projected after being combined as described above.

With the projector 9 of this embodiment, images are formed using a liquid crystal device in which the invention has been applied, and thus is capable of displaying a high-quality image by suppressing the occurrence of flicker, burn-in, and so on.

Note that the following can also be given as examples of electronic apparatuses: mobile telephones, personal computers, monitors for video cameras, car navigation systems, pagers, PDAs, calculators, word processors, workstations, videophones, POS terminals, digital still cameras, apparatuses including touch panels, and so on. The liquid crystal display device 100 according to the invention can be applied to these electronic apparatuses as well.

What is claimed is:

1. A method of driving a liquid crystal device, wherein the liquid crystal device includes
    an element substrate having multiple scanning lines, multiple data lines, switching elements, and pixel electrodes provided in correspondence to intersections between the scanning lines and the data lines,
    an opposing substrate disposed opposing the element substrate that includes an opposing electrode,
    a liquid crystal layer held between the element substrate and the opposing substrate,
    a first orientation film provided on the side of the element substrate that faces the liquid crystal layer, and
    a second orientation film provided on the side of the opposing substrate that faces the liquid crystal layer, with a first pre-tilt angle in the first orientation film set to be smaller than a second pre-tilt angle in the second orientation film, and
    the method comprises:
        applying an opposing electrode potential set so as to reduce flicker caused by parasitic capacitance in the switching elements to the opposing electrode;
        applying a positive polarity voltage and a negative polarity voltage alternately to the pixel electrodes, the positive polarity voltage being a high voltage relative to the opposing electrode potential and the negative polarity voltage being a low voltage relative to the opposing electrode potential; and
        setting, in a predetermined interval made up of a first interval in which the positive polarity voltage is applied and a second interval in which the negative polarity voltage is applied, a length of the first interval to be shorter than a length of the second interval.

2. The method according to claim 1, wherein a ratio between the length of the second interval and the length of the first interval is set to a range that is greater than 50.0/50.0 and less than or equal to 52.0/48.0 when the first pre-tilt angle is set so as to be 6° less than the second pre-tilt angle.

3. The method according to claim 1, wherein the pixel electrodes are configured of aluminum, and the opposing electrode is configured of indium tin oxide.

4. A method of driving a liquid crystal device, wherein the liquid crystal device includes
- an element substrate having a pixel electrode,
- an opposing substrate disposed opposing the element substrate and including an opposing electrode,
- a liquid crystal layer held between the element substrate and the opposing substrate,
- a first orientation film provided between the element substrate and the liquid crystal layer, and
- a second orientation film provided between the opposing substrate and the liquid crystal layer,
- wherein the first orientation film is configured to form a first pre-tilt angle that is an angle between the director of the liquid crystal layer at the first orientation film and the thickness direction of the liquid crystal layer,
- the second orientation film is configured to form a second pre-tilt angle that is an angle between the director of the liquid crystal layer at the second orientation film and the thickness direction of the liquid crystal layer, and
- the first pre-tilt angle is smaller than a second pre-tilt angle, and the method comprises:
- applying an opposing electrode potential set so as to reduce flicker caused by parasitic capacitance to the opposing electrode;
- applying a positive polarity voltage and a negative polarity voltage alternately to the pixel electrode, the positive polarity voltage being a high voltage relative to the opposing electrode potential and the negative polarity voltage being a low voltage relative to the opposing electrode potential; and
- setting, in a predetermined interval made up of a first interval in which the positive polarity voltage is applied and a second interval in which the negative polarity voltage is applied, a length of the first interval to be shorter than a length of the second interval.

5. An electronic apparatus, comprising:
- a liquid crystal device, and
- a processing circuit configured to drive the liquid crystal device, wherein
the liquid crystal device includes:
- an element substrate having multiple scanning lines, multiple data lines, switching elements, and pixel electrodes provided in correspondence to intersections between the scanning lines and the data lines,
- an opposing substrate disposed opposing the element substrate that includes an opposing electrode,
- a liquid crystal layer held between the element substrate and the opposing substrate,
- a first orientation film provided on the side of the element substrate that faces the liquid crystal layer, and
- a second orientation film provided on the side of the opposing substrate that faces the liquid crystal layer, with a first pre-tilt angle in the first orientation film set to be smaller than a second pre-tilt angle in the second orientation film, and the processing circuit is configured to drive the liquid crystal device by:
- applying an opposing electrode potential set so as to reduce flicker caused by parasitic capacitance in the switching elements to the opposing electrode;
- applying a positive polarity voltage and a negative polarity voltage alternately to the pixel electrodes, the positive polarity voltage being a high voltage relative to the opposing electrode potential and the negative polarity voltage being a low voltage relative to the opposing electrode potential; and
- setting, in a predetermined interval made up of a first interval in which the positive polarity voltage is applied and a second interval in which the negative polarity voltage is applied, a length of the first interval to be shorter than a length of the second interval.

* * * * *